United States Patent
Chen et al.

(10) Patent No.: US 10,215,555 B2
(45) Date of Patent: Feb. 26, 2019

(54) MOTION SENSING BY MONITORING INTENSITY OF LIGHT REDIRECTED BY AN INTENSITY PATTERN

(71) Applicant: Apple Inc., Cupertino, CA (US)

(72) Inventors: Denis G. Chen, San Jose, CA (US); Jui Hua Liu, Cupertino, CA (US); Xingxing Cai, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/674,260

(22) Filed: Aug. 10, 2017

(65) Prior Publication Data

US 2018/0080758 A1    Mar. 22, 2018

Related U.S. Application Data

(60) Provisional application No. 62/396,022, filed on Sep. 16, 2016, provisional application No. 62/396,010, filed on Sep. 16, 2016, provisional application No. 62/396,030, filed on Sep. 16, 2016.

(51) Int. Cl.
| | |
|---|---|
| *G01B 11/14* | (2006.01) |
| *G01D 5/20* | (2006.01) |
| *G01B 11/00* | (2006.01) |
| *G01D 5/30* | (2006.01) |
| *G01D 5/14* | (2006.01) |

(52) U.S. Cl.
CPC ............ *G01B 11/14* (2013.01); *G01B 11/002* (2013.01); *G01D 5/2013* (2013.01); *G01D 5/30* (2013.01); *G01D 5/142* (2013.01)

(58) Field of Classification Search
CPC ....... G01B 11/14; G01D 5/142; G01D 5/2013
USPC .................................................. 356/600–640
See application file for complete search history.

(56) References Cited

U.S. PATENT DOCUMENTS

| | | | |
|---|---|---|---|
| 6,240,652 B1 | 6/2001 | Bobel et al. | |
| 6,850,022 B2 | 2/2005 | Liu et al. | |
| 7,619,744 B2 | 11/2009 | Liess | |
| 7,714,272 B2 | 5/2010 | Urabe | |

(Continued)

FOREIGN PATENT DOCUMENTS

| | | |
|---|---|---|
| CN | 204831336 | 12/2015 |
| JP | 5294757 | 9/2013 |
| JP | 5841365 | 1/2016 |

OTHER PUBLICATIONS

Chow, "Motion Control of Electromechanical Actuators at Sub-Micron Precision," The Hong Kong Polytechnic University, Department of Electrical Engineering, Aug. 2011, 214 pages.

*Primary Examiner* — Tri T Ton
(74) *Attorney, Agent, or Firm* — Fish & Richardson P.C.

(57) ABSTRACT

Systems and techniques are described for measuring displacement of a mass by using an array of beams for scanning a binary intensity pattern disposed on a surface of the mass. Further, systems and techniques are described for measuring displacement of a moving mass by combining (i) information obtained from scanning, using a beam of light, an intensity pattern disposed on a surface of the mass, with (ii) information obtained when a coil interacts with a magnet attached to the moving mass. Furthermore, systems and techniques are described for measuring displacement of a mass by illuminating an intensity pattern disposed on a surface of the mass with an array of beams and monitoring intensity of each of the beams that is redirected by the intensity pattern.

25 Claims, 32 Drawing Sheets

(56) References Cited

U.S. PATENT DOCUMENTS 8,610,050 B2 12/2013 Yamamoto et al.
9,400,342 B2 7/2016 Hotta et al.

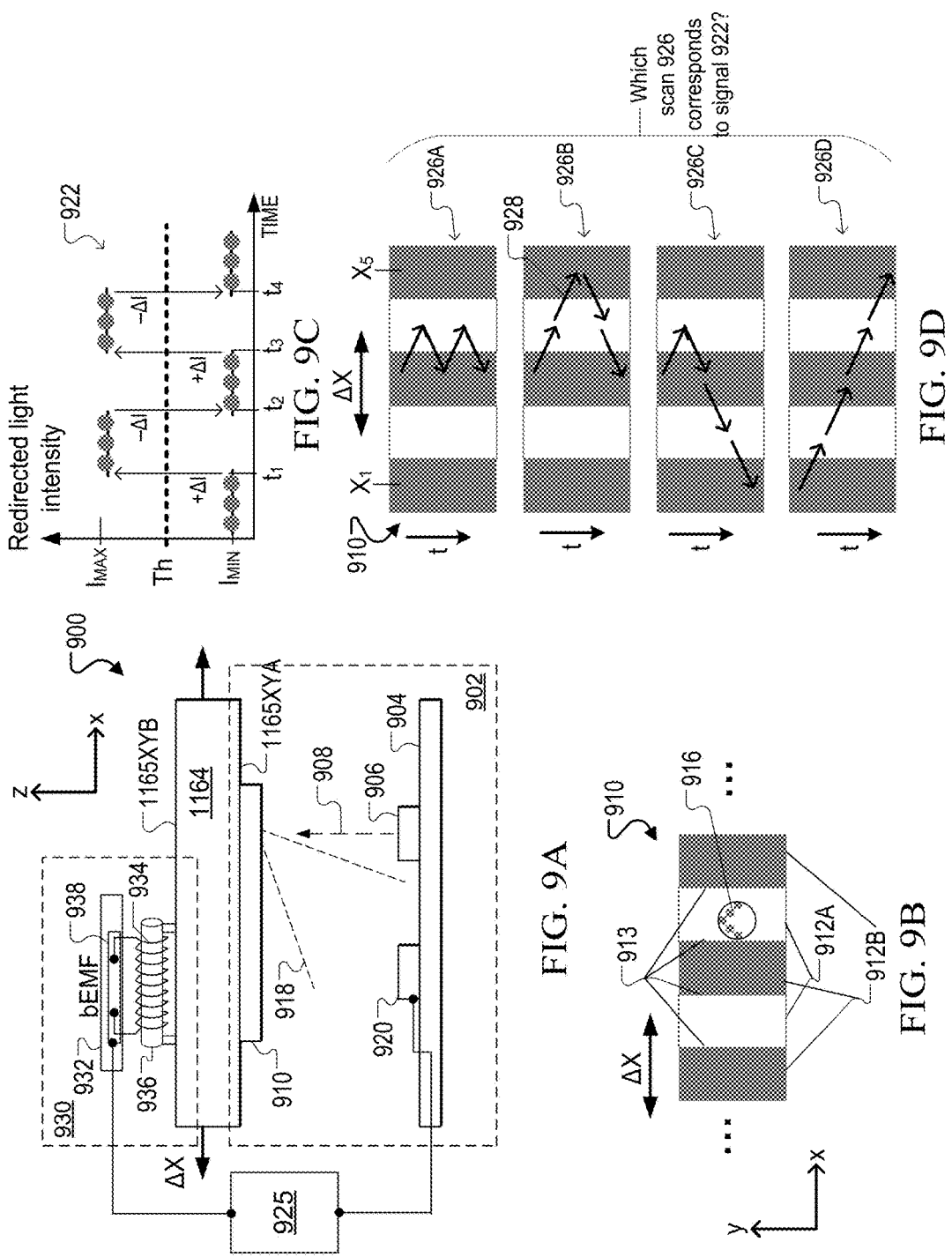

MOTION SENSING BY MONITORING INTENSITY OF LIGHT REDIRECTED BY AN INTENSITY PATTERN

CROSS-REFERENCE TO RELATED APPLICATIONS

This disclosure claims priority to U.S. Provisional Application Ser. No. 62/396,010, filed Sep. 16, 2016, the disclosure of which is incorporated herein by reference in its entirety. Further, this disclosure claims priority to U.S. Provisional Application Ser. No. 62/396,030, filed Sep. 16, 2016, the disclosure of which is incorporated herein by reference in its entirety. Furthermore, this disclosure claims priority to U.S. Provisional Application Ser. No. 62/396,022, filed Sep. 16, 2016, the disclosure of which is incorporated herein by reference in its entirety.

TECHNICAL FIELD

The present disclosure is generally related to motion sensing. For example, aspects of the present disclosure are related to measuring displacement of a mass by using an array of beams for scanning a binary intensity pattern disposed on a surface of the mass. As another example, aspects of the present disclosure are related to measuring displacement of a moving mass by combining (i) information obtained from scanning, using a beam of light, an intensity pattern disposed on a surface of the mass, with (ii) information obtained when a coil interacts with a magnet attached to the moving mass. As yet another example, aspects of the present disclosure are related to measuring displacement of a mass by illuminating an intensity pattern disposed on a surface of the mass with an array of beams and monitoring intensity of each of the beams that is redirected by the intensity pattern.

BACKGROUND

A haptic engine (also referred to as a vibration module) is a linear resonant actuator that determines one of acceleration, velocity and displacement of a moving mass. Either one of electrical sensing or magnetic sensing can be conventionally used for measuring displacements of the mass moving in the haptic engine. An example of electrical sensing, that is referred to as back electromotive force (bEMF) sensing, is based on sensing current-voltage of a coil that interacts with a magnet attached to the moving mass. For certain applications, accuracy of an absolute value of displacement measured by bEMF sensing may be insufficient because the coil's resistance changes with temperature. An example of magnetic sensing, that is referred to as Hall sensing, is based on sensing Hall voltages using Hall sensors that interact with a magnet attached to the moving mass. A displacement measuring system based on conventional Hall sensing can be expensive to calibrate as the conventional Hall sensing uses a look-up-table calibration to linearize displacement sensitivity. Additionally, conventional Hall sensing can have displacement sensitivity deadzones when a Z-offset between the Hall sensors and the magnet exceeds a small Z-offset threshold. Conventional Hall sensing is also susceptible to interference from external magnetic fields.

Some of the above issues are remedied if measuring displacement of a mass moving in a haptic engine is performed using optical sensing. For instance, a conventional optical system can be used in conjunction with conditioning electronics, for measuring displacements of a mass in a vibration module. Such a conventional optical system includes a light emitting diode (LED) module, a striped optical pattern attached to the moving mass, and a photodetector array module. In such a vibration module, position of the striped optical pattern can be determined relative to a beam provided by an LED module. The photodetector array module is used to image the striped optical pattern illuminated by the beam. Each of (i) a bias used to power the LED module and (ii) an output signal of the photodetector array module is conditioned by a signal processing module that is configured based on a conventional transceiver architecture. As part of the conventional transceiver architecture, the signal processing module operates essentially in class-A mode and, hence, it includes numerous analog circuits, e.g., op-amps, digital POTs, and trans-inductance amplifiers (TIAs). As such, the signal processing module, operated in such a conventional transceiver architecture, is power hungry, and hence it can be costly to operate. Further note that, because a photodetector array is used to image the striped optical pattern illuminated by a single LED, the size of the vibration module in the Z-direction tends to grow unnecessarily in order to facilitate optical focusing between the LED, the striped optical pattern, and the photodetector array.

SUMMARY

In this disclosure, technologies are described for measuring displacement of a mass by using an array of beams for scanning a binary intensity pattern disposed on a surface of the mass. The array of beams can be provided by an array of vertical cavity surface emitting lasers (VCSELs), and the binary intensity pattern includes at least an edge formed between two portions of the surface of the mass that have different reflectivities. In this manner, a displacement of the mass can be measured based on changes of reflected light intensity caused by a relative movement between the binary intensity pattern and the VCSEL array. Accuracy of the disclosed displacement measuring technique is determined by the geometry of the binary intensity pattern and the geometry of the VCSEL array.

Further in this disclosure, technologies are described for measuring displacement of a moving mass by combining (i) information obtained from scanning, using a beam of light, an intensity pattern disposed on a surface of the mass, with (ii) information obtained when a coil interacts with a magnet attached to the moving mass. The beam of light can be provided by a VCSEL. The intensity pattern includes two or more tiles supported by the mass, the tiles being configured to spatially modulate intensity of light redirected to a photodetector, as individual ones of the tiles are sequentially illuminated by the beam of light when the intensity pattern is displaced along with the mass relative to the beam of light. An intensity signal issued by the photodetector relates to the spatially modulated intensity of the redirected light. Additionally, a bEMF signal issued by the coil concurrently with the intensity signal relates to a spatially dependent bEMF induced in the coil due to the motion relative to the coil of the magnet that is attached to the mass. Information from the intensity signal is combined with information from the bEMF signal to determine both absolute value and direction of a displacement of the intensity pattern relative to the beam of light. Note that the displacement determined in this manner can be resolved at a scale smaller than what the size of the tiles of the intensity pattern would allow on its own.

Furthermore in this disclosure, technologies are described for measuring displacement of a mass by (i) illuminating an intensity pattern disposed on a surface of the mass with an array of beams, and (ii) monitoring intensity of each of the beams that is redirected by the intensity pattern. For instance, an array of VCSELs can be time multiplexed and used to scan an intensity pattern with respective beams emitted by the VCSELs of the array. In this manner, beams that have spatially modulated intensity are redirected by the intensity pattern to a single photo-diode operated in charge integration mode. A photo-diode signal relates to changes in intensity of each of the redirected beams and can be used to decode a corresponding motion vector of the intensity pattern that is moving along with the mass.

A first aspect of the disclosure can be implemented as a displacement measuring system that includes a vertical cavity surface emitting laser (VCSEL) array including two or more vertical cavity surface emitting lasers (VCSELs) distributed along a first direction; and an optical pattern supported by a mass, the optical pattern having two portions that form an edge oriented along a second direction that crosses the first direction, the two portions of the optical pattern having different reflectivities. Here, the VCSEL array is spaced apart from the optical pattern and arranged such that, during operation of the displacement measuring system, the VCSEL array illuminates the optical pattern, across the edge, with VCSEL light emitted by the VCSEL array. The displacement measuring system also includes a photodetector spaced apart from the optical pattern and arranged such that, during operation of the displacement measuring system, the photodetector integrates the VCSEL light that is redirected by the optical pattern to the photodetector and issues a photodetector signal from the integrated VCSEL light; and processing electronics to receive the photodetector signal and determine a displacement of the mass along the first direction based on a change in the photodetector signal caused by motion of the mass along a direction of motion that crosses the edge.

Implementations can include one or more of the following features. In some implementations, the two or more VCSELs of the VCSEL array can be arranged in a row parallel to the first direction and separated by a pitch. In some implementations, the two or more VCSELs of the VCSEL array can be arranged in two rows parallel to the first direction, each of the rows includes two or more VCSELs that are separated by a pitch, and the two rows are staggered relative to each other along the first direction by half the pitch and separated from each other by a separation. In either of these implementations, the pitch can be about a size of a beam spot of the VCSEL light impinging on the optical pattern. In some cases, the separation can be about a size of a beam spot of the VCSEL light impinging on the optical pattern.

Further in some cases, the two portions of the optical pattern can form a second edge orthogonal to the first edge; the VCSEL array can be further arranged such that, during operation of the displacement measuring system, the VCSEL array illuminates the optical pattern across the second edge with the VCSEL light. In this manner, the processing electronics can determine a second displacement of the mass along a direction orthogonal to the first direction based on a second change in the photodetector signal caused by motion of the mass along a second direction of motion that crosses the second edge. For example, a first of the two portions of the optical pattern can be shaped as a rectangle and is surrounded by the second portion, such that the first edge is a first side of the rectangle, and the second edge is a second side of the rectangle; additionally, a length of the second edge can be longer than a length of the VCSEL array, and a length of the first edge is longer than the separation between the two rows of the VCSEL array.

In some implementations, the system can include a second VCSEL array including two or more VCSELs distributed along the first direction. Here, the two portions of the optical pattern form a second edge parallel to the first edge; the second VCSEL array is spaced apart from the mass and arranged such that, during operation of the displacement measuring system, the second VCSEL array illuminates the optical pattern, across the second edge but not across the first edge, with VCSEL light emitted by the second VCSEL array; the photodetector further issues, during operation of the displacement measuring system, a second photodetector signal based on the VCSEL light emitted by the second VCSEL array that is redirected by the optical pattern to the photodetector. In this manner, the processing electronics can receive the second photodetector signal and determine the displacement of the mass along the first direction further based on a change in the second photodetector signal caused by the motion of the mass along the direction of motion.

In some cases, the processing electronics can determine a first ratio signal as a division of the first photodetector signal to the second photodetector signal, and a second ratio signal as a division of the second photodetector signal to the first photodetector signal; and determine the displacement of the mass along the first direction based on respective changes, caused by the motion of the mass along the direction of motion, in the first ratio signal and the second ratio signal. For example, the processing electronics can determine the displacement of the mass along the first direction based on the smaller of the first ratio signal and the second ratio signal.

In other cases, the first VCSEL array and the second VCSEL array can be spaced apart from the mass by the same separation. In this manner, the processing electronics can determine a change of the separation between the VCSEL arrays and the mass, based on a change in a common value of the first photodetector signal and second photodetector signal.

In some other cases, the first VCSEL array and the second VCSEL array can illuminate the optical pattern, during operation of the displacement measuring system, in a multiplexed manner. Additionally, the photodetector can issue the respective first photodetector signal and second photodetector signal in the same multiplexed manner. For example, the VCSELs of the first VCSEL array and the second VCSEL array can emit light of the same wavelength; and the VCSELs of the first VCSEL array illuminate the optical pattern when the VCSELs of the second VCSEL array do not, and the VCSELs of the second VCSEL array illuminate the optical pattern when the VCSELs of the first VCSEL array do not, in a time multiplexed manner. As another example, the VCSELs of the first VCSEL array can emit light of a first wavelength and the VCSELs of the second VCSEL array emit light of a second wavelength different from the first wavelength; and the VCSELs of the first VCSEL array and the second VCSEL array illuminate the optical pattern concurrently, in a wavelength multiplexed manner. Here, the photodetector can include a first sensor to output a first sensor signal, and a second sensor to output a second sensor signal. Additionally, the processing electronics can concurrently issue (i) the first photodetector signal based on a first combination of the first sensor signal and the second sensor signal, the first combination being selective of the first wavelength, and (ii) the second photodetector signal based on a second combination of the first sensor signal and the second sensor signal, the second combination being selective of the second wavelength.

In yet other cases, the first VCSEL array and the second VCSEL array can have the same length; a first of the two portions of the optical pattern is shaped as a strip bounded by the first edge and the second edge inside a second of the two portions; and a width of the strip is wider than the common length of the VCSEL arrays.

In some implementations, one of the two portions of the optical pattern can be reflective and the other one of the two portions of the optical pattern is absorptive. In some implementations, at least one of the two portions of the optical pattern can be printed using ink that absorbs IR light. In some implementations, one of the two portions of the optical pattern can be coated with a multilayer reflection coating, and the other one of the two portions of the optical pattern is coated with a multilayer anti-reflection coating. In some implementations, one of the two portions of the optical pattern can have a reflectivity that is at least twice as large as a reflectivity of the other one of the two portions of the optical pattern. In some implementations, the VCSEL light emitted by the VCSELs can have wavelengths in a range from 700 nm to 1100 nm. In some implementations, the second direction can be orthogonal to the first direction. In some implementations, the direction of motion can be parallel to the first direction.

Another aspect of the disclosure can be implemented as a 2D-displacement measuring system that includes two pairs of light-emitting element (LEE) arrays, each LEE array having two rows of light-emitting elements (LEEs), the rows of LEEs being parallel to a first direction, and each LEE being configured to output collimated light; an optical pattern supported by a mass, the optical pattern having two portions that form a rectangular edge, the rectangular edge having two sides parallel to the first direction, the two portions of the optical pattern having different reflectivities, where each LEE array illuminates the optical pattern, across a corresponding corner of the rectangular edge, with the collimated light output by the LEE array; a photodetector to separately integrate the collimated light output by the respective LEE arrays redirected by the optical pattern to the photodetector, and issue two pairs of photodetector signals from the separately integrated light output by the respective LEE arrays; and processing electronics to receive the photodetector signals and determine displacements of the mass along, and orthogonal to, the first direction based on changes in the corresponding photodetector signals caused by motion of the mass.

Another aspect of the disclosure can be implemented as an angular displacement measuring system that includes three pairs of light-emitting element (LEE) arrays, each LEE array having two rows of light-emitting elements (LEEs), the rows of LEEs within each pair of LEE arrays being parallel to each other, and the rows of LEEs from different pairs of LEE arrays forming an angle of 120° with each other; an optical pattern supported around the perimeter of a wheel, the optical pattern having two portions that form three rectangular edges, each rectangular edge having two sides parallel to the rows of LEEs when the rectangular edge is proximate to a pair of LEE arrays, the two portions of the optical pattern having different reflectivities, where each LEE array of the proximate pair illuminates the optical pattern, across a corresponding corner of the rectangular edge, with collimated light output by the LEE array; a photodetector to issue three pairs of photodetector signals based on the collimated light output by the respective pair of LEE arrays and redirected by the optical pattern to the photodetector, each pair of photodetector signals including a periodic photodetector signal; and processing electronics to receive the photodetector signals and determine (i) an angular displacement of the wheel based on changes in the periodic photodetector signals caused by rotation of the wheel about a rotation axis of the wheel, and (ii) a lateral displacement of the wheel based on changes in one or more of the remaining photodetector signals caused by translation of the wheel along the rotation axis.

Implementations of each of the 2D-displacement measuring system and the angular displacement measuring system can include one or more of the following features. In some implementations, each LEE can include a VCSEL. In some implementations, each LEE can include a light source configured to emit un-collimated light; and collimating optics optically coupled with the light source to collimate the emitted light. In some implementations, the photodetector can include a CMOS sensor array or a CCD sensor array.

Another aspect of the disclosure can be implemented as a haptic engine that includes the mass and any of the foregoing displacement measuring systems. In some implementations, a computing device can include the haptic engine.

A second aspect of the disclosure can be implemented as a displacement measuring system that includes (i) a back electromotive force (bEMF) sensing system to acquire a first displacement signal that relates to a time dependence of a displacement of a mass, where the displacement is relative to a datum of the displacement measuring system; (ii) an optical sensing system including an intensity pattern that is coupled with the mass and comprises two or more tiles separated from each other by corresponding one or more tile borders, where the tile borders are at known locations relative to each other; a light source that is at rest relative to the datum to illuminate the intensity pattern with a light beam, where multiple tile border crossings occur while the first displacement signal is being acquired, and where a tile border crossing is said to occur when a tile border of the intensity pattern crosses through the light beam; and a photodetector that is at rest relative to the datum to acquire an intensity signal corresponding to intensity of the light beam redirected to the photodetector from the intensity pattern, where the intensity signal is indicative of the tile border crossings; and (iii) a processor to spatially resolve the tile border crossings indicated by the intensity signal, at least in part, based on whether the first displacement signal increases or decreases at a time when a tile border crossing has occurred; and determine the displacement of the mass based on the spatially resolved tile border crossings.

Implementations can include one or more of the following features. In some implementations, the processor can determine a second displacement signal using the spatially resolved tile border crossings; and determine the displacement of the mass by combining the first displacement signal and the second displacement signal. In some cases, the processor can determine a scale factor equal to a ratio of a change in the second displacement signal over a predetermined time interval and a change in the first displacement signal over the predetermined time interval; differentiate the first displacement signal; and scale the differentiated first displacement signal based on the scale factor prior to the combining of the first displacement signal and the second displacement signal. Additionally, the processor can update the scale factor when the first displacement signal over the predetermined time interval exceeds a threshold change. In some cases, the bEMF sensing system can sample the first displacement signal using a first sampling frequency; and the optical sensing system can sample the intensity signal using a second sampling frequency smaller than the first sampling frequency, thereby samples of the second displacement signal have the second sampling frequency. In the latter cases, to perform the combining of the first displacement signal and the second displacement signal, the processor can insert corresponding samples of the scaled differentiated first displacement signal between samples of the second displacement signal.

In some implementations, each tile can have a size larger than a beam spot formed by the light beam that illuminates the intensity pattern, and each tile is configured to redirect to the photodetector light having an intensity different from an intensity of light redirected to the photodetector by any of its adjacent tiles. In some cases, the intensity pattern can be a binary intensity pattern in which each tile has only two adjacent tiles configured to redirect to the photodetector light having the same intensity. In other cases, each tile can be a hexagonal tile configured to redirect to the photodetector light having an intensity level that is one of (i) a minimum intensity level, (ii) a maximum intensity level, (iii) a first intermediate intensity level between the minimum intensity level and the maximum intensity level, and (iv) a second intermediate intensity level between the first intermediate intensity level and the maximum intensity level.

In the latter cases, the first displacement signal acquired by the bEMF sensing system represents the time dependence of a component of the displacement of the mass along a first direction. As such, the processor can (i) spatially resolve first tile border crossings indicated by the intensity signal based on whether the first displacement signal increases or decreases at a time when a first tile border crossing has occurred along the first direction, and (ii) determine the component of the displacement of the mass along the first direction based on the spatially resolved first tile border crossings. Further, the processor can (iii) spatially resolve second tile border crossings indicated by the intensity signal based on changes between a pair of the minimum intensity level, the maximum intensity level, the first intermediate intensity level, and the second intermediate intensity level of redirected light that is captured by the photodetector when a second tile border crossing has occurred along a second direction orthogonal to the first direction, and (iv) determine a component of the displacement of the mass along the second direction based on the spatially resolved second tile border crossings. Also in the latter cases, the light source can concurrently illuminate three tiles of the intensity pattern that are adjacent to each other, one of the three adjacent tiles illuminated with the probe beam, and the other two of the three adjacent tiles respectively illuminated with two reference light beams, the two reference light beams spaced apart from the probe beam by a separation about equal to a separation between adjacent tiles; and the probe beam and the reference light beams can illuminate the three adjacent tiles with substantially equal intensities. Here, the light source can concurrently illuminate the three adjacent tiles in a time multiplexed manner. Further here, the photodetector can acquire reference signals corresponding to intensities of respective reference light beams redirected to the photodetector from the intensity pattern, and the optical sensing system can sample the reference signals using a third sampling frequency smaller than the second sampling frequency. Also here, the processor can compare measured values and expected values of differences between intensity of the probe light beam redirected to the photodetector from one of the three adjacent tiles and respective ones of the other two of the three adjacent tiles respectively illuminated with two reference light beams, and the light source can adjust the intensity of the probe light beam based on the compared differences.

In some implementations, the photodetector can include a threshold module to apply one or more threshold values to each intensity value of the light beam redirected to, and measured by, the photodetector to issue a corresponding expected value of the intensity value. In some cases, the photodetector can include a filter to adaptively determine the one or more threshold values. In other cases, the one or more threshold values can be predetermined.

In some implementations, the photodetector can include a photodiode. In some implementations, the light source can include a vertical cavity surface emitting laser (VCSEL) to emit the probe beam. In some implementations, the light source can include a light emitting diode (LED) to emit probe light; and beam-shaping optics to form the probe beam. In some implementations, the intensity pattern can be reflective to the probe light beam, and disposed on a surface of the mass.

In some implementations, the intensity pattern can be transparent to the probe light beam, and the optical sensing system includes an optical structure having a first surface and a second, opposing surface, the intensity pattern is disposed on the first surface of the optical structure, and the optical structure is attached to a surface of the mass adjacent the second surface of the optical structure. In some cases, the optical structure can include an array of micro-mirrors disposed between the first and second surfaces of the optical structure, and the micro-mirrors of the array are oriented to redirect to the photodetector the light beam that impinges on the array of micro-mirrors after transmission through the intensity pattern. In some cases, the optical structure can include solid material that is transparent to the probe light beam. In the latter cases, the optical sensing system can include a diffusive film sandwiched between the second surface of the optical structure and the surface of the mass, and the diffusive film is configured to redirect to the photodetector the light beam that impinges on the diffusive film after transmission through the intensity pattern. Also in the latter cases, the second surface of the optical structure is spaced apart from the surface of the mass by an air gap, and the second surface of the optical structure can include facets arranged to reflect, via total internal reflection (TIR), to the photodetector, the light beam that impinges on the facets after transmission through the intensity pattern. Also in the latter cases, the optical sensing system can include a diffusive material sandwiched between the second surface of the optical structure and the surface of the mass, and the second surface of the optical structure can include facets arranged to diffusely reflect, to the photodetector, the light beam that impinges on the facets after transmission through the intensity pattern.

Another aspect of the disclosure can be implemented as a haptic engine that includes the mass and a displacement measuring system summarized above. In some implementations, a computing device can include the haptic engine.

A third aspect of the disclosure can be implemented as a method that includes a displacement measuring system that includes a vertical cavity surface emitting laser (VCSEL) array including two or more ($N_{TOT}$) vertical cavity surface emitting lasers (VCSELs) distributed along a first direction; an intensity pattern that is coupled with a mass and includes two or more tiles separated from each other by corresponding one or more tile borders, where the tile borders are at known locations relative to each other along the first direction, and where the VCSEL array is spaced apart from the intensity pattern and arranged such that, during operation of the displacement measuring system, the ($N_{TOT}$) VCSELs of the array illuminate respective locations of the intensity pattern across at least one of the tile borders; a photodetector spaced apart from the intensity pattern and arranged such that, during operation of the displacement measuring system, the photodetector to (i) capture beams redirected to the photodetector from the ($N_{TOT}$) illuminated locations of the intensity pattern, where each tile of the intensity pattern is configured to redirect to the photodetector light having an intensity different from an intensity of light redirected to the photodetector by its adjacent tiles, and (ii) issue a set of ($N_{TOT}$) intensity values corresponding to the respective captured beams; and a processor to determine (i) positions of the illuminated locations of the intensity pattern based on relative differences between the intensity values of the issued set, and (ii) a displacement of the mass along the first direction based on one or more changes of the intensity values of the set caused by motion of the mass along a direction of motion across the at least one of the tile borders.

Implementations can include one or more of the following features. In some implementations, the photodetector is a single photodiode, and the VCSELs of the VCSEL array are configured to illuminate the intensity pattern in a time multiplexed manner. In some implementations, the photodetector issues instances of the set of intensity values with a sampling frequency ($f_S$), and the processor can obtain an intensity signal as a sequence of the instances of the set of intensity values, the sequence having a frequency equal to the sampling frequency ($f_S$), and use the obtained intensity signal to determine the displacement of the mass along the first direction.

In some implementations, the VCSELs of the VCSEL array can be arranged in a row parallel to the first direction and separated by a pitch ($\delta$) configured such that at least two of the beams emitted by the VCSEL array can concurrently illuminate, along the first direction, a single tile of the intensity pattern. In some cases, the intensity pattern can have a pattern period (P) along the first direction that is formed from (M≥2) different tiles, each tile of the pattern period being configured to redirect to the photodetector light having an associated intensity level from among (M) corresponding different intensity levels, the pattern period satisfying the condition $P>(N_{TOT}-1)\delta$, and for a motion of the mass that causes a maximum velocity ($v_{MAX}$) of the intensity pattern, a sampling frequency ($f_S$) satisfies the condition $f_S>2v_{MAX}/[(N_{TOT}-1)\delta]$. In some cases, the intensity pattern can have a pattern period (P) along the first direction that is formed from (M≥2) different tiles, each tile of the pattern period being configured to redirect to the photodetector light having an associated intensity level from among the (M) different intensity levels, the pattern period satisfying the condition $P\leq(N_{TOT}-1)\delta$, and, for a motion of the mass that causes a maximum velocity ($v_{MAX}$) of the intensity pattern, a sampling frequency ($f_S$) satisfies the condition $f_S>2v_{MAX}/P$.

In some implementations, the VCSEL array can include two or more VCSELs distributed along a second direction that crosses the first direction; the intensity pattern can include at least two or more tiles that form one or more tile borders across the first direction, and at least two or more tiles that form one or more tile borders across the second direction, the tile borders being at known locations relative to each other along the first and second directions, such that, during operation of the displacement measuring system, the VCSELs of the array illuminate respective locations of the intensity pattern, across at least one of the tile borders along the first direction and across at least another one of the tile borders along the second direction; and the processor can determine the displacement of the mass along the first direction based on one or more changes of the intensity values of the set caused by motion of the mass along a direction of motion across the at least one of the tile borders along the first direction and across the at least another one of the tile borders along the second direction. Here, the VCSELs of the VCSEL array can be arranged in a first row parallel to the first direction, the first row including ($N_X$) VCSELs separated by a first pitch ($\delta_X$) configured such that at least two of the beams emitted by the VCSEL array can concurrently illuminate, along the first direction, a single tile of the intensity pattern, and a second row parallel to the second direction, the second row including ($N_Y$) VCSELs separated by a second pitch ($\delta_Y$) configured such that at least two of the beams emitted by the VCSEL array can concurrently illuminate, along the second direction, a single tile of the intensity pattern.

In some cases of these implementations, the intensity pattern can have a first pattern period ($P_X$) along the first direction that is formed from ($M_X\geq2$) different tiles, each tile of the first pattern period being configured to redirect to the photodetector light having an associated intensity level from among ($M_X$) corresponding different intensity levels, the first pattern period satisfying the condition $P_X>(N_X-1)\delta_X$, and the intensity pattern can have a second pattern period ($P_Y$) along the second direction that is formed from ($M_Y\geq2$) different tiles, each tile of the second pattern period being configured to redirect to the photodetector light having an associated intensity level from among ($M_Y$) corresponding different intensity levels, the second pattern period satisfying the condition $P_Y>(N_Y-1)\delta_Y$. As such, for a motion of the mass that causes a maximum velocity ($v_{MAX}$) of the intensity pattern, a sampling frequency ($f_S$) satisfies the condition $f_S>\text{MAX}\{2v_{MAX,X}/[(N_X-1)\delta_X], 2v_{MAX,Y}/[(N_Y-1)\delta_Y]\}$.

In some cases of these implementations, the intensity pattern can have a first pattern period ($P_X$) along the first direction that is formed from ($M_X\geq2$) different tiles, each tile of the first pattern period being configured to redirect to the photodetector light having an associated intensity level from among ($M_X$) corresponding different intensity levels, the first pattern period satisfying the condition $P_X\leq(N_X-1)\delta_X$, and the intensity pattern can have a second pattern period ($P_Y$) along the second direction that is formed from ($M_Y\geq2$) different tiles, each tile of the second pattern period being configured to redirect to the photodetector light having an associated intensity level from among ($M_Y$) corresponding different intensity levels, the second pattern period satisfying the condition $P_Y\leq(N_Y-1)\delta_Y$. As such, for a motion of the mass that causes a maximum velocity ($v_{MAX}$) of the intensity pattern, a sampling frequency ($f_S$) satisfies the condition $f_S>\text{MAX}\{2v_{MAX,X}/P_X, 2v_{MAX,Y}/P_Y\}$.

In some cases of these implementations, the intensity pattern can have a first pattern period ($P_X$) along the first direction that is formed from ($M_X\geq2$) different tiles, each tile of the first pattern period being configured to redirect to the photodetector light having an associated intensity level from among ($M_X$) corresponding different intensity levels, the first pattern period satisfying the condition $P_X>(N_X-1)\delta_X$, and the intensity pattern can have a second pattern period ($P_Y$) along the second direction that is formed from ($M_Y\geq2$) different tiles, each tile of the second pattern period being configured to redirect to the photodetector light having an associated intensity level from among ($M_Y$) corresponding different intensity levels, the second pattern period satisfying the condition $P_Y\leq(N_Y-1)\delta_Y$. As such, for a motion of the mass that causes a maximum velocity ($v_{MAX}$) of the intensity pattern, a sampling frequency ($f_S$) satisfies the condition $f_S > \text{MAX}\{2v_{MAX,X}/[(N_X-1)\delta_X], 2v_{MAX,Y}/P_Y\}$.

In some cases of these implementations, the intensity pattern can have a first pattern period ($P_X$) along the first direction that is formed from ($M_X \geq 2$) different tiles, each tile of the first pattern period being configured to redirect to the photodetector light having an associated intensity level from among ($M_X$) corresponding different intensity levels, the first pattern period satisfying the condition $P_X \leq (N_X-1)\delta_X$, and the intensity pattern can have a second pattern period ($P_Y$) along the second direction that is formed from ($M_Y \geq 2$) different tiles, each tile of the second pattern period being configured to redirect to the photodetector light having an associated intensity level from among ($M_Y$) corresponding different intensity levels, the second pattern period satisfying the condition $P_Y > (N_Y-1)\delta_Y$. As such, for a motion of the mass that causes a maximum velocity ($v_{MAX}$) of the intensity pattern, a sampling frequency ($f_S$) satisfies the condition $f_S > \text{MAX}\{2v_{MAX,X}/P_X, 2v_{MAX,Y}/[(N_Y-1)\delta_Y]\}$.

Moreover, in these implementations, the processor can determine a total displacement of the mass along the second direction that corresponds to a maximum displacement of the mass along the first direction; determine an angular misalignment of the intensity pattern based on the total displacement of the mass along the second direction; and determine a scaling factor to scale the determined displacement of the mass along the first direction and the determined displacement of the mass along the second direction.

In some implementations, the intensity pattern can include a surface that is reflective to the beams emitted by the VCSEL array. In some implementations, the intensity pattern can include a surface that is transparent to the beams emitted by the VCSEL array and is spatially modulated by the tiles; and an array of redirecting micro-structures disposed between the first surface and the mass, the redirecting micro-structures of the array being oriented to redirect, by a folding angle, to the photodetector, the beams emitted by the VCSEL array that impinge on the array of redirecting micro-structures after at least one transmission through the first surface. In some cases, the system can include a mount including a surface onto which the VCSEL array and the photodetector are disposed side-by-side to each other, where the folding angle is an acute angle. In some cases, the system can include a mount including a first surface onto which the VCSEL array is disposed, and a second surface angled to the first surface, the photodetector being disposed on the second surface, where the folding angle is substantially a right angle.

In some implementations, to determine the positions of the illuminated locations of the intensity pattern, the processor can use the issued set of intensity values against a mapping of (A) sets of expected intensity values to (B) positions of illuminated locations of the intensity pattern.

Another aspect of the disclosure can be implemented as a displacement measuring system that includes a single light-emitting element (LEE); an intensity pattern that is coupled with a mass and includes three or more tiles separated from each other by corresponding one or more tile borders, where the tile borders are at known locations relative to each other along a first direction, and where the LEE is spaced apart from the intensity pattern and arranged such that, during operation of the displacement measuring system, the LEE illuminates a location of the intensity pattern; a single photodiode spaced apart from the intensity pattern and arranged such that, during operation of the displacement measuring system, the photodiode to (i) capture a beam redirected to the photodiode from the illuminated location of the intensity pattern, where each tile of the intensity pattern is configured to redirect to the photodiode light having an intensity different by (A) a first amount from an intensity of light redirected to the photodiode by one of its adjacent tiles, and (B) a second amount from another intensity of light redirected to the photodiode by another one of its adjacent tiles, and (ii) issue a single intensity value corresponding to the captured beam; and a processor to determine (i) a position of the illuminated location of the intensity pattern based on the issued intensity value, and (ii) a displacement of the mass along the first direction based on changes of the intensity value caused by motion of the mass along a direction of motion across at least one of the tile borders.

Implementations of the above-summarized measuring system can include one or more of the following features. In some implementations, the intensity pattern can have a pattern period (P) along the first direction that is formed from ($M \geq 3$) different tiles, each tile of the pattern period being configured to redirect to the photodiode light having an associated intensity level from among (M) corresponding different intensity levels. As such, for a motion of the mass that causes a maximum velocity ($v_{MAX}$) of the intensity pattern, the sampling frequency ($f_S$) satisfies the condition $f_S > 2Mv_{MAX}/P$, and the processor can obtain an intensity signal as a sequence of the intensity values, the sequence having a frequency equal to the sampling frequency ($f_S$). In some implementations, to determine the positions of the illuminated locations of the intensity pattern, the processor can use the issued intensity value against a mapping of (A) expected intensity values to (B) positions of illuminated locations of the intensity pattern.

Another aspect of the disclosure can be implemented as a haptic engine that includes the mass and one of the displacement measuring systems summarized above.

Another aspect of the disclosure can be implemented as an angular displacement measuring system that includes a light-emitting element (LEE) array including two or more ($N_{TOT}$) light-emitting elements (LEEs), each LEE being configured to output collimated light in the form of a beam; an intensity pattern that is disposed on a side wall surface of a wheel, the intensity pattern including tiles shaped as annulus sectors, the tiles separated from each other by corresponding one or more tile borders, where the tile borders are radially oriented at known angular locations relative to each other, and where the LEE array is spaced apart from the intensity pattern and arranged such that, during operation of the angular displacement measuring system, the ($N_{TOT}$) LEEs of the array output beams along a direction orthogonal to the side wall surface and illuminate respective locations of the intensity pattern across at least one of the tile borders; a photodetector spaced apart from the intensity pattern and arranged such that, during operation of the angular displacement measuring system, the photodetector (i) captures beams redirected along a radial direction through the rim surface of the wheel to the photodetector from the ($N_{TOT}$) illuminated locations of the intensity pattern, where each tile of the intensity pattern is configured to redirect to the photodetector light having an intensity different from an intensity of light redirected to the photodetector by its adjacent tiles, and (ii) issues a set of ($N_{TOT}$) intensity values corresponding to the respective captured beams; and a processor to determine (i) positions of the illuminated locations of the intensity pattern based on relative differences between the intensity values of the issued set, and (ii) an angular displacement of the wheel based on one or more changes of the intensity values of the set caused by rotation of the wheel across the at least one of the tile borders.

Another aspect of the disclosure can be implemented as an angular displacement measuring system that includes a light-emitting element (LEE) array including two or more ($N_{TOT}$) light-emitting elements (LEEs), each LEE being configured to output collimated light in the form of a beam; an intensity pattern that is disposed on the rim surface of a wheel, the intensity pattern includes tiles separated from each other by corresponding one or more tile borders, where the tile borders are oriented either along the length, or the width, of the rim at known locations relative to each other, and where the LEE array is spaced apart from the intensity pattern and arranged such that, during operation of the angular displacement measuring system, the ($N_{TOT}$) LEEs of the array output beams along a radial direction through the rim surface of the wheel and illuminate respective locations of the intensity pattern across at least one of the tile borders; a photodetector spaced apart from the intensity pattern and arranged such that, during operation of the angular displacement measuring system, the photodetector (i) captures beams redirected to the photodetector from the ($N_{TOT}$) illuminated locations of the intensity pattern, where each tile of the intensity pattern is configured to redirect to the photodetector light having an intensity different from an intensity of light redirected to the photodetector by its adjacent tiles, and (ii) issues a set of ($N_{TOT}$) intensity values corresponding to the respective captured beams; and a processor to determine (i) positions of the illuminated locations of the intensity pattern based on relative differences between the intensity values of the issued set, and (ii) an angular displacement, and a lateral displacement, of the wheel based on one or more changes of the intensity values of the set caused by rotation, and lateral translation, of the wheel across the at least one of the tile borders.

Implementations of the above-summarized angular displacement measuring systems can include one or more of the following features. In some implementations, the beams redirected from the ($N_{TOT}$) illuminated locations of the intensity pattern to the photodetector can be tilted by an acute angle relative the radial direction along which the LEEs of the array output the beams. In some implementations, the beams redirected from the ($N_{TOT}$) illuminated locations of the intensity pattern through a side wall surface of the wheel to the photodetector can be tilted by a substantially right angle relative the radial direction along which the LEEs of the array output the beams.

Another aspect of the disclosure can be implemented as a displacement measuring system that includes a light-emitting element (LEE) array including two or more ($N_{TOT}$) light-emitting elements (LEEs), each LEE being configured to output collimated light in the form of a beam; an intensity pattern that is disposed on a surface of an axle of a wheel, the intensity pattern includes tiles separated from each other by corresponding one or more tile borders, where the tile borders are oriented either around, or along, the axle at known locations relative to each other, and where the LEE array is spaced apart from the intensity pattern and arranged such that, during operation of the angular displacement measuring system, the ($N_{TOT}$) LEEs of the array output beams along a radial direction through the axle surface of the axle and illuminate respective locations of the intensity pattern across at least one of the tile borders; a photodetector spaced apart from the intensity pattern and arranged such that, during operation of the angular displacement measuring system, the photodetector (i) captures beams redirected from the ($N_{TOT}$) illuminated locations of the intensity pattern to the photodetector, where each tile of the intensity pattern is configured to redirect to the photodetector light having an intensity different from an intensity of light redirected to the photodetector by its adjacent tiles, where the beams redirected from the ($N_{TOT}$) illuminated locations of the intensity pattern to the photodetector are tilted by an acute angle relative the radial direction along which the LEEs of the array output the beams, and (ii) issues a set of ($N_{TOT}$) intensity values corresponding to the respective captured beams; and a processor to determine (i) positions of the illuminated locations of the intensity pattern based on relative differences between the intensity values of the issued set, and (ii) an angular displacement, and a lateral displacement, of the wheel based on one or more changes of the intensity values of the set caused by rotation, and lateral translation, of the wheel across the at least one of the tile borders.

Implementations of the above-summarized measuring systems can include one or more of the following features. In some implementations, each LEE can include a VCSEL. In some implementations, each LEE can include a light source configured to emit un-collimated light; and collimating optics optically coupled with the light source to collimate the emitted light. In some implementations, the photodetector is a single photodiode; and the LEEs of the LEE array are configured to illuminate the intensity pattern in a time multiplexed manner.

Another aspect of the disclosure can be implemented as a watch that includes one of the above-summarized angular displacement measuring systems or displacement measuring systems.

Another aspect of the disclosure can be implemented as a computing device that includes one or more of the above summarized haptic engine, angular displacement measuring systems, or displacement measuring system.

The above-disclosed technologies can result in one or more of the following potential advantages. For example, absolute positions of a moving mass, disposed in vibration modules, that are measured by the disclosed displacement measuring systems can be used to effectively control saliency and prevent noise and damage. As such, accurately measured displacement of the moving mass allows closed-loop control. The closed-loop control enables richer saliency vocabularies, compensation against aging degradation, and crash of, or damage to, the vibration modules. As another example, implementations of the disclosed displacement measuring systems used for 1D motion sensing can be extended to 2D motion sensing, where displacements $\Delta X$ and $\Delta Y$ of the moving mass can be concurrently measured.

As yet another example, thickness along the Z-axis of a vibration module that uses the disclosed displacement measuring systems can be significantly reduced relative to a conventional vibration module, because the disclosed displacement measuring systems' VCSEL-based optical source does not need focusing, so it can be placed at any arbitrary distance to the intensity pattern. As yet another example, a vibration module that uses the disclosed displacement measuring systems can be self-calibrated with the intensity pattern acting as displacement reference, so they do not need to be placed in a calibration tester like conventional displacement measuring systems.

As yet another example, the disclosed displacement measuring systems can be insensitive to Z-offset given by relative alignment/misalignment between the moving mass and the VCSEL array. As yet another example, the disclosed displacement measuring system can be insensitive to temperature change as it uses a ratiometric measurement technique.

As yet another example, the transceiver architecture of the disclosed displacement measuring systems is configured to operate in pulse width modulation (PWM) mode which uses a reduced number of analog components compared to the class-A mode in which the transceiver architecture used in a conventional vibration module is configured to operate.

Details of one or more implementations of the disclosed technologies are set forth in the accompanying drawings and the description below. Other features, aspects, descriptions and potential advantages will become apparent from the description, the drawings and the claims.

BRIEF DESCRIPTION OF THE DRAWINGS

FIGS. 9A-9L show aspects of a displacement measuring system that includes an optical sensing system and a bEMF sensing system.

Certain illustrative aspects of the systems, apparatuses, and methods according to the disclosed technologies are described herein in connection with the following description and the accompanying figures. These aspects are, however, indicative of but a few of the various ways in which the principles of the disclosed technologies may be employed and the disclosed technologies are intended to include all such aspects and their equivalents. Other advantages and novel features of the disclosed technologies may become apparent from the following detailed description when considered in conjunction with the figures.

DETAILED DESCRIPTION

Figure 1A:
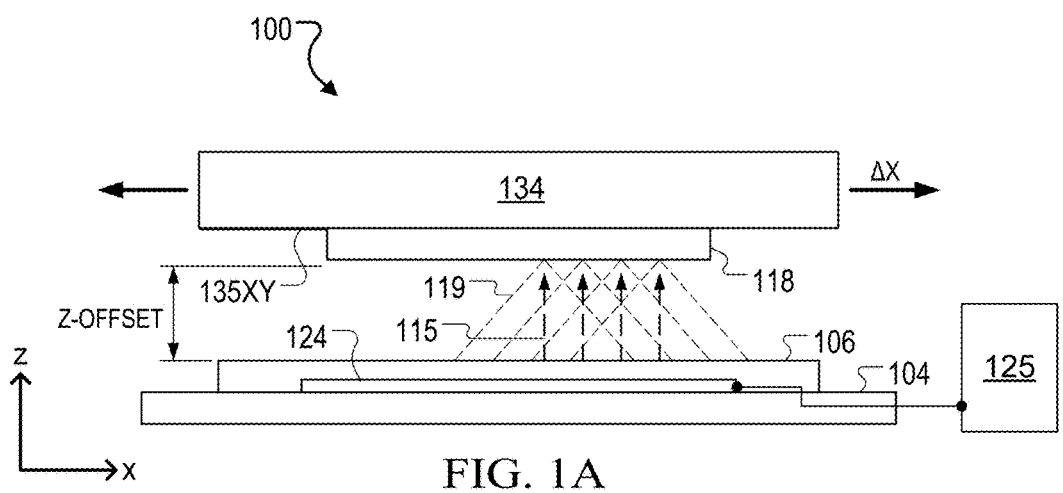
FIGS. 1A-1C show aspects of a displacement measuring system.

FIG. 1A is a side view, e.g. in the (x,z) plane, of an example of a displacement measuring system 100. The displacement measuring system 100 includes a mount 104, a light source 106 supported by the mount, an optical pattern 118 disposed on a surface 135XY of a mass 134 that is spaced apart from the light source, a photodetector 124 supported by the mount, and processing electronics 125 coupled with the photodetector.

Figure 1B:
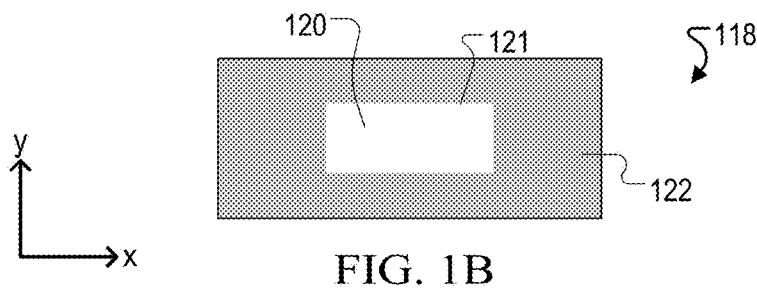

FIG. 1B is a plan view, e.g., in the (x,y) plane, of the optical pattern 118. In this example, the optical pattern 118 has two portions 120, 122 that form a rectangular edge 121 with sides parallel to corresponding x-axis and y-axis. The first portion 120 (shown in white) has a first reflectivity $R_1$, and the second portion 122 (shown in grey) has a second reflectivity $R_2$, smaller than the first reflectivity. For example, the second reflectivity $R_2$ can be at most half the first reflectivity $R_1$, e.g., $R_2=0.3R_1$, $0.1R_1$, $0.05R_1$ or other fractions of $R_1$. As light impinging on the first portion 120 reflects off it with a first intensity, and light impinging on the second portion 122 reflects off it with a second intensity smaller than the first intensity, the optical pattern is also referred to as a binary intensity pattern 118. In some implementations, the first portion 120 is coated with a reflective film and the second portion 122 is coated with an absorptive film. In some implementations, the first portion 120 is coated with a multilayer reflection coating and the second portion 122 is coated with a multilayer anti-reflection coating.

Figure 1C:
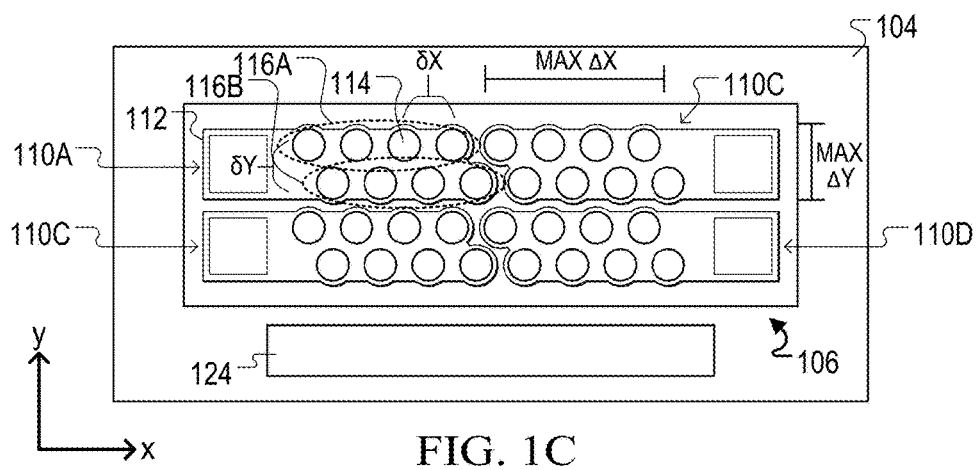

FIG. 1C is a plan view, e.g., in the (x,y) plane, of the components of the displacement measuring system 100 supported by the mount 104. The light source 106 can include one or more light emitting element (LEE) arrays 110. In the example illustrated in FIG. 1C, the light source 106 includes LEE arrays 110A, 110B, 110C, 110D.

Figure 1D:
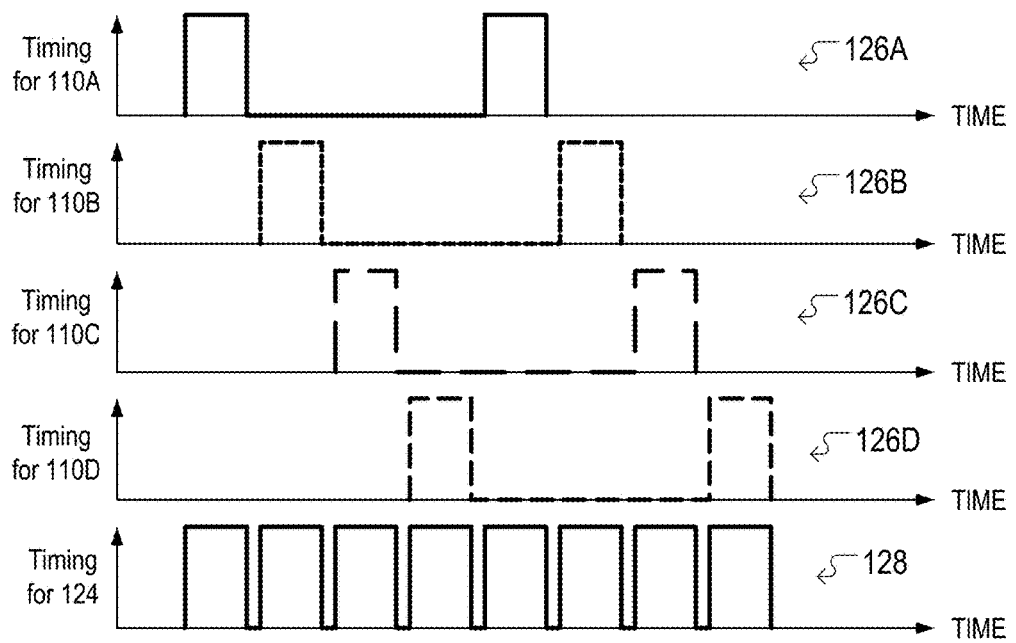
FIG. 1D is an example of a timing diagram used by the displacement measuring system of FIGS. 1A-1C.
Figure 1E:
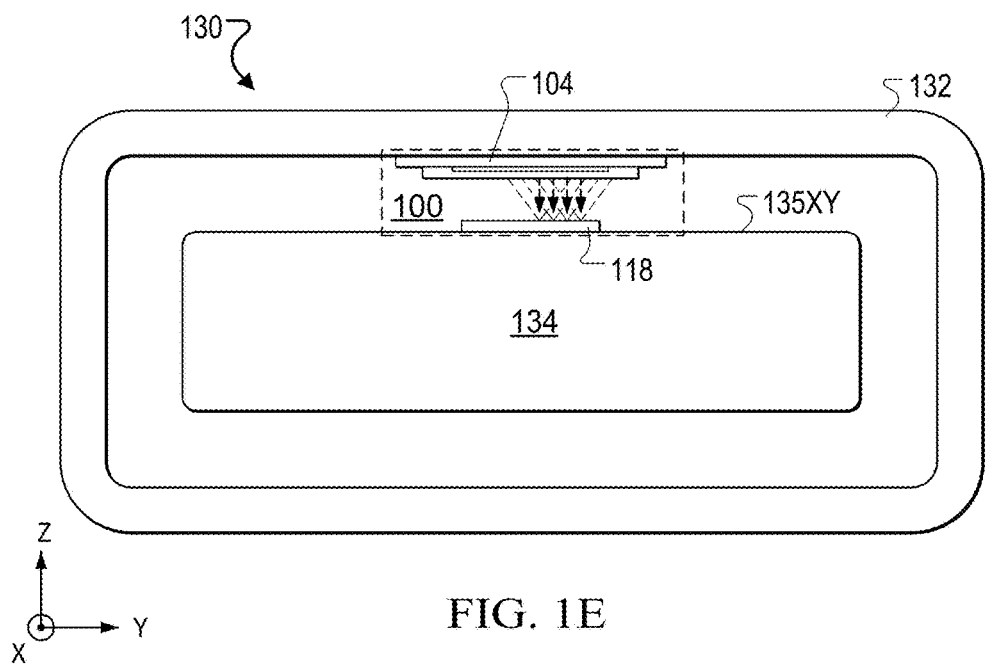
FIGS. 1E-1F shows aspects of a haptic system that uses the displacement measuring system of FIGS. 1A-1C.
Figure 1F:
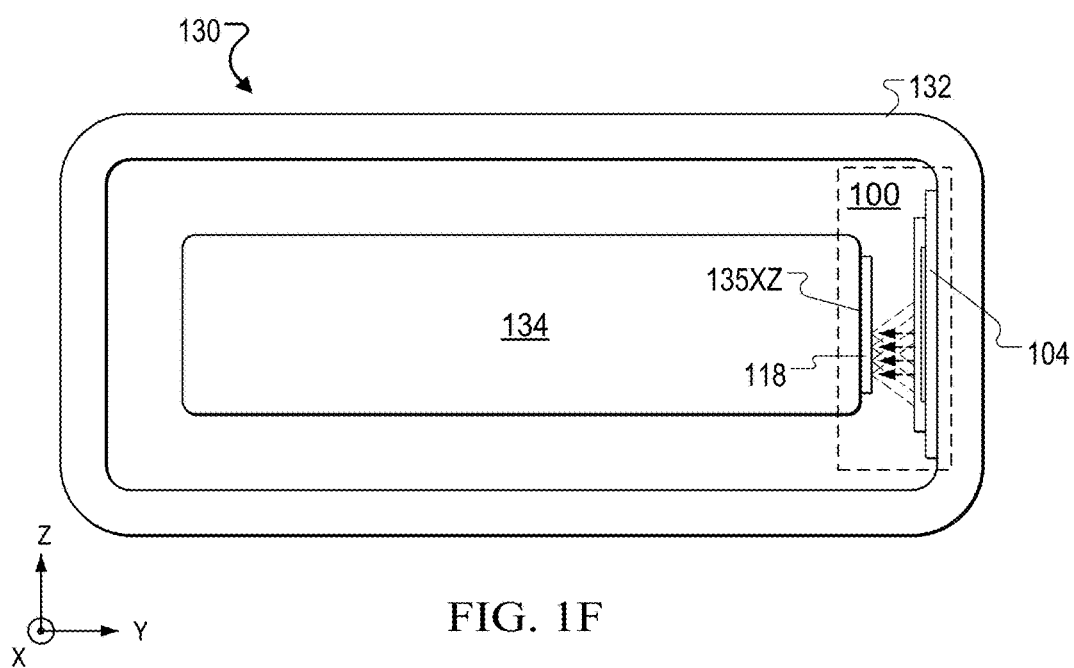

Each LEE array, e.g., LEE array 110A, includes a driving board 112 and a plurality of light emitting elements (LEEs) 114, such that the driving board concurrently powers the LEEs of the LEE array, during operation of the displacement measuring system 100. Note that the LEEs 114 of an LEE array 110 can be arranged in one or more rows parallel to each other. In the example illustrated in FIG. 1C, each LEE array, e.g., LEE array 110A, includes rows 116A, 116B of LEEs 114 distributed along the x-axis. The LEEs 114 in a row 116A or 116B are separated by a pitch δX. Moreover, the rows 116A and 116B are separated from each other along the y-axis by a separation δY, and are staggered relative to each other along the x-axis by half the pitch X. Further, a total size (e.g., length) along the x-axis of an LEE array 110 sets an upper bound MAX ΔX for a displacement along the x-axis that can be measured by the displacement measuring system 100. Furthermore, a total size (e.g., width) along the y-axis of an LEE array 110 sets an upper bound MAX ΔY for a displacement along the y-axis that can be measured by the displacement measuring system 100. Note that a range of translational motion for a mass 134 disposed inside a haptic engine, as described below in connection with FIGS. 1E-1F, is less than 0.6 mm.

Each LEE 114 of the light source 106 is configured to output collimated light, such that the LEE illuminates the optical pattern 118 with a beam 115 that forms a well-defined (e.g., top-hat or Gaussian) beam spot on the optical pattern. In this manner, displacement measurements performed by the displacement measuring system 100 are insensitive to a separation Z-offset between the light source 106 and the optical pattern 118. In some implementations, each LEE 114 includes a light emitting diode (LED) and a collimating optic (e.g., a lens, a compound parabolic concentrator, etc.) optically coupled with the LED. Such an LED emits un-collimated light (e.g., in accordance with a Lambertian distribution), and the collimating optic collimates the emitted light to issue collimated light. In other implementations, each LEE 114 includes a vertical cavity surface emitting laser (VCSEL) that emits collimated light. In this manner, when the LEEs are VCSELs, Z-offset between the light source 106 and the optical pattern 118 can be very short, e.g., in the range of 0.1 mm to 0.5 mm. Moreover, as light emitted by the VCSELs 114 can have wavelengths in a range from 700 nm to 1100 nm, the second portion 122 of the optical pattern 118 can be printed using ink that absorbs IR light.

Additionally, each LEE array 110 is arranged relative to the optical pattern 118 such that its LEEs 114 illuminate with collimated light, during operation of the displacement measuring system 100, the optical pattern 118 across a corresponding corner of the rectangular edge 121, as explained below in this specification. The optical pattern 118 redirects to the photodetector 124, e.g., via reflection or scattering, at least some of the collimated light 115 from an LEE array 110 that impinges on the optical pattern. The photodetector 124 captures the redirected light 119 associated with the LEE array 110 and integrates it. In some implementations, the photodetector 124 can be a CMOS sensor array. In some implementations, the photodetector 124 can be a CCD sensor array.

Moreover, as a result of integrating the captured light, the photodetector 124 issues a photodetector signal relating to the collimated light output by an LEE array 110 that is redirected by the optical pattern 118 to the photodetector. In the example shown in FIGS. 1A and 1C, the photodetector 124 issues a respective photodetector signal relating to the collimated light output by a corresponding one of the LEE arrays 110A, 110B, 110C, 110D, where the issued photodetector signals are multiplexed based on a multiplexing scheme used to illuminate the optical pattern 118.

In some implementations, the LEEs 114 of the LEE arrays 110A, 110B, 110C, 110D emit light of different wavelengths, $\lambda_A, \lambda_B, \lambda_C, \lambda_D$. In this case, the LEEs 114 of the LEE arrays 110A, 110B, 110C, 110D illuminate the optical pattern 118 concurrently, using a wavelength multiplexing scheme. As such, the issued photodetector signals also are wavelength multiplexed. For example, the photodetector 124 can include a set of four sensors $v_1, v_2, v_3, v_4$, each sensor being covered with a filter of different cut-off wavelength to match the wavelengths $\lambda_A, \lambda_B, \lambda_C, \lambda_D$ of light emitted by the LEE arrays 110A, 110B, 110C, 110D. And the signals corresponding to at least some of the wavelengths $\lambda_A, \lambda_B, \lambda_C, \lambda_D$ of the emitted light can be isolated by combining signals output by multiple of the sensors. For example, the first sensor, $v_1$, has a filter that passes wavelengths up to $\lambda_A$ and outputs a first sensor signal $V_1$, the second sensor, $v_2$, has a filter that passes wavelengths up to $\lambda_B$ and outputs a second sensor signal $V_2$, the third sensor, $v_3$, has a filter that passes wavelengths up to $\lambda_C$ and outputs a third sensor signal $V_3$, and the fourth sensor, $v_4$, has a filter that passes wavelengths up to $\lambda_D$ and outputs a fourth sensor signal $V_4$, where $\lambda_A < \lambda_B < \lambda_C < \lambda_D$. Then a first photodetector signal in the band of $\lambda_A$ can be isolated as $V_1$, a second photodetector signal in the band of $\lambda_B$ can be isolated as $(V_2-V_1)$, a third photodetector signal in the band of $\lambda_C$ can be isolated $(V_3-V_2)$, and a fourth photodetector signal in the band of $\lambda_D$ can be isolated as $(V_4-V_3)$. As another example, the first sensor, $v_1$, has a filter that stops wavelengths up to $\lambda_A$ and outputs a first sensor signal $V_1$, the second sensor, $v_2$, has a filter that stops wavelengths up to $\lambda_B$ and outputs a second sensor signal $V_2$, the third sensor, $v_3$, has a filter that stops wavelengths up to $\lambda_C$ and outputs a third sensor signal $V_3$, and the fourth sensor, $v_4$, has a filter that stops wavelengths up to $\lambda_D$ and outputs a fourth sensor signal $V_4$, where $\lambda_A < \lambda_B < \lambda_C < \lambda_D$. Then a first photodetector signal in the band of $\lambda_A$ can be isolated as $(V_1-V_2)$, a second photodetector signal in the band of $\lambda_B$ can be isolated as $(V_2-V_3)$, a third photodetector signal in the band of $\lambda_C$ can be isolated as $(V_3-V_4)$, and a fourth photodetector signal in the band of $\lambda_D$ can be isolated as $V_4$.

In other implementations, the LEEs 114 of the LEE arrays 110A, 110B, 110C, 110D emit light of the same wavelength. In this case, the LEEs 114 of the LEE arrays 110A, 110B, 110C, 110D illuminate the optical pattern 118 concurrently, using a time multiplexing scheme. FIG. 1D is an example of a timing diagram used for time multiplexing the light redirected by the optical pattern 118 to the photodetector 124. As such, light from the LEE array 110A that is redirected by the optical pattern 118 reaches the photodetector 124 in accordance with timing gate 126A; light from the LEE array 110B that is redirected by the optical pattern reaches the photodetector in accordance with timing gate 126B; light from the LEE array 110C that is redirected by the optical pattern reaches the photodetector in accordance with timing gate 126C; and light from the LEE array 110D that is redirected by the optical pattern reaches the photodetector in accordance with timing gate 126D. Note that the timing gates 126A, 126B, 126C, 126D are chosen such that light from the LEE array 110A that is redirected by the optical pattern 118 reaches the photodetector 124 when light from the remaining LEE arrays 110B, 110C, 110D is prevented from reaching the photodetector; light from the LEE array 110B that is redirected by the optical pattern 118 reaches the photodetector when light from the remaining LEE arrays 110A, 110C, 110D is prevented from reaching the photodetector; and so on. As such, the photodetector 124 is said to operate in "shutter mode" because it receives light from only one LEE array 110 at a time. For example, the photodetector 124 can use a timing gate 128 that is synchronized with the timing gates 126A, 126B, 126C, 126D to issue photodetector signals that are time multiplexed.

The processing electronics 125 receive one or more photodetector signals issued by the photodetector 124 and determine displacements of the mass 134 based on corresponding changes in the one or more photodetector signals caused by motion of the mass along, and orthogonal to, a direction of the rows 116 of LEEs 114 of the LEE arrays 110. The specific displacements that are determined by the processing electronics 125 depend on positioning of the displacement measuring system 100 inside a haptic engine 130 that includes the mass 134, as shown in FIGS. 1E-1F. Note that the haptic engine 130 has a frame 132 that encompasses the mass 134 and the displacement measuring system 100.

FIG. 1E is a side view, in the (y,z) plane, of the haptic engine 130, in which the optical pattern 118 of the displacement measuring system 100 is supported by the mass 134 on a surface 135XY parallel to the (x,y) plane, and the mount 104 of the displacement measuring system is supported by the frame 132 on a face parallel to the (x,y) plane. Here, the rows 116 of LEEs 114 of the LEE arrays 110 are oriented along the x-axis. In this case, the processing electronics 125 determine a displacement $\Delta X$ and a displacement $\Delta Y$ of the mass 134 based on corresponding changes in the one or more photodetector signals caused by motion of the mass along the x-axis (e.g., vibration in-and-out of page) and motion of the mass along the y-axis (e.g., vibration left-right on page).

FIG. 1F is a side view, in the (y,z) plane, of the haptic engine 130, in which the optical pattern 118 of the displacement measuring system 100 is supported by the mass 134 on a surface 135XZ parallel to the (x,z) plane, and the mount 104 of the displacement measuring system is supported by the frame 132 on a face parallel to the (x,z) plane. Here, the rows 116 of LEEs 114 of the LEE arrays 110 are oriented along the x-axis. In this case, the processing electronics 125 determine a displacement $\Delta X$ and a displacement $\Delta Z$ of the mass 134 based on corresponding changes in the one or more photodetector signals caused by motion of the mass along the x-axis (e.g., vibration in-and-out of page) and motion of the mass along the z-axis (e.g., vibration up-down on page).

Prior to describing techniques for measuring displacements of the mass 134 using the displacement measuring system 100, techniques for sensing motion of an optical pattern that is illuminated by one or more beams is described next.

Figure 2A:
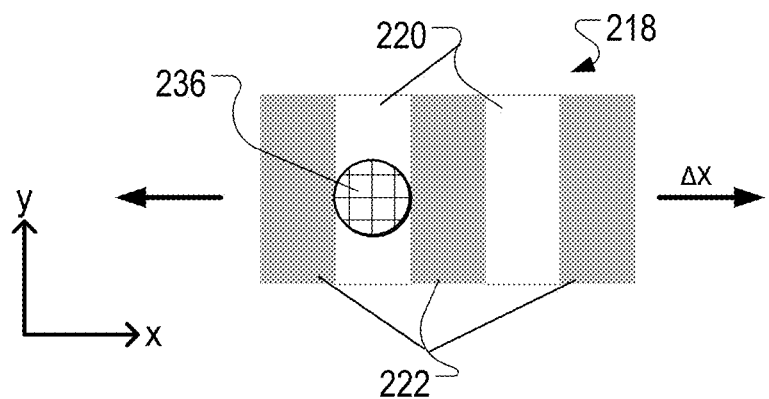
FIGS. 2A-2B show aspects of a technique for measuring displacements of a binary intensity pattern.
Figure 2B:
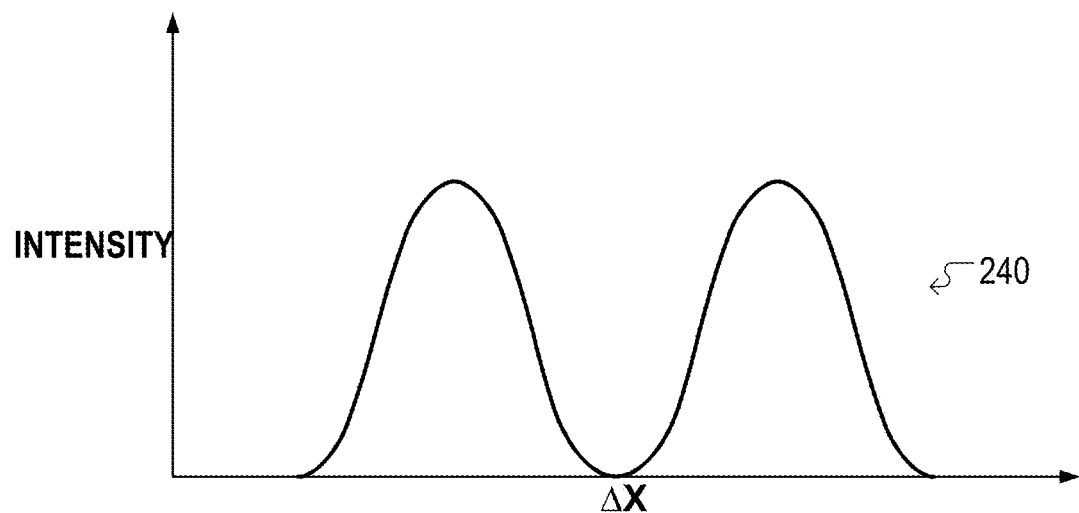

FIG. 2A is a plan view, in the (x,y) plane, of a binary intensity pattern 218 that includes a first portion 220 corresponding to white strips and a second portion 222 corresponding to grey strips, where the stripes extend along the y-axis. A beam spot 236 shows a location where a beam of collimated light (e.g., VCSEL light) illuminates the binary intensity pattern 218. Note that in this example, a size of the beam spot 236 is about equal to a width of a strip along the x-axis. Here, the first portion 220 has a first reflectivity $R_1$, and the second portion 222 has a second reflectivity $R_2$, smaller than the first reflectivity. In this manner, as the binary intensity pattern 218 is translated along the x-axis through the beam spot 236, the beam reflects off with a first intensity when it illuminates the first portion 220, and a second intensity, smaller than the first intensity, when it illuminates the second portion 222. A photodetector, to which the reflected beam is reflected, issues a photodetector signal 240 proportional to the intensity of the reflected beam. Translation of the binary intensity pattern 218 along the x-axis through the beam spot 236, causes changes of the photodetector signal 240. FIG. 2B shows changes of the photodetector signal 240 as a function of displacement $\Delta X$ of a datum of the binary intensity pattern 218 relative to the beam spot 236.

Figure 3A:
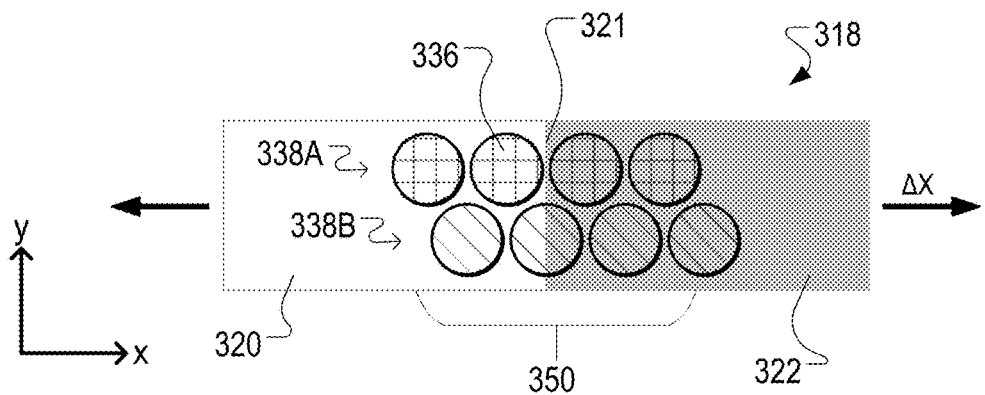
FIGS. 3A-3C show aspects of a technique for measuring displacements of a binary intensity pattern in a single-ended manner.
Figure 3B:
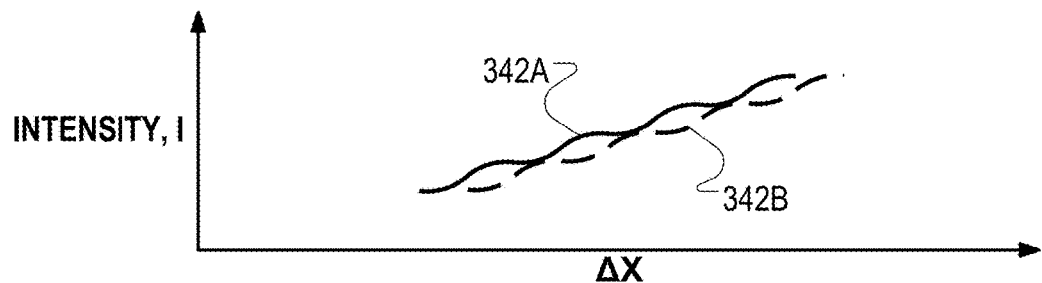
Figure 3C:
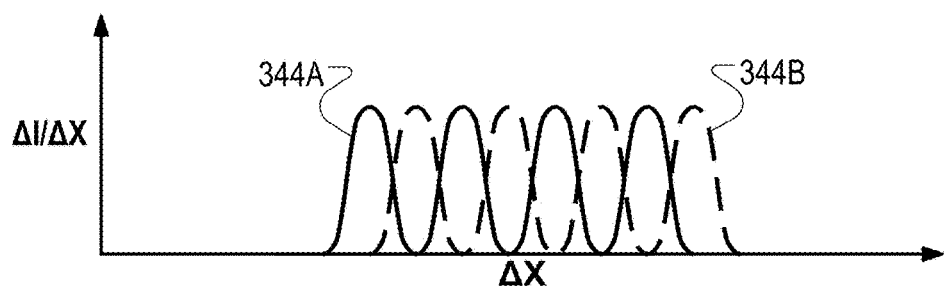

FIGS. 3A-3C show aspects relating to a displacement measurement technique that has a sensitivity free of deadzones. FIG. 3A is a plan view, in the (x,y) plane, of a binary intensity pattern 318 that has two portions 320, 322 that form an edge 321 parallel to the y-axis. A plurality of beam spots 336 show locations where respective beams of collimated light (e.g., VCSEL light) illuminate the binary intensity pattern 318. The beam spots 336 have equal sizes, so the associated beams that illuminate the binary intensity pattern 318 have the same intensity. The first portion 320 (shown in white) has a first reflectivity $R_1$, and the second portion 322 (shown in grey) has a second reflectivity $R_2$, smaller than the first reflectivity. In this manner, a beam associated with a beam spot located on the first portion 320 reflects off with a first intensity, and a beam associated with a beam spot located on the second portion 322 reflects off with a second intensity, smaller than the first intensity.

Half of the beam spots 336 are arranged in a first row 338A and the other half of the beam spots are arranged in a second row 338B, where the rows 338A, 338B are parallel to each other and the x-axis. An in-row pitch of the beam spots 336 within a row 338A or 338B is in a range of 1 to 1.5 of a beam spot size. The rows 338A, 338B are staggered with respect to each other along the x-axis by half the in-row pitch, and are separated from each other along the y-axis by an inter-row pitch in a range of 0.8 to 1 of the beam spot size.

A first group of beams associated with the beam spots 336 of the first row 338A is referred to as a first macro-beam 338A, and a second group of beams associated with the beam spots 336 of the second row 338B is referred to as a second macro-beam 338B. Note that the macro-beams 338A, 338B can be turned ON/OFF in a time multiplexed manner, i.e., when the first macro-beam 338A illuminates the binary intensity pattern 318, the second macro-beam 338B does not do so; and when the second macro-beam 338B illuminates the binary intensity pattern 318, the first macro-beam 338A does not do so. The binary intensity pattern 318 reflects the first macro-beam 338A (or second macro-beam 338B) to a photodetector. The photodetector captures the reflected first macro-beam 338A (or reflected second macro-beam 338B), and integrates it. As a result of integrating the captured light, the photodetector issues a first photodetector signal 342A (or second photodetector signal 342B) proportional to the intensity of the reflected first macro-beam 338A (or reflected second macro-beam 338B). In other words, the first photodetector signal 342A (or second photodetector signal 342B) is proportional to cumulative intensity of the reflected beams of the first macro-beam 338A (or second macro-beam 338B).

Translation of the binary intensity pattern 318 along the x-axis through the first macro-beam 338A (or second macro-beam 338B), causes changes of the first photodetector signal 342A (or second photodetector signal 342B). FIG. 3B shows changes of the first photodetector signal 342A (or second photodetector signal 342B) as a function of displacement ΔX of the edge 321 of the binary intensity pattern 318 relative to the first macro-beam 338A (or second macro-beam 338B). For instance, as beams of the first macro-beam 338A (or second macro-beam 338B) transition over the edge 321, from the second portion 322 to the first portion 320, the intensity of the reflected first macro-beam 338A (or reflected second macro-beam 338B) increases, and so does the first photodetector signal 342A (or second photodetector signal 342B), as shown in FIG. 3B. In this manner, the maximum measurable displacement MAX ΔX of the edge 321 of the binary intensity pattern 318 relative to the first macro-beam 338A (or second macro-beam 338B) is substantially equal to the length of the first macro-beam 338A (or second macro-beam 338B) along the x-axis.

FIG. 3C shows a gradient 344A of the first photodetector signal 342A (or gradient 344B of the second photodetector signal 342B). Note that each peak/valley pair of the gradient 344A (or gradient 344B) corresponds to a crossing of the edge 321 through another beam of the first macro-beam 338A (or second macro-beam 338B) as the binary intensity pattern 318 is translated along the x-axis. The resolution of this displacement measurement is given by a spot size of beam spot 336. For instance, spot size for a VCSEL beam can be less than 10 µm. By counting, from the gradient 344A of the first photodetector signal 342A (or gradient 344B of the second photodetector signal 342B), the number of beam spot crossings over the edge 321, one can determine an accurate value of the absolute displacement ΔX. This can be used as an optical ruler to calibrate absolute displacement for a known spot size of the beam spot 336.

Note that dead-zones in the sensitivity of the foregoing displacement measurement occur when the edge 321 of the binary intensity pattern 318 is between beams of the first macro-beam 338A (or second macro-beam 338B), for values of the gradient 344A of the first photodetector signal 342A (or gradient 344B of the second photodetector signal 342B) equal to zero (ΔI/ΔX=0). To avoid the foregoing dead-zones, the multiplexed first photodetector signal 342A and second photodetector signal 342B can be combined together, e.g., by averaging or interpolating them together, to obtain a smooth photodetector signal. The combining together of the first photodetector signal 342A and second photodetector signal 342B can be can be accomplished by activating, at the same time, both the first macro-beam 338A and the second macro-beam 338B. In this manner, the measurement of the displacement ΔX is performed using a single macro-beam 350 that includes both rows 338A and 338B of beams, as explained below in this specification.

Figure 4A:
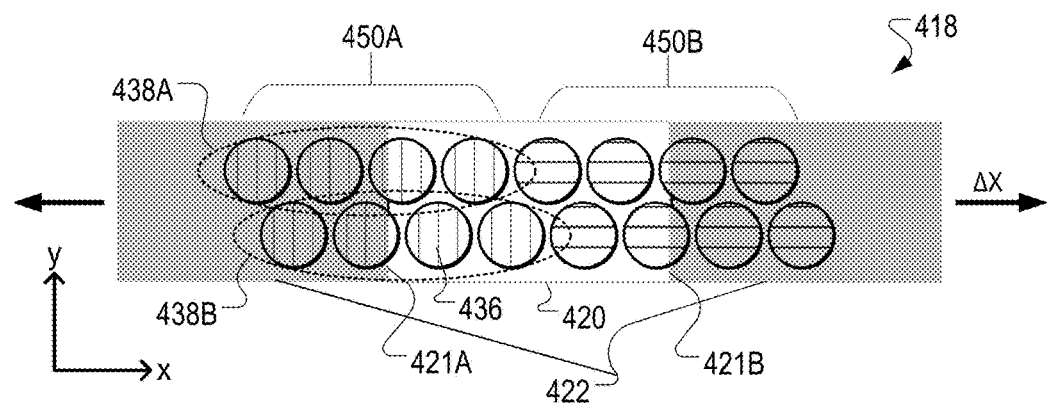
FIGS. 4A-4C show aspects of show aspects of another technique for measuring displacements of a binary intensity pattern in a differential manner.
Figure 4B:
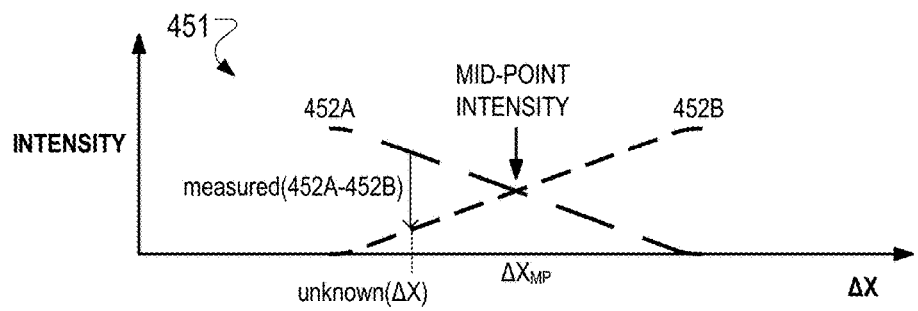
Figure 4C:
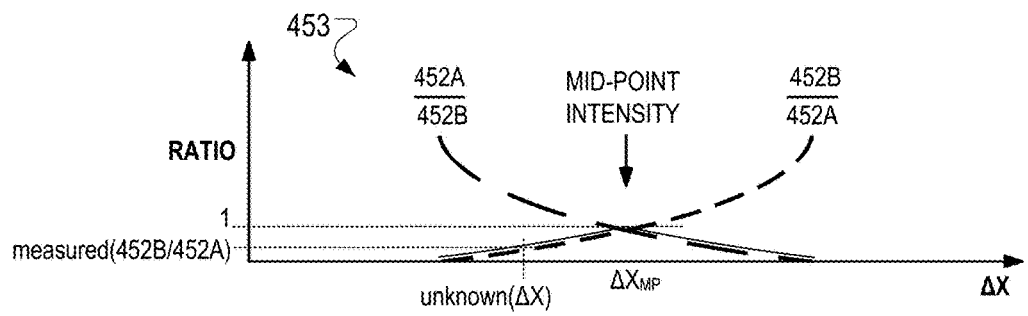

FIGS. 4A-4C show aspects relating to a differential sensing mode of a displacement measurement technique. FIG. 4A is a plan view, in the (x,y) plane, of a binary intensity pattern 418 that has a first portion 420 (shown in white) and a second portion 422 (shown in grey), the two portions forming a first edge 421A and a second edge 421B that are parallel to each other and the y-axis. A plurality of beam spots 436 show locations where respective beams of collimated light (e.g., VCSEL light) illuminate the binary intensity pattern 418. The beam spots 436 have equal sizes, so the associated beams that illuminate the binary intensity pattern 418 have the same intensity. The first portion 420 has a first reflectivity $R_1$, and the second portion 422 has a second reflectivity $R_2$, smaller than the first reflectivity. In this manner, a beam associated with a beam spot located on the first portion 420 reflects off with a first intensity, and a beam associated with a beam spot located on the second portion 422 reflects off with a second intensity, smaller than the first intensity.

A first group of beams associated with half of the beam spots 436 is referred to as a first macro-beam 450A, and a second group of beams associated with the other half of the beam spots 436 is referred to as a second macro-beam 450B. The beam spots 436 of the first macro-beam 450A (or second macro-beam 450B) are arranged in two rows 438A, 438B that are parallel to each other and the x-axis. An in-row pitch of the beam spots 436 within a row 438A (or 438B) is in a range of 1 to 1.5 of a beam spot size. The rows 438A, 438B are staggered with respect to each other along the x-axis by half the in-row pitch, and are separated from each other along the y-axis by an inter-row pitch in a range of 0.8 to 1 of the beam spot size. A length of the macro-beams 450A, 450B along the x-axis is about equal to a separation between the first edge 421A and the second edge 421B of the binary intensity pattern 418. In this manner, for any displacement ΔX of the binary intensity pattern 418 relative to the macro-beams 450A, 450B that is smaller than a maximum measurable displacement MAX ΔX, if the first macro-beam 450A illuminates the binary intensity pattern across the first edge 421A, then the second macro-beam 450B illuminates the binary intensity pattern across the second edge 421B.

Note that the macro-beams 450A, 450B are turned ON/OFF in a time multiplexed manner, i.e., when the first macro-beam 450A illuminates the binary intensity pattern 418, the second macro-beam 450B does not do so; and when the second macro-beam 450B illuminates the binary intensity pattern 418, the first macro-beam 450A does not do so. The binary intensity pattern 418 reflects the first macro-beam 450A and the second macro-beam 450B to a photodetector. The photodetector sequentially captures (in a time multiplexed manner) the reflected first macro-beam 450A and the reflected second macro-beam 450B, and separately integrates them. As a result of integrating the captured light, the photodetector issues a first photodetector signal 452A and a second photodetector signal 452B respectively proportional to the intensity of the reflected first macro-beam 450A and the intensity of the reflected second macro-beam 450B. In other words, the first photodetector signal 452A is proportional to cumulative intensity of the reflected beams of the first macro-beam 450A, and the second photodetector signal 452B is proportional to cumulative intensity of the reflected beams of the second macro-beam 450B).

Translation of the binary intensity pattern 418 along the x-axis through the first macro-beam 450A and the second macro-beam 450B, causes changes of the first photodetector signal 452A and changes of the second photodetector signal 452B. FIG. 4B is a graph 451 which shows changes of the first photodetector signal 452A and changes of the second photodetector signal 452B as a function of displacement ΔX of a datum of the binary intensity pattern 418 relative to the first macro-beam 450A and the second macro-beam 450B. The datum of the binary intensity pattern 418 can be either one of the first edge 421A or the second edge 421B, for instance. Here, when the binary intensity pattern 418 is translated from left-to-right on page, the following occurs: (1) As beams of the first macro-beam 450A transition over the first edge 421A, from the first portion 420 to the second portion 422, the intensity of the reflected first macro-beam 450A decreases, and so does the first photodetector signal 452A; and (2), as beams of the second macro-beam 450B transition over the second edge 421B, from the second portion 422 to the first portion 420, the intensity of the reflected second macro-beam 450B increases, and so does the second photodetector signal 452B. Here, the first photodetector signal 452A and the second photodetector signal 452B have the same value, referred to as mid-point intensity, at a mid-point displacement $\Delta X_{MP}$.

In this manner, displacement $\Delta X$ of the binary intensity pattern 418 along the x-axis through the first macro-beam 450A and the second macro-beam 450B can be determined in a differential manner, as follows. A value of the first photodetector signal 452A and a value of the second photodetector signal 452B is measured for an unknown displacement $\Delta X$. A difference between the measured value of the first photodetector signal 452A and the measured value of the second photodetector signal 452B is determined. Then, a value of the unknown displacement $\Delta X$ is uniquely obtained by mapping the determined difference value onto graph 451. Note that when the determined difference value is positive, the mapping is performed for displacements that satisfy $\Delta X<\Delta X_{MP}$, and when the determined difference value is negative, the mapping is performed for displacements that satisfy $\Delta X>\Delta X_{MP}$. In some implementations, the foregoing differential displacement measurement can be performed by the processing electronics 125 of the displacement measuring system 100.

Note that the mid-point intensity value depends on a Z-offset between a light source (e.g., a portion of the light source 106 of the displacement measuring system 100) that provides the macro-beams 450A, 450B and the binary intensity pattern 418 (e.g., the optical pattern 118 of the displacement measuring system 100). For example, the mid-point intensity value is large for a small Z-offset and small for a large Z-offset. In this manner, displacements $\Delta Z$ along the z-axis of the binary intensity pattern 418 relative the light source can be determined based on changes of the mid-point intensity value.

Sensitivities of the differential displacement measurement—described above in connection with FIG. 4B—due to drift in absolute light intensity, caused by variations in temperature, Z-offset, VCSEL bias, etc., can be avoided by performing a displacement measurement in a ratiometric mode. A first ratio signal 452A/452B is obtained by dividing the first photodetector signal 452A to the second photodetector signal 452B, and a second ratio signal 452B/452A is obtained by dividing the second photodetector signal 452B to the first photodetector signal 452A. FIG. 4C is a graph 453 which shows changes of the first ratio signal 452A/452B and changes of the second ratio signal 452B/452A as a function of displacement $\Delta X$ of the datum of the binary intensity pattern 418 relative to the first macro-beam 450A and the second macro-beam 450B. Here, the first ratio signal 452A/452B and the first ratio signal 452A/452B are both equal to one at a mid-point displacement $\Delta X_{MP}$, where the latter corresponding to the mid-point intensity.

Displacement $\Delta X$ of the binary intensity pattern 418 along the x-axis through the first macro-beam 450A and the second macro-beam 450B can be determined in a ratiometric manner, as follows. A value of the first photodetector signal 452A and a value of the second photodetector signal 452B is measured for an unknown displacement $\Delta X$. A first ratio of the measured value of the first photodetector signal 452A to the measured value of the second photodetector signal 452B, and a second ratio of the measured value of the second photodetector signal 452B to the measured value of the first photodetector signal 452A are obtained. A smaller of the obtained first ratio and second ratio is selected, and then, a value of the unknown displacement $\Delta X$ is determined by mapping, in graph 453, the selected first ratio or second ratio onto the corresponding first ratio signal 452A/452B or second ratio signal 452B/452A. For the example illustrated in FIG. 4C, the obtained second ratio is smaller than the obtained first ratio, so the obtained second ratio is mapped, in graph 453, onto the second ratio signal 452B/452A, for displacements that satisfy $\Delta X<\Delta X_{MP}$. As another example, if the obtained first ratio were smaller than the obtained second ratio, then the obtained first ratio would be mapped, in graph 453, onto the first ratio signal 452A/452B, for displacements that satisfy $\Delta X>\Delta X_{MP}$. Note that, by switching between the first ratio signal 452A/452B and the second ratio signal 452B/452A when the mid-point is crossed, divide-by-zero problem can be avoided. In other words, the second ratio signal 452B/452A is used for determining small displacements $\Delta X$, and the first ratio signal 452A/452B is used for sensing large displacements $\Delta X$. In some implementations, the foregoing ratiometric displacement measurement can be performed by the processing electronics 125 of the displacement measuring system 100.

Figure 5A:
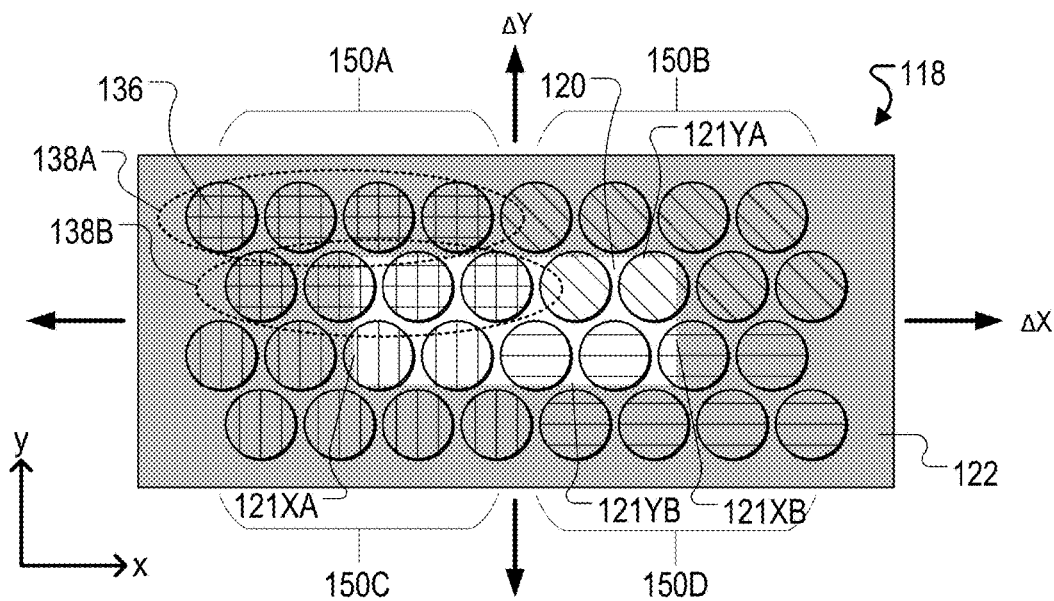
FIGS. 5A-5C show aspects of a differential measurement used by the displacement measuring system of FIGS. 1A-1C.
Figure 5B:
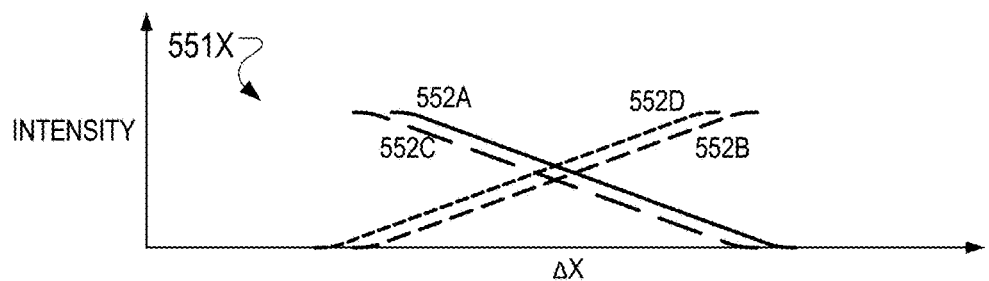
Figure 5C:
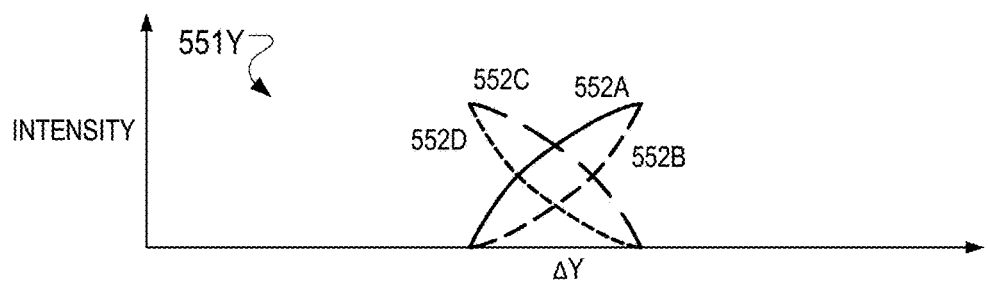

FIGS. 5A-5C are used to explain techniques for measuring displacements of the mass 134 using the displacement measuring system 100 that was described above in connection with FIGS. 1A-1D. FIG. 5A is a plan view, in the (x,y) plane, of the optical pattern 118 described above in connection with FIG. 1B. Note that the rectangular edge 121 of the optical pattern 118 is formed from two edges 121XA, 121XB parallel to the y-axis, and two edges 121YA, 121YB parallel to the x-axis. A plurality of beam spots 136 show locations where respective beams of collimated light—output by LEEs 114 of light source 106—illuminate the optical pattern 118. The beam spots 136 have equal sizes, so the associated beams—output by LEEs 114 of light source 106—that illuminate the optical pattern 118 have the same intensity.

A first group of beams—that form some of the beam spots 136 and are output by the LEEs 114 of the first LEE array 110A—is referred to as a first macro-beam 150A, a second group of beams—that form some other of the beam spots 136 and are output by the LEEs of the second LEE array 110B—is referred to as a second macro-beam 150B, a third group of beams—that form yet some other of the beam spots 136 and are output by the LEEs of the third LEE array 110C—is referred to as a third macro-beam 150C, and a fourth group of beams—that form yet some other of the beam spots 136 and are output by the LEEs of the fourth LEE array 110D—is referred to as a fourth macro-beam 150D. The beam spots 136 of the first macro-beam 150A (or any other macro-beam 150B, 150C, 150D) are arranged in two rows 138A, 138B that are parallel to each other and the x-axis. The beams that form the beam spots 136 of the rows 138A, 138B relating to any of the macro-beams 150A, 150B, 150C or 150D are output by the LEEs 114 of the corresponding rows 116A, 166B.

An in-row pitch of the beam spots 136 within a row 138A (or 138B) is in a range of 1 to 1.5 of a beam spot size and is related to the pitch δX of the LEEs 114 within a row 116A (or 116B) of LEEs 114. The rows 138A, 138B of beam spots 136 are staggered with respect to each other along the x-axis by half the in-row pitch, as are the rows 116A, 116B of LEEs 114. Additionally, the rows 138A, 138B of beam spots 136 are separated from each other along the y-axis by an inter-row pitch—in a range of 0.8 to 1 of the beam spot size—that is related to the separation δY between the rows 116A, 116B of LEEs 114.

A length of a macro-beam 150 along the x-axis—which relates to a length of a corresponding LEE array 110—is about equal to a separation between the edges 121XA, 121XB that are parallel to the y-axis. In this manner, for any displacement ΔX of the optical pattern 118 relative to the macro-beams 150A, 150B, 150C or 150D that is smaller than a maximum measurable displacement MAX ΔX, if the first macro-beam 150A (or third macro-beam 150C) illuminates the optical pattern across the first edge 121XA parallel to the y-axis, then the second macro-beam 150B (or fourth macro-beam 150D) illuminates the binary intensity pattern across the second edge 121XB parallel to the y-axis. Additionally, a width of a macro-beam 150 along the y-axis—which relates to a width of a corresponding LEE array 110—is about equal to a separation between the edges 121YA, 121YB that are parallel to the x-axis. In this manner, for any displacement ΔY of the optical pattern 118 relative to the macro-beams 150A, 150B, 150C or 150D that is smaller than a maximum measurable displacement MAX ΔY, if the first macro-beam 150A (or second macro-beam 150B) illuminates the optical pattern across the first edge 121YA parallel to the x-axis, then the third macro-beam 150C (or fourth macro-beam 150D) illuminates the binary intensity pattern across the second edge 121YB parallel to the x-axis.

Note that the macro-beams 150A, 150B, 150C, 150D are turned ON/OFF in a time multiplexed manner based on the timing gates 126A, 126B, 126C, 126D shown in FIG. 1D. In this manner, when the first macro-beam 150A illuminates the optical pattern 118, the macro-beams 150B, 150C, 150D do not do so; when the second macro-beam 150B illuminates the optical pattern 118, the macro-beams 150A, 150C, 150D do not do so; and so on. The optical pattern 118 reflects the macro-beams 150A, 150B, 150C, 150D to the photodetector 124. The photodetector 124 sequentially captures (in a time multiplexed manner based on the timing gate 128 shown in FIG. 1D) the reflected macro-beams 150A, 150B, 150C, 150D, and separately integrates them. As a result of integrating the captured light, the photodetector 124 issues a first photodetector signal 552A, a second photodetector signal 552B, a third photodetector signal 552C and a fourth photodetector signal 552D respectively proportional to the intensity of the reflected first macro-beam 150A, the intensity of the reflected second macro-beam 150B, the intensity of the reflected third macro-beam 150C and the intensity of the reflected fourth macro-beam 150D.

Translation of the optical pattern 118 along the x-axis through the macro-beams 150A, 150B, 150C, 150D, causes changes of the first photodetector signal 552A, changes of the second photodetector signal 552B, changes of the third photodetector signal 552C and changes of the fourth photodetector signal 552D. FIG. 5B is a graph 551X which shows changes of the first photodetector signal 552A, changes of the second photodetector signal 552B, changes of the third photodetector signal 552C and changes of the fourth photodetector signal 552D as a function of displacement ΔX of a datum of the optical pattern 118 relative to the macro-beams 150A, 150B, 150C, 150D. The datum of the optical pattern 418 can be either one of the corners of the rectangular edge 121, for instance. Here, when the optical pattern 118 is translated from left-to-right on page without being translated up-or-down on page, the following occurs: (1) As beams of the first macro-beam 150A and beams of the third macro-beam 150C transition over the first edge 121XA parallel to the x-axis, from the first portion 120 to the second portion 122, the intensity of each of the reflected first macro-beam 150A and the reflected third macro-beam 150C decreases, and so does each of the respective first photodetector signal 552A and the third photodetector signal 552C; and (2) as beams of the second macro-beam 150B and beams of the fourth macro-beam 150D transition over the second edge 121XB parallel to the y-axis, from the second portion 122 to the first portion 120, the intensity of each of the reflected second macro-beam 150B and the reflected fourth macro-beam 150D increases, and so does each of the respective second photodetector signal 552B and the fourth photodetector signal 552D.

As such, displacement ΔX of the optical pattern 118 along the x-axis through the macro-beams 150A, 150B, 150C, 150D can be determined in any one or more of the following manners. For example, a differential displacement measurement along the x-axis using (i) first photodetector signal 552A and (ii) second photodetector signal 552B can be performed similarly to the differential displacement measurement along the x-axis using (i) the first photodetector signal 452A and (ii) the second photodetector signal 452B, as described above in connection with FIG. 4B. As another example, a differential displacement measurement along the x-axis using (i) third photodetector signal 552C and (ii) fourth photodetector signal 552D can be performed similarly to the differential displacement measurement along the x-axis using (i) the first photodetector signal 452A and (ii) the second photodetector signal 452B, as described above in connection with FIG. 4B. As yet another example, a differential displacement measurement along the x-axis using (i) a combination (e.g., an average, or interpolation) of first photodetector signal 552A and third photodetector signal 552C and (ii) a combination (e.g., an average, or interpolation) of second photodetector signal 552B and fourth photodetector signal 552D can be performed similarly to the differential displacement measurement along the x-axis using (i) the first photodetector signal 452A and (ii) the second photodetector signal 452B, as described above in connection with FIG. 4B.

Moreover, translation of the optical pattern 118 along the y-axis through the macro-beams 150A, 150B, 150C, 150D, causes changes of the first photodetector signal 552A, changes of the second photodetector signal 552B, changes of the third photodetector signal 552C and changes of the fourth photodetector signal 552D. FIG. 5C is a graph 551Y which shows changes of the first photodetector signal 552A, changes of the second photodetector signal 552B, changes of the third photodetector signal 552C and changes of the fourth photodetector signal 552D as a function of displacement ΔY of the datum of the optical pattern 118 relative to the macro-beams 150A, 150B, 150C, 150D. Here, when the optical pattern 118 is translated from bottom-to-top on page without being translated left-or-right on page, the following occurs: (1) As beams of the first macro-beam 150A and beams of the second macro-beam 150B transition over the first edge 121YA parallel to the x-axis, from the second portion 122 to the first portion 120, the intensity of each of the reflected first macro-beam 150A and the reflected second macro-beam 150B increases, and so does each of the respective first photodetector signal 552A and the second photodetector signal 552B; and (2) as beams of the third macro-beam 150C and beams of the fourth macro-beam 150D transition over the second edge 121YB parallel to the x-axis, from the first portion 120 to the second portion 122, the intensity of each of the reflected third macro-beam 150C and the reflected fourth macro-beam 150D decreases, and so does each of the respective third photodetector signal 552C and the fourth photodetector signal 552D. With the exception of aspect ratio, notice the symmetry between X and Y axes when comparing FIGS. 5B and 5C.

As such, displacement ΔY of the optical pattern 118 along the y-axis through the macro-beams 150A, 150B, 150C, 150D can be determined in any one or more of the following manners. For example, a differential displacement measurement along the y-axis using (i) first photodetector signal 552A and (ii) third photodetector signal 552C can be performed similarly to the differential displacement measurement along the x-axis using (i) the first photodetector signal 452A and (ii) the second photodetector signal 452B, as described above in connection with FIG. 4B. As another example, a differential displacement measurement along the y-axis using (i) second photodetector signal 552B and (ii) fourth photodetector signal 552D can be performed similarly to the differential displacement measurement along the x-axis using (i) the first photodetector signal 452A and (ii) the second photodetector signal 452B, as described above in connection with FIG. 4B. As yet another example, a differential displacement measurement along the y-axis using (i) a combination (e.g., an average, or interpolation) of first photodetector signal 552A and second photodetector signal 552B and (ii) a combination (e.g., an average, or interpolation) of third photodetector signal 552C and fourth photodetector signal 552D can be performed similarly to the differential displacement measurement along the x-axis using (i) the first photodetector signal 452A and (ii) the second photodetector signal 452B, as described above in connection with FIG. 4B.

Note that, when the macro-beams 150A, 150B, 150C, 150D are concurrently output by the respective LEE arrays 110A, 110B, 110C, 110D of the optical source 106, i.e., without using time multiplexing, then a photodetector signal should have a constant value, regardless of whether the optical pattern 118 is at rest or it is translated in the (x,y) plane. As any deviation from this would be caused by irregularities (e.g., damage of, dust particles on, etc. a surface) of the optical pattern 118, a self-health-check can be performed by translating the optical pattern 118 over its full range of motion, e.g., MAX ΔX, while the LEE arrays 110A, 110B, 110C, 110D are activated concurrently.

Moreover, a saturation point of the intensity of the light reflected by the optical pattern 118 depends on physical dimensions of the optical pattern and of LEE arrays 110A, 110B, 110C, 110D. For example, the saturation point (i.e., the maximum level of a photodetector signal) can be determined for (i) a given geometry and size of the optical pattern 118, (ii) a given geometry and size of the LEE arrays 110A, 110B, 110C, 110D, (iii) a given arrangement of the optical pattern relative to the LEE arrays, e.g., Z-offset or another offset in the (x,y) plane, etc. Once determined, the saturation point can be used as a self-calibration reference.

Figure 6A:
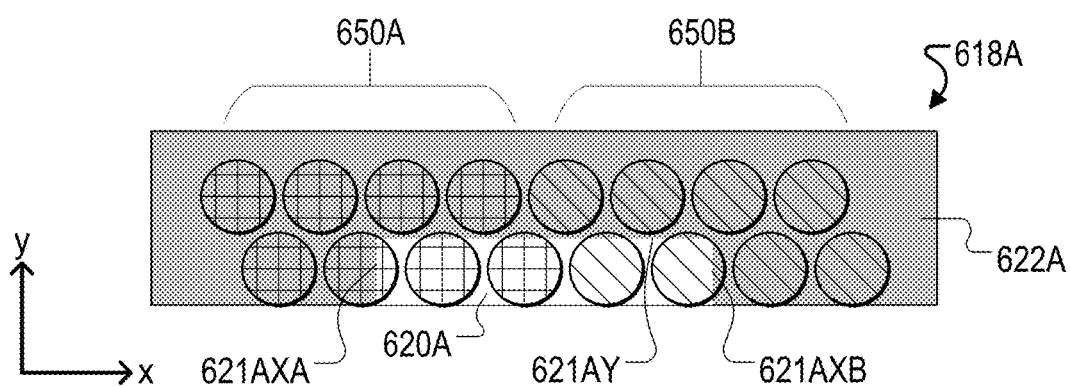
FIGS. 6A-6B show aspects of a technique for measuring displacements of a binary intensity pattern in a combined single-ended and differential manner.
Figure 6B:
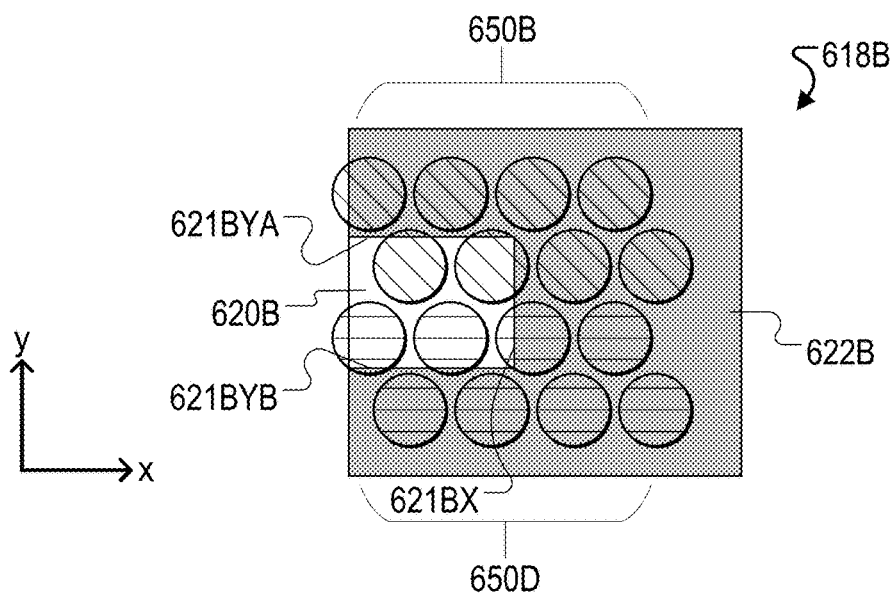

FIGS. 6A-6B show that when the area inside a haptic engine 130 and/or cost of the haptic engine is a restriction, the number of LEE arrays and an area of the optical pattern 118 can be halved if differential sensing is not needed in one of two directions. In the example shown in FIG. 6A, a modification of the displacement measuring system 100 includes LEE arrays 110A, 110B and an optical pattern 618A. The optical pattern 618A corresponds to the top half of the optical pattern 118 described above in connection with FIG. 1B and includes two portions 620A, 622A that form an edge 621AY parallel to the x-axis and two edges 621AXA, 621AXB parallel to the y-axis. The first LEE array 110A provides a first macro-beam 650A that crosses the first edge 621AXA parallel to the y-axis and the edge 621AY parallel to the x-axis; and the second LEE array 110B provides a second macro-beam 650B that crosses the second edge 621AXB parallel to the y-axis and the edge 621AY parallel to the x-axis. In this configuration, the modified displacement measuring system can be used to perform (i) a differential displacement measurement along the x-axis to accurately determine a value of a displacement ΔX, and (ii) a single-ended displacement measurement along the y-axis to only determine whether there is motion along the y-axis. Here, the differential displacement measurement along the x-axis based on the first macro-beam 650A transitioning over the first edge 621AXA parallel to the y-axis and the second macro-beam 650B transitioning over the second edge 621AXB parallel to the y-axis is performed similarly to the differential displacement measurement along the x-axis based on the first macro-beam 150A transitioning over the first edge 121XA parallel to the y-axis and the second macro-beam 150B transitioning over the second edge 121XB parallel to the y-axis, as described above in connection with FIGS. 5A-5B. Additionally, the single-ended displacement measurement along the y-axis based on either the first macro-beam 650A or the second macro-beam 650B or both transitioning over the edge 121AY is performed similarly to the single-ended displacement measurement along the x-axis based on either the first macro-beam 338A or the second macro-beam 338B or both transitioning over the edge 321, as described above in connection with FIGS. 3A-3B.

In the example shown in FIG. 6B, another modification of the displacement measuring system 100 includes LEE arrays 110B, 110D and an optical pattern 618B. The optical pattern 618B corresponds to the right half of the optical pattern 118 described above in connection with FIG. 1B and includes two portions 620B, 622B that form an edge 621BX parallel to the y-axis and two edges 621BYA, 621BYB parallel to the x-axis. The first LEE array 110B provides a first macro-beam 650B that crosses the first edge 621BYA parallel to the x-axis and the edge 621BX parallel to the y-axis; and the second LEE array 110D provides a second macro-beam 650D that crosses the second edge 621BYB parallel to the x-axis and the edge 621BX parallel to the y-axis. In this configuration, the modified displacement measuring system can be used to perform (i) a differential displacement measurement along the y-axis to accurately determine a value of a displacement ΔY, and (ii) a single-ended displacement measurement along the x-axis to only determine whether there is motion along the x-axis. Here, the differential displacement measurement along the y-axis based on the first macro-beam 650B transitioning over the first edge 621BYA parallel to the x-axis and the second macro-beam 650D transitioning over the second edge 621BYB parallel to the x-axis is performed similarly to the differential displacement measurement along the y-axis based on the second macro-beam 150B transitioning over the first edge 121YA parallel to the x-axis and the fourth macro-beam 150D transitioning over the second edge 121YB parallel to the x-axis, as described above in connection with FIG. 5A and FIG. 5C. Additionally, the single-ended displacement measurement along the x-axis based on either the first macro-beam 650B or the second macro-beam 650D or both transitioning over the edge 121BX is performed similarly to the single-ended displacement measurement along the x-axis based on either the first macro-beam 338A or the second macro-beam 338B or both transitioning over the edge 321, as described above in connection with FIGS. 3A-3B.

Additionally, the disclosed displacement measuring system 100 can be further modified to also determine angular displacements. Such an angular displacement measuring system can be used in conjunction with a crown of a watch device (e.g., a setting wheel that functions as a switch, as it translates sideways, and as a scroller, as it rotates around a center axis), a wheel of a pointing device, a rotating hinge for a screen of a laptop computer, etc.

Figure 7A:
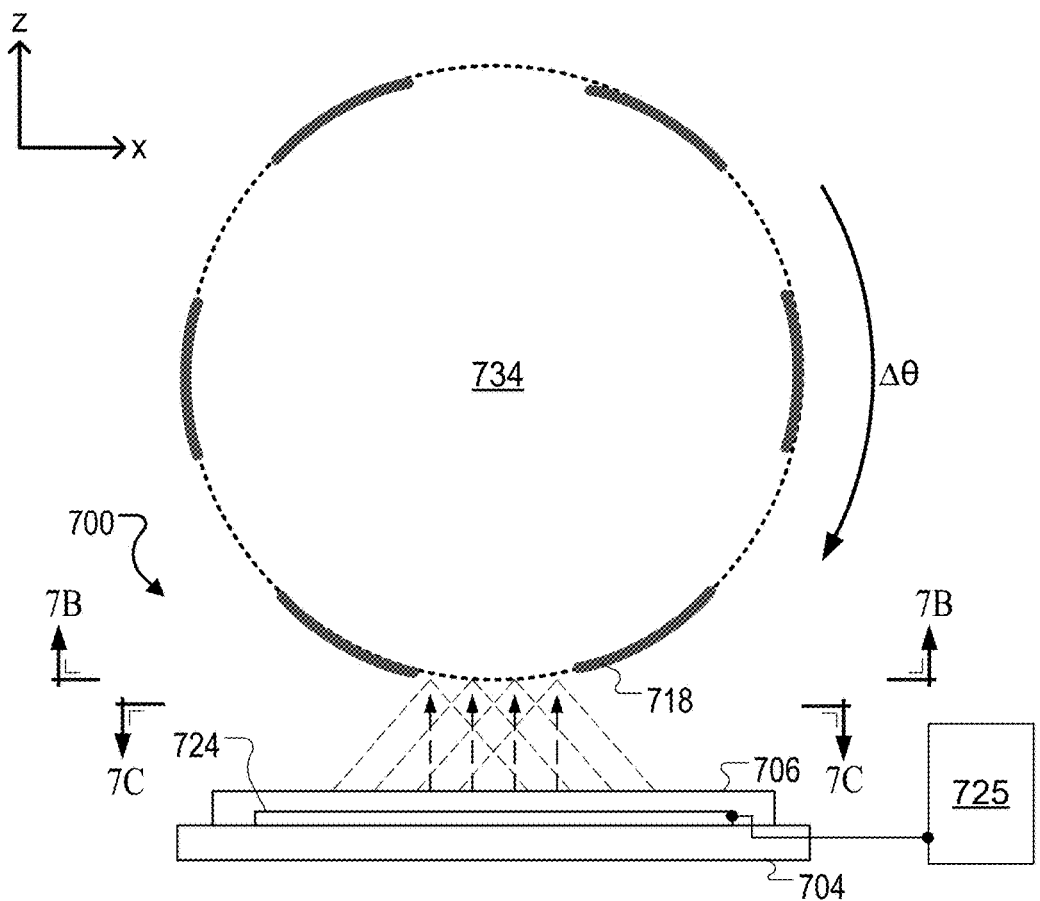
FIGS. 7A-7C show aspects of an angular displacement measuring system.

FIG. 7A is a side view, e.g. in the (x,z) plane, of an example of an angular displacement measuring system 700. The angular displacement measuring system 700 includes a mount 704, a light source 706 supported by the mount, an optical pattern 718 disposed on the edge (perimeter) surface of a wheel 734 such that optical pattern is spaced apart from the light source, a photodetector 724 supported by the mount, and processing electronics 725 coupled with the photodetector.

Figure 7B:
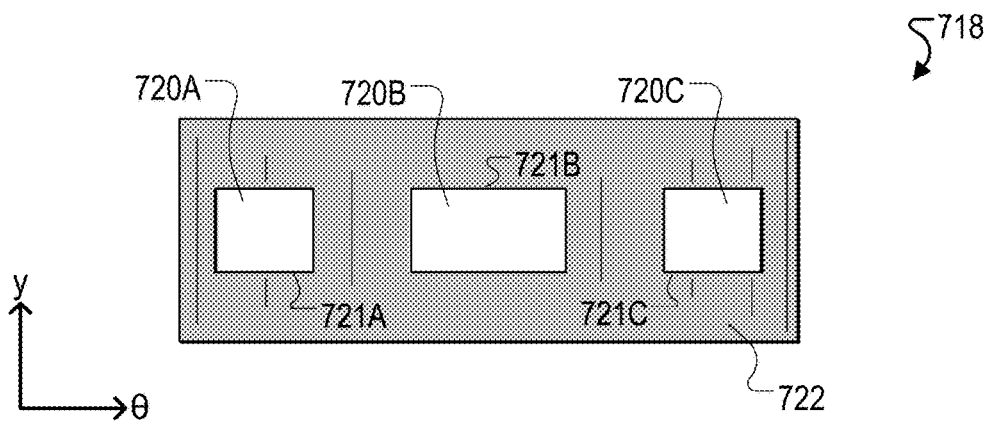

The optical pattern 718 wraps around the perimeter surface of the wheel 734, as shown in FIG. 7B. In this example, the optical pattern 718 has a background portion 722 (shown in grey) that wraps around the perimeter surface of the wheel 734, and multiple rectangular portions 720A, 720B, 720C, etc. (shown in white) distributed around the perimeter surface of the wheel that form corresponding rectangular edges 721A, 721B, 721C, etc. Note that each rectangular edge 721 has two azimuthal sides parallel to a direction of rotation θ, and two transverse sides across the direction of rotation θ (i.e., parallel to the y-axis). Here, each of the rectangular portions 720A, 720B, etc. has a first reflectivity $R_1$, and the background portion 722 has a second reflectivity $R_2$, smaller than the first reflectivity. Moreover, in this example, a size of each rectangular portion 720 along the direction of rotation θ is substantially equal to a separation between adjacent rectangular portions.

Figure 7C:
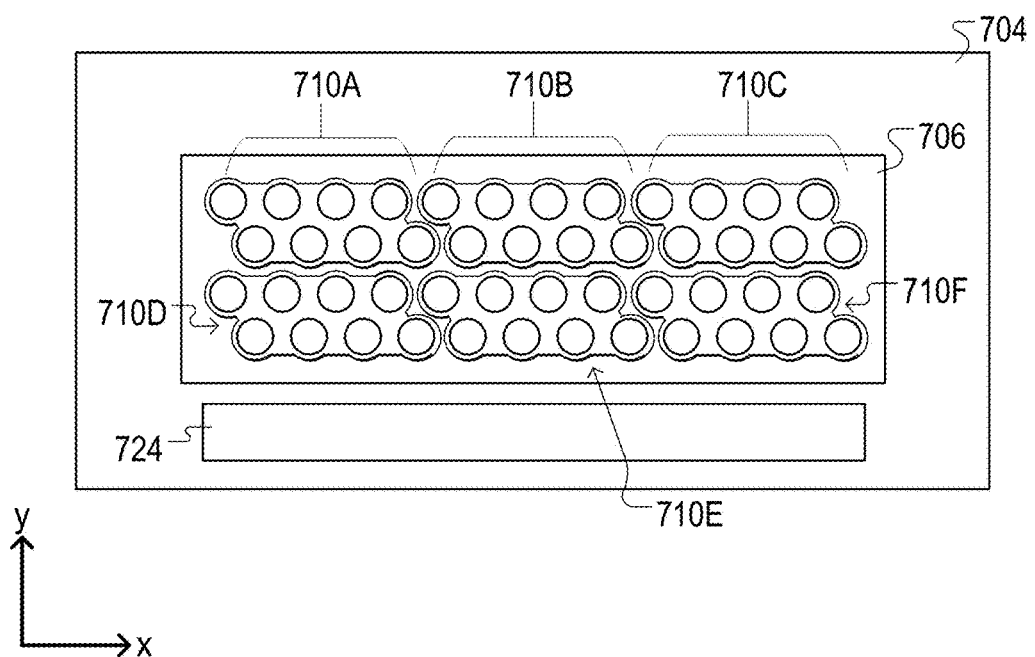
Figure 8A:
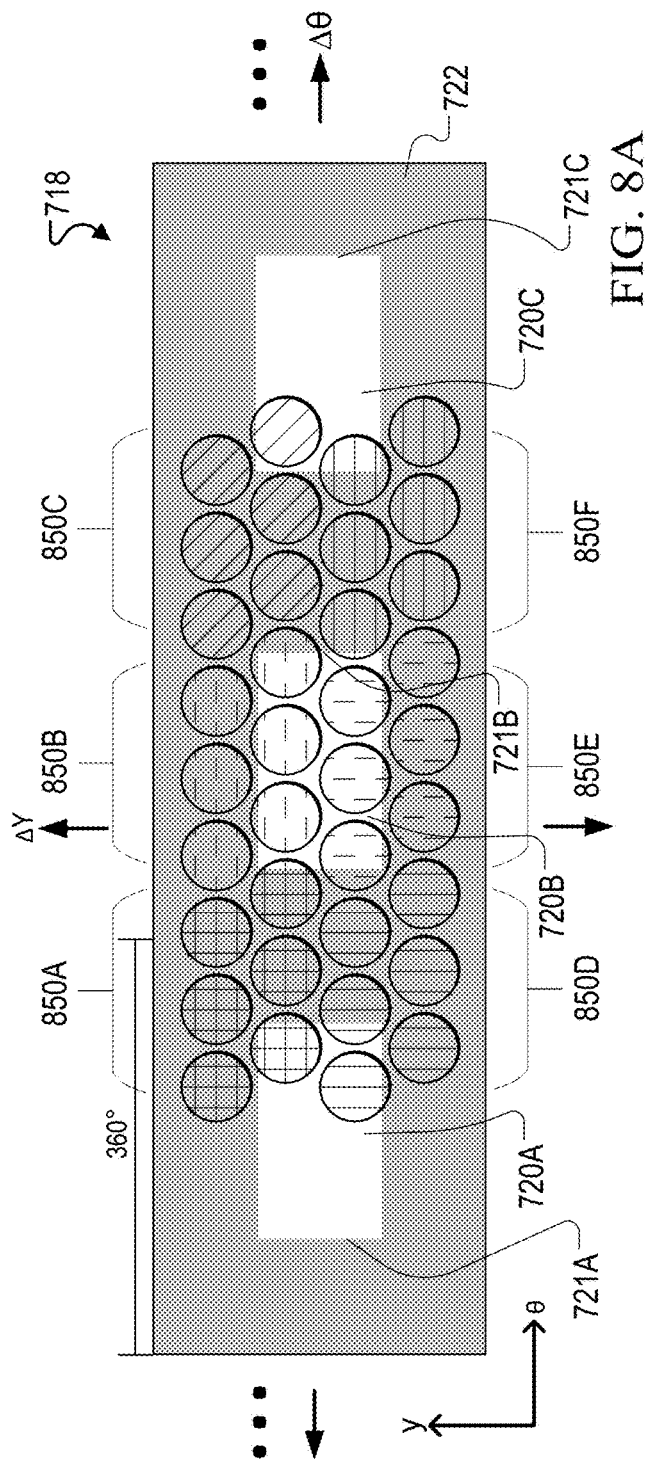
FIGS. 8A-8B show aspects of a technique for measuring angular displacement used by the angular displacement measuring system of FIGS. 7A-7C.

In the above-noted uses of the angular displacement measuring system 700, where a direction and magnitude of angular displacement is to be measured over multiple periods of the optical pattern 718, a 3-phase architecture can be used as described below. FIG. 7C is a plan view, e.g., in the (x,y) plane, of the components of the angular displacement measuring system 700 supported by the mount 704. In this example, the light source 706 includes a first pair of LEE arrays 710A, 710B, a second pair of LEE arrays 710C, 710D, a third pair of LEE arrays 710E, 710F, and the photodetector 724. Each of the LEE arrays 710A, 710B, 710C, 710D, 710E, 710F and the photodetector 724 can be implemented, as described above in connection with FIG. 1C, as an LEE array 110 and as the photodetector 124, respectively. The LEE arrays 710A, 710B, 710C, 710D, 710E, 710F are configured to output light beams grouped in respective macro-beams 850A, 850B, 850C, 850D, 850E, 850F, such that the macro-beams illuminate, during operation of the angular displacement measuring system 700, the optical pattern 718 across the rectangular edges 721A, 721B, 721C, etc., as shown in FIG. 8A. Note that in this example, a length of each macro-beam 850 is substantially equal to the size of each rectangular portion 720 along the direction of rotation θ. Moreover, the LEE arrays 710A, 710B, 710C, 710D, 710E, 710F output respective macro-beams 850A, 850B, 850C, 850D, 850E, 850F in a time multiplexed manner.

The optical pattern 718 reflects to the photodetector 724 the macro-beam output by each LEE array 710 that impinges on the optical pattern. Note that in this example, the macro-beams 850B, 850E emitted by the second pair of LEE arrays 710B, 710E are reflected to the photodetector 724 in a backward direction, such that a cross-section of the second pair of reflected macro-beams 850B, 850E is parallel to the surface of the photodetector 724. However, because of the curved configuration of the optical pattern 718, the macro-beams 850A, 850D (or 850C, 850F) emitted by the first pair of LEE arrays 710A, 710D (or third pair of LEE arrays 710A, 710D) are reflected to the photodetector 724 in a direction tilted relative to the backward direction, such that a cross-section of the first pair of reflected macro-beams 850A, 850D (or third pair of reflected macro-beams 850C, 850F) form an angle of +120° (or −120°) to the surface of the photodetector 724.

The photodetector 724 captures the reflected macro-beam 850 associated with each LEE array 710 and integrates it. As a result of integrating the captured reflected macro-beam 850, the photodetector 724 issues, in a time multiplexed manner, a respective photodetector signal relating to the associated macro-beam 850. Note that the processing circuitry 725 can combine, e.g., average or interpolate together, the photodetector signals associated with the macro-beams of a pair of macro-beams to determine a combined photodetector signal associated with that pair of macro-beams. As such, a first combined photodetector signal 856AD associated with the first pair of macro-beams 850A, 850D is determined by combining a first photodetector signal associated with the first macro-beam 850A together with a fourth photodetector signal associated with the fourth macro-beam 850D; a second combined photodetector signal 856BE associated with the second pair of macro-beams 850B, 850E is determined by combining a second photodetector signal associated with the second macro-beam 850B together with a fifth photodetector signal associated with the fifth macro-beam 850E; and a third combined photodetector signal 856CF associated with the third pair of macro-beams 850C, 850F is determined by combining a third photodetector signal associated with the third macro-beam 850C together with a sixth photodetector signal associated with the sixth macro-beam 850F.

Figure 8B:
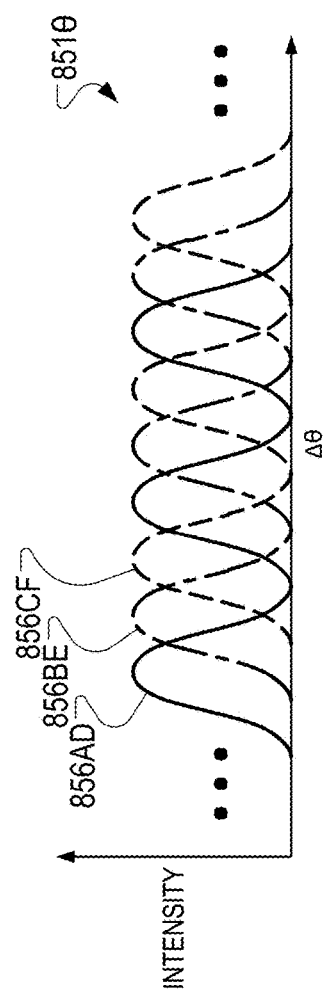

Rotation of the of the optical pattern 718 along the direction of rotation θ through the first pair of macro-beams 850A, 850D, the second pair of macro-beams 850B, 850E, and the third pair of macro-beams 850C, 850F, causes changes of the respective combined photodetector signals 856AD, 856BE, 856CF. FIG. 8B is a graph 8510 which shows changes of the first combined photodetector signal 856AD, changes of the second combined photodetector signal 856BE, and changes of the third combined photodetector signal 856CF as a function of angular displacement Δθ of a datum of the optical pattern 718 relative to the first pair of macro-beams 850A, 850D, the second pair of macro-beams 850B, 850E, and the third pair of macro-beams 850C, 850F. The datum of the optical pattern 718 can be either one of the corners of either one of the rectangular edges 721A, 721B, 721C, etc., for instance. Here, when the optical pattern 718 is rotated from left-to-right on page without being translated up-or-down on page, the following occurs: (1) As beams of the second pair of macro-beams 850B, 850E transition over the rectangular portions 720A, 720B, 720C, etc., the intensity of the reflected second pair of macro-beams 850B, 850E forms corresponding peaks, and so does the second combined photodetector signal 856BE; at the same time, beams of the first pair of macro-beams 850A, 850D and beams of the third pair of macro-beams 850C, 850F transition over the background portion 722 between corresponding adjacent rectangular portions 720A, 720B, 720C, etc., so each of the intensity of the reflected first pair of macro-beams 850A, 850D and the intensity of the reflected third pair of macro-beams 850C, 850F forms corresponding valleys, and so does each of the first combined photodetector signal 856AD and the third combined photodetector signal 856CF; and (2) as beams of the second pair of macro-beams 850B, 850E transition over the background portion 722 between adjacent rectangular portions 720A, 720B, 720C, etc., the intensity of the reflected second pair of macro-beams 850B, 850E forms corresponding valleys, and so does the second combined photodetector signal 856BE; at the same time, beams of the first pair of macro-beams 850A, 850D and beams of the third pair of macro-beams 850C, 850F transition over the corresponding rectangular portions 720A, 720B, 720C, etc., so each of the intensity of the reflected first pair of macro-beams 850A, 850D and the intensity of the reflected third pair of macro-beams 850C, 850F forms corresponding peaks, and so does each of the first combined photodetector signal 856AD and the third combined photodetector signal 856CF.

In this manner, angular displacement $\Delta\theta$ of the optical pattern 718 along the direction of rotation $\theta$ through the first pair of macro-beams 850A, 850D, the second pair of macro-beams 850B, 850E, and the third pair of macro-beams 850C, 850F can be determined in the following manner. A value of the first combined photodetector signal 856AD, a value of the second combined photodetector signal 856BE, and a value of the third combined photodetector signal 856CF are measured for an unknown displacement $\Delta X$. Then, a value of the unknown angular displacement $\Delta\theta$ is unambiguously obtained by mapping onto graph 451 the measured value of the first combined photodetector signal 856AD, the measured value of the second combined photodetector signal 856BE, and the measured value of the third combined photodetector signal 856CF.

Moreover, the angular displacement measuring system 700 can be used to perform a differential displacement measurement along the y-axis to accurately determine a value of a displacement $\Delta Y$ of the optical pattern 718. Here, the differential displacement measurement along the y-axis based on the second macro-beam 850B transitioning over a first azimuthal side of rectangular edges 721A, 721B, 721C, etc., and the fifth macro-beam 650E transitioning over the second azimuthal side of rectangular edges 721A, 721B, 721C, etc., is performed similarly to the differential displacement measurement along the y-axis based on either the first macro-beam 150A or the second macro-beam 150B transitioning over the first edge 121YA parallel to the x-axis, and the respective third macro-beam 150C or fourth macro-beam 150D transitioning over the second edge 121YB parallel to the x-axis, as described above in connection with FIG. 5A and FIG. 5C.

In some implementations, processing electronics 125 or 725 can be configured in analog electronics. Here, the analog electronics include one or more filters, subtractors, dividers, comparators, and other analog electronics components for performing operations described in this specification. In some implementations, processing electronics 125 or 725 can be configured as mixed signal circuitry that processes analog signals and digital signals. In some implementations, processing electronics 125 or 725 can be configured as one or more digital signal processors, e.g., ASIC, FPGA, CPU, etc.

FIG. 9A is a side view, e.g. in the (x,z) plane, of an example of a displacement measuring system 900 configured to measure displacement of a mass 1164. Here, the displacement measuring system 900 includes an optical sensing system 902, a back electromotive force (bEMF) sensing system 930 and a processor 925 coupled with both the optical sensing system and the bEMF sensing system.

In this example, the optical sensing system 902 includes a mount 904, a light source 906 supported by the mount, an intensity pattern 910 disposed on a surface 1165XYA of the mass 1164 that is spaced apart from the light source, and a photodetector 920 supported by the mount and coupled with the processing electronics 925. During operation of the optical sensing system 902, the light source 906 illuminates the intensity pattern 910 with probe light 908, and the intensity pattern redirects to the photodetector 920, e.g., via reflection or scattering, at least some of the light impinging thereon.

FIG. 9B is a plan view, e.g., in the (x,y) plane, of the intensity pattern 910 that includes a plurality of tiles 912 separated from each other by corresponding tile borders 913. Note that each tile has a size larger than a beam spot 916 formed by the probe light 908 that illuminates the intensity pattern 910. For instance, a size of each of the tiles 912 can be 1.1, 1.5, 2× of the size of the beam spot 916. In some implementations, the light source 906 includes a VCSEL that emits collimated probe light that is delivered to the intensity pattern 910 as a probe beam (also referenced as 908). In some implementations, the light source 906 includes an LED and beam-shaping optics that are optically coupled with the LED. In this case, the LED emits un-collimated light, and the beam-shaping optics receive the un-collimated light and issue the probe light 908, either as a probe beam or at least as focused probe light. In this manner, in either these implementations, a size of the beam spot 916 can be 20 µm, 10 µm, or smaller.

Moreover, each tile 912 of the intensity pattern 910 is configured to redirect to the photodetector 920 light having an intensity different from an intensity of light redirected to the photodetector by any of its adjacent tiles. In the example shown in FIG. 9B, the intensity pattern 910 is a binary intensity pattern because each tile 912A (or 912B) has only two adjacent tiles 912B (or 912A) configured to redirect to the photodetector 920 light having the same intensity. As such, the binary intensity pattern 910 has tiles of first type 912A and tiles of second type 912B, where each tile of first type 912A forms respective tile borders 913 with two adjacent tiles of second type 912B, and each tile of second type 912B forms respective tile borders 913 with two adjacent tiles of first type 912A. A tile of first type 912A is configured such that, when the probe beam 908 illuminates it, the redirected light 918 has a maximum intensity $I_{MAX}$. Further, a tile of second type 912B is configured such that, when the probe beam 908 illuminates it, the redirected light 918 has a minimum intensity $I_{MIN}$, where $I_{MIN} < I_{MAX}$. Here, the tile borders 913 are distributed at known locations relative to each other along the x-axis, so the binary intensity pattern 910 of the optical sensing system 902 can be used as part of the displacement measuring system 900 to measure displacement $\Delta X$ of the mass 1164 along the x-axis. An example of a four-level intensity pattern 1210 of the optical sensing system 902 that can be used as part of the displacement measuring system 900 to measure, as described below in connection with FIGS. 12A-12I, displacement $\Delta X$ of the mass 1164 along the x-axis and displacement $\Delta Y$ of the mass along the y-axis.

Referring again to FIG. 9A, the photodetector 920 captures the redirected light 918 associated with the light source 906 and integrates it. In some implementations, the photodetector 920 can be implemented as a photodiode, e.g., a PIN photodiode. A result of integrating the captured light is a raw intensity value I(t) relating to the intensity of the light redirected by the intensity pattern 910 to the photodetector 920 at sampling time t. The photodetector 920 includes a threshold module that classifies the raw intensity value I(t) against a threshold value Th. In the example illustrated in FIG. 9C, the threshold module of the photodetector 920 can set $I(t) = I_{MIN}$ if $I(t) \leq Th$, or $I(t) = I_{MAX}$ if $I(t) > Th$. In some implementations, the threshold value Th can be predetermined. In other implementations, the threshold value Th can be updated adaptively. For instance, a statistic $<I>_S$ of the last K values of raw intensity that are smaller than the threshold value Th, and another statistic $\langle I \rangle_L$ of the last K values of raw intensity that are larger than the threshold value Th can be used to reset the threshold value to Th= $(\langle I \rangle_L - \langle I \rangle_S)/2$. Here, K≥2 and the statistic $\langle I \rangle$ can be an average, truncated average, median, maximum or minimum, for instance. In this manner, the photodetector 920 issues an intensity signal 922 that can have only two values $\{I_{MIN}, I_{MAX}\}$ and is related to the intensity of the light redirected by the intensity pattern 910 to the photodetector, as the intensity pattern carried by the mass 1164 is displaced along the x-axis relative to the probe beam 908.

FIG. 9C further shows changes in the intensity signal 922 caused by multiple tile border crossings that occur as the intensity pattern 910 carried by the mass 1164 is displaced along the x-axis relative to the probe beam 908. A tile border crossing is said to occur when the intensity pattern 910 is displaced, along a direction of motion that intersects the tile borders 913, such that a tile border 913, formed between a tile of first type 912A and a tile of second type 912B, crosses through the beam spot 916 associated with the static probe beam 908. In this manner, the probe beam 908 illuminates the tile of first type 912A (or the tile of second type 912B) before the tile border crossing and illuminates the tile of second type 912B (or the tile of first type 912A) after the tile border crossing, such that the tile border crossing causes a predefined decrease "$-\Delta I$" (or a predefined increase "$+\Delta I$") in the intensity of the redirected light 918 between $I_{MAX}$ and $I_{MIN}$. In the example illustrated in FIG. 9C, the intensity signal 922 indicates that (i) tile border crossings from a tile of second type 912B to a tile of first type 912A have occurred at times $t_1$ and $t_3$, where the tile border crossing times $t_1$, $t_3$ are determined as the times when the intensity signal increases by $+\Delta I = I_{MAX} - I_{MIN}$; and (ii) tile border crossings from a tile of first type 912A to a tile of second type 912B have occurred at times $t_2$ and $t_4$, where the tile border crossing times $t_2$, $t_4$ are determined as the times when the intensity signal decreases by $-\Delta I = -(I_{MAX} - I_{MIN})$. Further in the example illustrated in FIG. 9C, the intensity signal 922 indicates that the probe beam 906 has illuminated a tile of second type 912B from the start time to time $t_1$, between times $t_2$ and $t_3$ and after time $t_4$ until the final time; and a tile of first type 912A between times $t_1$ and $t_2$, and times $t_3$ and $t_4$.

However, the foregoing information that can be extracted from the intensity signal 922 shown in FIG. 9C is insufficient for uniquely determining the displacement $\Delta X$ of the intensity pattern 910 carried by the mass 1164 along the x-axis relative to the probe beam 908. For instance, FIG. 9D shows only a few from among many possible scans 926 of the intensity pattern 910 carried by the mass 1164 along the x-axis relative to the probe beam 908. Here, a tile border crossing 928 is represented by an arrow over the tile border that is being crossed. Also note that a tilt is used to represent the border crossings 928 in FIG. 9D to suggest their sequence in time. Note that although each of the scans 926A, 926B, 926C, 926D includes four tile border crossings 928, the scans have different starting and ending points, span different displacement ranges, as explained below.

For scan 926A, the beam spot 916 starts at $X_3$ corresponding to the center of the third tile of the intensity pattern 910 and ends back at $X_3$; at $t_1$, a first tile border crossing occurs from the third tile to the fourth tile, and then the beam spot 916 reaches $X_4$ corresponding to the center of the fourth tile; next at $t_2$, a second tile border crossing occurs from the fourth tile to the third tile, and then the beam spot 916 reaches $X_3$ again; next at $t_3$, a third tile border crossing occurs from the third tile to the fourth tile, and then the beam spot 916 reaches $X_4$ again; next at $t_4$, a fourth tile border crossing occurs from the fourth tile to the third tile, and then the beam spot 916 returns back to $X_3$. Thus, the largest displacement $\Delta X$ of the intensity pattern 910 relative to the probe beam 908 during scan 926A is of order $(X_4 - X_3)$, e.g., approximately the pitch of the intensity pattern. Here, the pitch of the intensity pattern 910 includes a tile of first type 912A and a tile of second type 912B.

For scan 926B, the beam spot 916 starts at $X_3$ corresponding to the center of the third tile of the intensity pattern 910 and ends back at $X_3$; at $t_1$, a first tile border crossing occurs from the third tile to the fourth tile, and then the beam spot 916 reaches $X_4$ corresponding to the center of the fourth tile; next at $t_2$, a second tile border crossing occurs from the fourth tile to the fifth tile, and then the beam spot 916 reaches $X_5$ corresponding to the center of the fifth tile; next at $t_3$, a third tile border crossing occurs from the fifth tile to the fourth tile, and then the beam spot 916 reaches $X_4$ again; next at $t_4$, a fourth tile border crossing occurs from the fourth tile to the third tile, and then the beam spot 916 returns back to $X_3$. Thus, the largest displacement $\Delta X$ of the intensity pattern 910 relative to the probe beam 908 during scan 926B is of order $(X_5 - X_3)$, e.g., approximately 1.5 times the pitch of the intensity pattern.

For scan 926C, the beam spot 916 starts at $X_3$ corresponding to the center of the third tile of the intensity pattern 910 and ends at $X_1$ corresponding to the first tile of the intensity pattern; at $t_1$, a first tile border crossing occurs from the third tile to the fourth tile, and then the beam spot 916 reaches $X_4$ corresponding to the center of the fourth tile; next at $t_2$, a second tile border crossing occurs from the fourth tile to the third tile, and then the beam spot 916 reaches $X_3$ again; next at $t_3$, a third tile border crossing occurs from the third tile to the second tile, and then the beam spot 916 reaches $X_2$ corresponding to the center of the second tile; next at $t_4$, a fourth tile border crossing occurs from the second tile to the first tile, and then the beam spot 916 ends up at $X_1$ corresponding to the center of the first tile. Thus, the largest displacement $\Delta X$ of the intensity pattern 910 relative to the probe beam 908 during scan 926C is of order $(X_1 - X_4)$, e.g., approximately twice the pitch of the intensity pattern.

For scan 926D, the beam spot 916 starts at $X_1$ corresponding to the center of the first tile of the intensity pattern 910 and ends at $X_5$ corresponding to the center of the fifth tile of the intensity pattern; at $t_1$, a first tile border crossing occurs from the first tile to the second tile, and then the beam spot 916 reaches $X_2$ corresponding to the center of the second tile; next at $t_2$, a second tile border crossing occurs from the second tile to the third tile, and then the beam spot 916 reaches $X_3$ corresponding to the center of the third tile; next at $t_3$, a third tile border crossing occurs from the third tile to the fourth tile, and then the beam spot 916 reaches $X_4$ corresponding to the center of the fourth tile; next at $t_4$, a fourth tile border crossing occurs from the fourth tile to the fifth tile, and then the beam spot 916 ends up at $X_5$. Thus, the largest displacement $\Delta X$ of the intensity pattern 910 relative to the probe beam 908 during scan 926D is of order $(X_5 - X_1)$, e.g., 2.5 times the pitch of the intensity pattern.

In order to determine, e.g., from among the scans 926A, 926B, 926C, 926D shown in FIG. 9D, the actual scan used by the optical sensing system 902 to acquire the intensity signal 922 shown in FIG. 9C, the processor 925 has to spatially resolve the tile border crossings indicated by the intensity signal. A tile border crossing is said to be spatially resolved when the processor 925 specifies both the tile border at which the tile border crossing has occurred, and the direction in which the tile border crossing has occurred. In order to spatially resolve the tile border crossings indicated by the intensity signal 922, the processor 925 uses additional information provided by the bEMF sensing system 930. Note that in the example shown in FIG. 9A, the bEMF sensing system 930 includes a board 932, a coil 934 supported by the board, and a magnet 936 disposed on a surface 1165XYB of the mass 1164 opposite the surface 1165XYA on which the intensity pattern 910 is disposed. An output port 938 of the bEMF sensing system 930 is coupled internally with the coil 934 and externally with the processor 925. The magnet 936 is arranged relative to the coil 934 to interact with it when the magnet moves along with mass 1164 relative to the coil. In the example shown in FIG. 9A, the coil 934 is at rest relative to a datum of the displacement measuring system 900 (e.g., a position of the probe beam 908) and the longitudinal axis of the coil is parallel to the x-axis, as the magnet 936 can move inside the coil along the longitudinal axis of the coil.

In this manner, a bEMF signal v(t) 923 is induced in the coil 934 when the magnet 936 is displaced along the x-axis together with the mass 1164. A value of the bEMF signal v(t) 923 is proportional to a magnitude of a velocity of the mass 1164 along the x-axis, such that if the value of the bEMF signal is zero, then the mass it at rest; also, if the bEMF signal v(t) 923 increases (or decreases), then the velocity of the mass increases (or decreases). Moreover, a sign of the bEMF signal v(t) 923 indicates a direction along the x-axis of the velocity of the mass 1164, and, thus, a direction of the displacement ΔX. For example, if a value of the bEMF signal v(t) 923 is positive (or negative), then the mass is displaced forward (or backward) along the x-axis. Moreover, the bEMF sensing system 930 includes an integrator module that integrates over time the bEMF signal v(t) 923 induced in the coil 934 and obtains a first displacement signal $\Delta X_{bEMF}(t)$ 940 associated with the displacement ΔX. In this manner, given reasonable analog-to-digital (ADC) resolution, the bEMF sensing system 930 issues, at its output port 938, with good differential resolution, the first displacement signal $\Delta X_{bEMF}(t)$ 940 associated with the displacement ΔX of the mass 1164 that has been acquired concurrently with the intensity signal 922. In this manner, the processor 925 can extract additional information from the first displacement signal $\Delta X_{bEMF}(t)$ 940 acquired by the bEMF sensing system 930, and will use the extracted information to spatially resolve the tile border crossings indicated by the intensity signal 922, as described below.

Figure 9E:
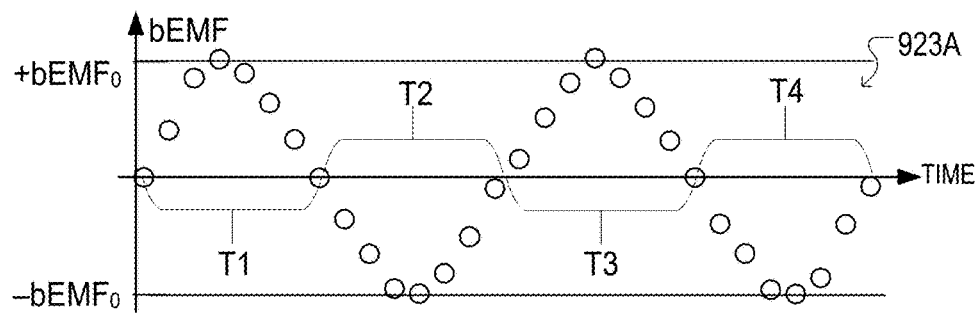
Figure 9F:
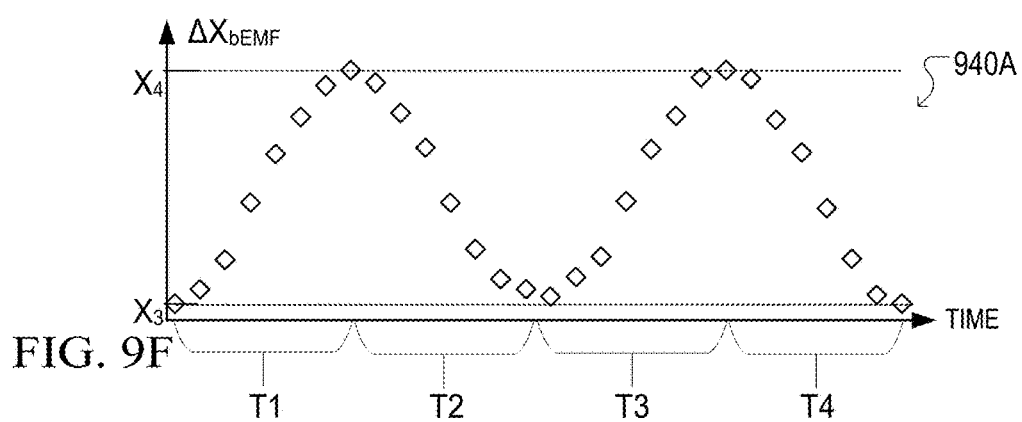
Figure 9G:
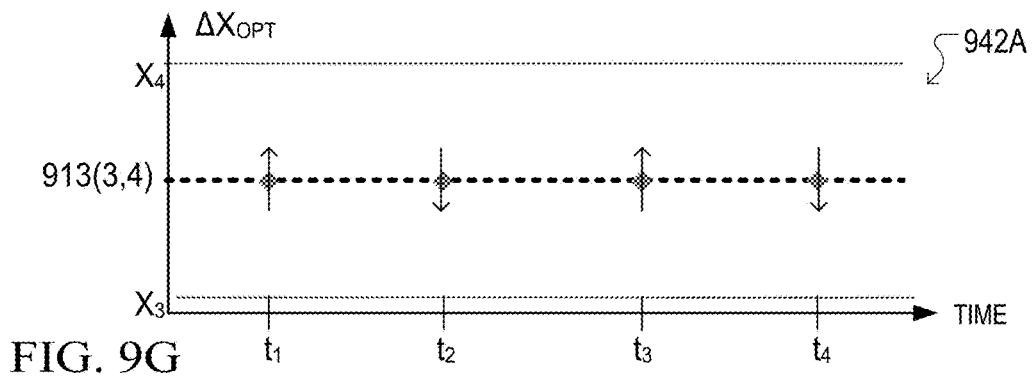

FIG. 9E shows a first example of a bEMF signal v(t) 923A induced in the coil 934 of the bEMF sensing system 930 over the same time duration when the intensity signal 922 shown in FIG. 9C was acquired by the optical sensing system 902. Note that in this case, the bEMF signal v(t) 923A indicates that the mass 1164 to which the magnet 936 is attached starts its motion at rest, then it moves in the positive direction of the x-axis over a first time interval $T_1$ until it comes to a first stop, then it moves in the negative direction of the x-axis over a second time interval $T_2$ until it comes to a second stop, then it moves again in the positive direction of the x-axis over a third time interval $T_3$ until it comes to a third stop, and then it moves again in the negative direction of the x-axis over a fourth time interval $T_4$ until it comes to a fourth and final stop. FIG. 9G shows a first displacement signal $\Delta X_{bEMF}(t)$ 940A obtained by the bEMF sensing system 930 by integrating the bEMF signal v(t) 923A shown in FIG. 9E. Note that in this first case, the first displacement signal $\Delta X_{bEMF}(t)$ 940A indicates that the mass 1164 is displaced forward from about $X_3$ (e.g., the center of the third tile) to about $X_4$ (e.g., the center of the fourth tile) over the first time interval $T_1$ and third time interval $T_3$, and backward from about $X_4$ to about $X_3$ over the second time interval $T_2$ and fourth time interval $T_4$.

At this point, the processor 925 can combine information extracted from the intensity signal 922 shown in FIG. 9C with information extracted from the bEMF signal v(t) 923A shown in FIG. 9E and with information extracted from the first displacement signal $\Delta X_{bEMF}(t)$ 940A shown in FIG. 9F to obtain a second displacement signal $\Delta X_{OPT}(t)$ 942A shown in FIG. 9G, in the following manner. The processor 925 uses the intensity signal 922 to determine the respective times $t_1$, $t_2$, $t_3$, $t_4$ when tile border crossings have occurred, as explained above in connection with FIG. 9C. Further, the processor 925 uses the bEMF signal v(t) 923A to determine that, at $t_1$, the first tile border crossing occurs in the forward x-axis direction because, during the first time interval $T_1$ which includes $t_1$, the mass moves in the forward x-axis direction, as explained above in connection with FIG. 9E; at $t_2$, the second tile border crossing occurs in the backward x-axis direction because, during the second time interval $T_2$ which includes $t_2$, the mass moves in the backward x-axis direction; at $t_3$, the third tile border crossing occurs in the forward x-axis direction because, during the third time interval $T_3$ which includes $t_3$, the mass moves in the forward x-axis direction; and at $t_4$, the fourth tile border crossing occurs in the backward x-axis direction because, during the fourth time interval $T_4$ which includes $t_4$, the mass moves in the backward x-axis direction. As the foregoing tile border crossings alternate in direction, they must correspond to crossings of a single tile border. Furthermore, the first displacement signal $\Delta X_{bEMF}(t)$ 940A is used to determine that the single tile border that is crossed back and forth is the tile border 913(3,4) which separates the third tile and the fourth tile, because the mass moves back and forth along the x-axis direction between the third tile and the fourth tile, as explained above in connection with FIG. 9F. Note that the second displacement signal $\Delta X_{OPT}(t)$ 942A obtained in this manner is represented in FIG. 9G by filled diamonds with arrows. In this case, all the samples of the second displacement signal $\Delta X_{OPT}(t)$ 942A are plotted at a coordinate corresponding to the precise location of the tile border 913(3,4), and direction of the respective arrows corresponds to the direction of the tile border crossings at respective times $t_1$, $t_2$, $t_3$, $t_4$. Further note that the signals shown in FIGS. 9E, 9F and 9G correspond to scan 926A shown in FIG. 9D.

Figure 9H:
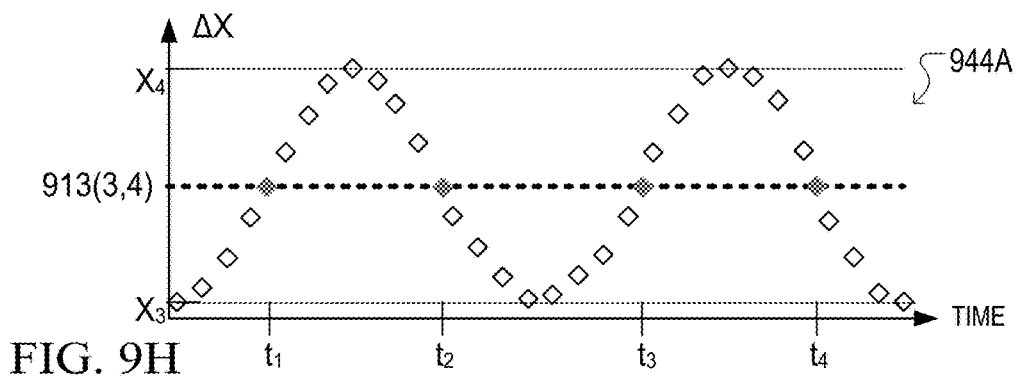
Figure 9I:
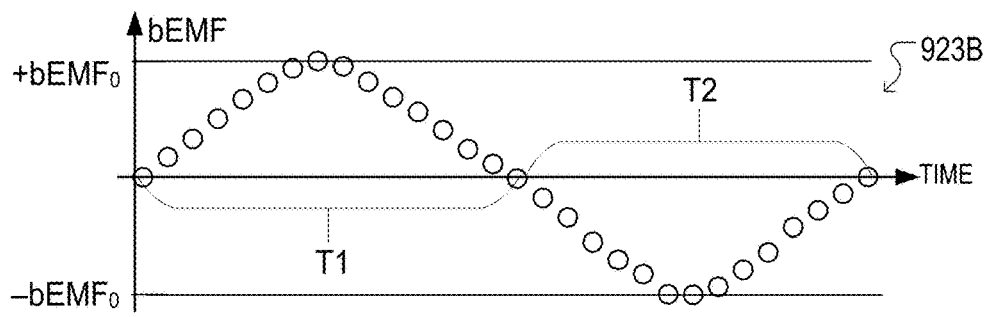
Figure 9J:
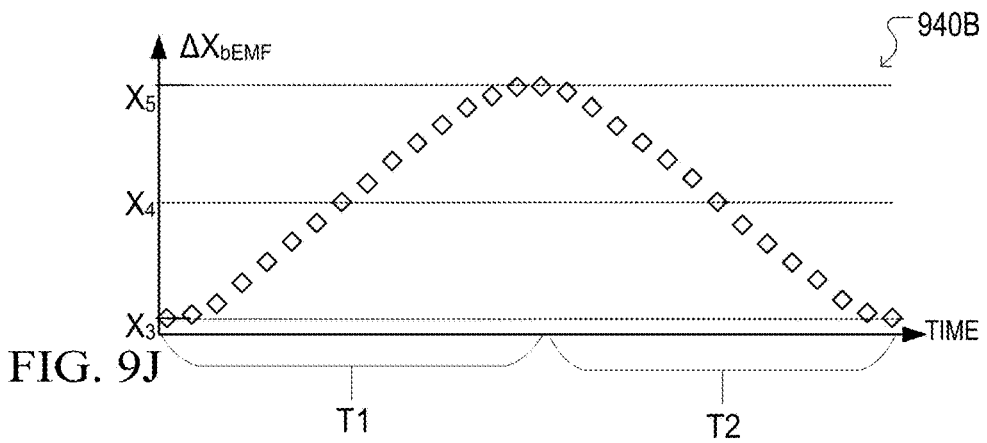

FIG. 9I shows a second example of a bEMF signal v(t) 923B induced in the coil 934 of the bEMF sensing system 930 over the same time duration when the intensity signal 922 shown in FIG. 9C was acquired by the optical sensing system 902. Note that in this case, the bEMF signal v(t) 923B indicates that the mass 1164 to which the magnet 936 is attached starts its motion at rest, then it moves in the positive direction of the x-axis over a first time interval $T_1$ until it comes to a first stop, then it moves in the negative direction of the x-axis over a second time interval $T_2$ until it comes to a second and final stop. FIG. 9J shows a first displacement signal $\Delta X_{bEMF}(t)$ 940B obtained by the bEMF sensing system 930 by integrating the bEMF signal v(t) 923B shown in FIG. 9I. Note that in this second case, the first displacement signal $\Delta X_{bEMF}(t)$ 940B indicates that the mass 1164 is displaced forward from about $X_3$ (e.g., the center of the third tile) through $X_4$ (e.g., the center of the fourth tile) to about $X_5$ (e.g., the center of the fifth tile) over the first time interval $T_1$, and backward from about $X_5$ to about $X_3$ over the second time interval $T_2$.

Figure 9K:
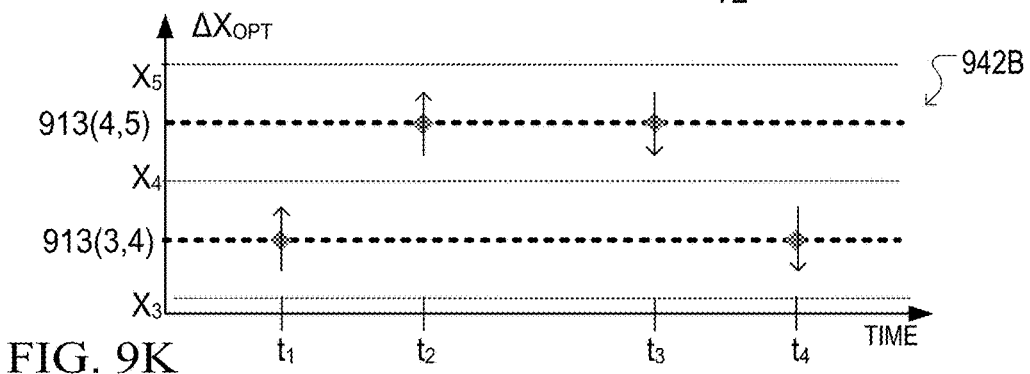

At this point, the processor 925 can combine (i) information extracted from the intensity signal 922 shown in FIG. 9C with (ii) information extracted from the bEMF signal v(t) 923B shown in FIG. 9I and with (iii) information extracted from the first displacement signal $\Delta X_{bEMF}(t)$ 940B shown in FIG. 9J to obtain a second displacement signal $\Delta X_{OPT}(t)$ 942B shown in FIG. 9K, in the following manner. The processor 925 uses the intensity signal 922 to determine the respective times $t_1$, $t_2$, $t_3$, $t_4$ when tile border crossings have occurred, as explained above in connection with FIG. 9C. Further, the processor 925 uses the bEMF signal v(t) 923B to determine that, at $t_1$ and at $t_2$, the first tile border crossing and the second tile border crossing respectively occur in the forward x-axis direction because, during the first time interval $T_1$ which includes both $t_1$ and $t_2$, the mass moves in the forward x-axis direction, as explained above in connection with FIG. 9E; and at $t_3$ and $t_4$, the third tile border crossing and the fourth tile border crossing respectively occur in the backward x-axis direction because, during the second time interval $T_2$ which includes both $t_3$ and $t_4$, the mass moves in the backward x-axis direction. As the first two of the foregoing tile border crossings have the same forward direction, they must correspond to respective crossings in the forward direction of both tile borders of a single tile, and as the last two of the foregoing tile border crossings have the same backward direction, they must correspond to respective crossings in the backward direction of both tile borders of the same tile. Furthermore, the first displacement signal $\Delta X_{bEMF}(t)$ 940B is used to determine that the single tile that is crossed back and forth is the fourth tile having the center at $X_4$ and sharing tile border 913(3,4) with the third tile and tile border 913(4,5) with the fifth tile, because the mass moves back and forth along the x-axis direction between the third tile and the fifth tile, as explained above in connection with FIG. 9J. Note that the second displacement signal $\Delta X_{OPT}(t)$ 942B obtained in this manner is represented in FIG. 9K by filled diamonds with arrows. In this case, a first sample of the second displacement signal $\Delta X_{OPT}(t)$ 942B is plotted at a coordinate corresponding to a location of a first tile border 913(3,4) of the fourth tile, and a second sample of the second displacement signal $\Delta X_{OPT}(t)$ 942B is plotted at a coordinate corresponding to a location of a second tile border 913(4,5) of the fourth tile, and the forward direction of each of the arrows of the first two samples corresponds to the forward direction of the tile border crossings at respective times $t_1$, $t_2$. Further in this case, a third sample of the second displacement signal $\Delta X_{OPT}(t)$ 942B is plotted at the coordinate corresponding to the location of the second tile border 913(4,5) of the fourth tile, and a fourth sample of the second displacement signal $\Delta X_{OPT}(t)$ 942A is plotted at the coordinate corresponding to the location of the first tile border 913(3,4) of the fourth tile, and the backward direction of each of the arrows of the last two samples corresponds to the backward direction of the tile border crossings at respective times $t_3$, $t_4$. Note that the signals shown in FIGS. 9I, 9J and 9K correspond to scan 926B shown in FIG. 9D.

Moreover, the second displacement signal $\Delta X_{OPT}(t)$ 942A (or 942B) determined based in part on the intensity signal 922 acquired by the optical sensing system 902 has more absolute accuracy than the first displacement signal $\Delta X_{bEMF}(t)$ 940A (or 940B) acquired by the bEMF sensing system 930, because the optical sensing system provides integrated non-linearity (INL) that is lower than the INL of the bEMF sensing system. However, note that as the tile borders 913 are distributed at known locations relative to each other along the x-axis, the spatial resolution of second displacement signal $\Delta X_{OPT}(t)$ 942A (or 942B) is limited by a photomask lithography process. Hence, the first displacement signal $\Delta X_{bEMF}(t)$ 940A (or 940B) acquired by the bEMF sensing system 930, as shown in FIG. 9F (or FIG. 9J) may be available at a larger sampling rate than the sampling rate used by the processor 925 to determine the second displacement signal $\Delta X_{OPT}(t)$ 942A (or 942B), as shown in FIG. 9G (or FIG. 9K). As such, the processor 925 can further determine a displacement signal $\Delta X(t)$ 944A (or 944B) by interpolating the second displacement signal $\Delta X_{OPT}(t)$ 942A (or 942B) with appropriately scaled sampling values of the first displacement signal $\Delta X_{bEMF}(t)$ 940A (or 940B). FIG. 9H shows a displacement signal $\Delta X(t)$ 944A determined by the processor 925 by interpolating the second displacement signal $\Delta X_{OPT}(t)$ 942A with appropriately scaled sampling values of the first displacement signal $\Delta X_{bEMF}(t)$ 940A. And FIG. 9L shows a displacement signal $\Delta X(t)$ 944B determined by the processor 925 by interpolating the second displacement signal $\Delta X_{OPT}(t)$ 942B with appropriately scaled sampling values of the first displacement signal $\Delta X_{bEMF}(t)$ 940B.

Figure 9L:
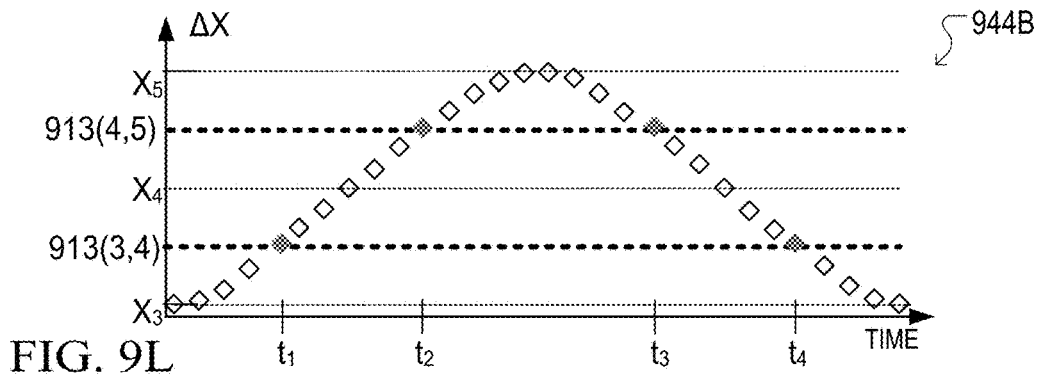
Figure 10A:
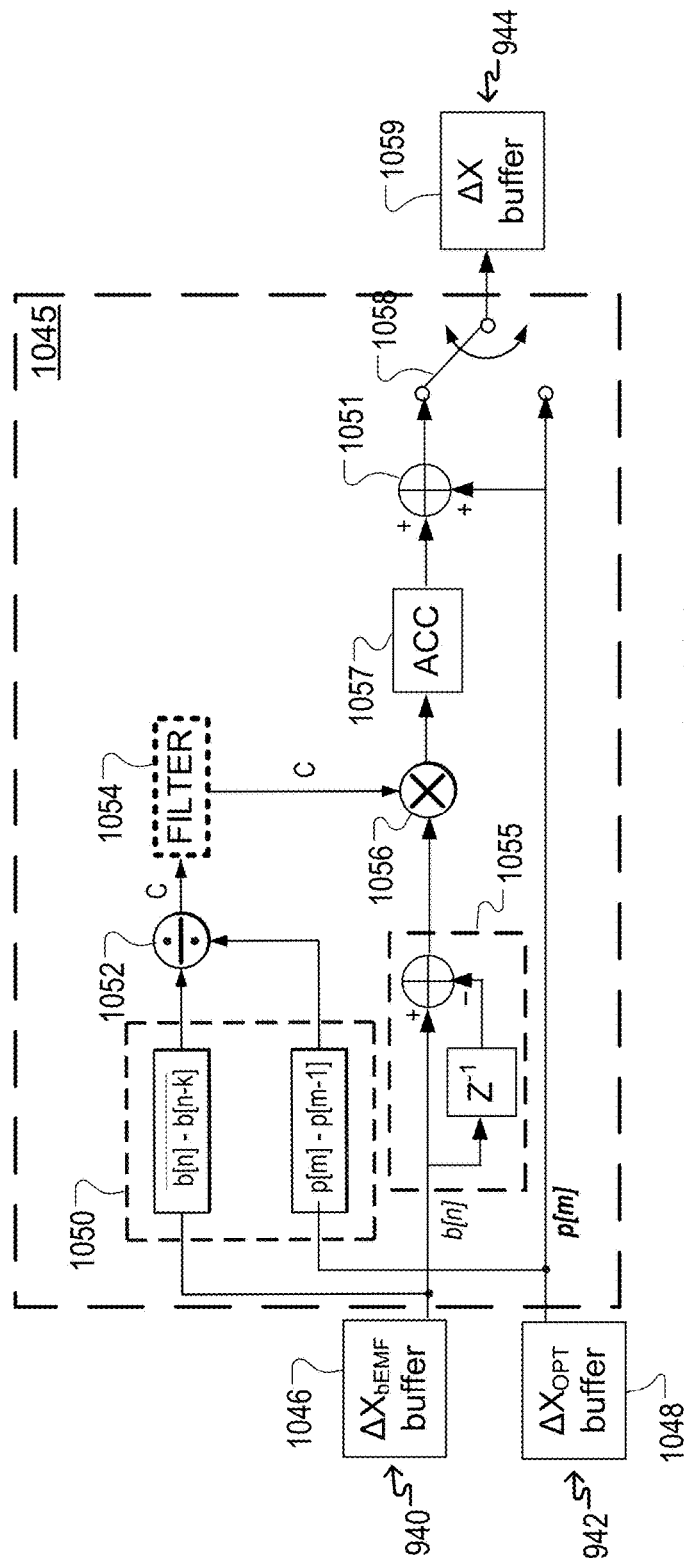
FIGS. 10A-10B show aspects of an example of an interpolator module used by the displacement measuring system of FIGS. 9A-9L.
Figure 10B:
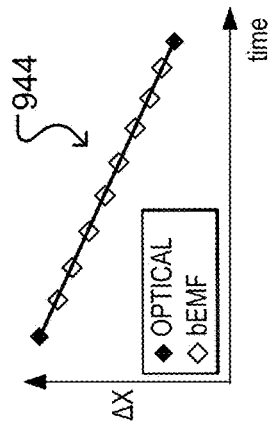

FIG. 10A shows an example of an interpolator module 1045 for interpolating the second displacement signal $\Delta X_{OPT}(t)$ 942 (examples of which are shown in either of FIG. 9G or 9K) using the first displacement signal $\Delta X_{bEMF}(t)$ 940 (examples of which are shown in either of FIG. 9F or 9J) to obtain a displacement signal $\Delta X(t)$ 944 (examples of which are shown in FIG. 9H or 9L). A digitized version of the first displacement signal $\Delta X_{bEMF}(t)$ 940 acquired by the bEMF sensing system 930 can be stored in a first buffer 1046; here, samples of the first displacement signal $\Delta X_{bEMF}(t)$ 940 are denoted b[n] and are sampled at a first sampling rate. The second displacement signal $\Delta X_{OPT}(t)$ 942, determined by the processor 925 based at least on the intensity signal 922 acquired by the optical sensing system 902, can be stored in a second buffer 1048; here, samples of the second displacement signal $\Delta X_{OPT}(t)$ 942 are denoted p[m] and are sampled at a second sampling rate that can be smaller than the first sampling rate. The displacement signal $\Delta X(t)$ 944, obtained by the interpolator module 1045, can be stored in a third buffer 1059; here, samples of the displacement signal $\Delta X(t)$ 944 are sampled at the first sampling rate. FIG. 10B shows a portion of a displacement signal $\Delta X(t)$ 944 obtained, as described below, by the interpolator module 1045 and stored in the third buffer 1059.

The interpolator module 1045 includes a subtractor 1050 linked to both the first and second buffers 1046, 1048, and a differentiator 1055 linked to the first buffer 1046. The interpolator module 1045 further includes a divider 1052 linked to the subtractor 1050, and a filter 1054 linked to the divider. Furthermore, the interpolator module 1045 includes a multiplier 1056 linked to both the differentiator 1055 and the filter 1054. Also, the interpolator module 1045 includes an adder 1051 linked to the second buffer 1048. Additionally, the interpolator module 1045 includes a multiplexer 1058 linked to the second buffer 1048, and an accumulator 1057 linked to both the multiplier 1056 and the multiplexer.

The interpolator module 1045 receives a sample p[m] of the second displacement signal $\Delta X_{OPT}(t)$ 942 from the second buffer 1048 and passes it through to the multiplexer 1058 to be output as a non-interpolated term p[m] of the displacement signal $\Delta X(t)$ 944 to the third buffer 1059. Then, the multiplexer 1058 is switched to output k sequential interpolated terms of the displacement signal $\Delta X(t)$ 944, where k≥2, that are obtained in the following manner.

Prior to calculating the k interpolated terms, the subtractor 1050 determines a change b[n]−b[n−k] of the first displacement signal $\Delta X_{bEMF}(t)$ 940 over k of its samples and a change p[m]−p[m−j] of the second displacement signal $\Delta X_{OPT}(t)$ 942 over j of its samples, where j≥1, and the divider 1052 determines a scale factor C as a ratio of the foregoing changes. In some implementations, the filter 1054 filters the scale factor C and outputs a filtered scale factor C to increase stability of the interpolation. Also prior to calculating the k interpolated terms, the accumulator 1057 is initialized to zero.

To calculate the first interpolated term, the differentiator 1055 outputs a first change (b[n+1]−b[n]) of the first displacement signal $\Delta X_{bEMF}(t)$ 940. The multiplier 1056 scales the first change output by the differentiator 1055 to obtain C(b[n+1]−b[n]). As the accumulator 1057 has been initialized to zero, the first scaled change C(b[n+1]−b[n]) is simply passed through the accumulator to the adder 1051. The adder 1051 adds the first output of the accumulator 1057 to the sample p[m] of the second displacement signal $\Delta X_{OPT}(t)$ 942, so the interpolator module 1045 can use the multiplexer 1058 to output the first interpolated term p[m]+C(b[n+1]−b[n]) to the third buffer 1059. To calculate the second interpolated term, the differentiator 1055 outputs a second change (b[n+2]−b[n+1]) of the first displacement signal $\Delta X_{bEMF}(t)$ 940. The multiplier 1056 scales the second change output by the differentiator 1055 to obtain C(b[n+2]−b[n+1]). As the accumulator 1057 has held the first scaled change C(b[n+1]−b[n]), the accumulation thereof with the second scaled change C(b[n+2]−b[n+1]) results in C(b[n+2]−b[n]) which is output to the adder 1051. The adder 1051 adds the second output of the accumulator 1057 to the sample p[m] of the second displacement signal $\Delta X_{OPT}(t)$ 942, so the interpolator module 1045 can use the multiplexer 1058 to output the second interpolated term p[m]+C(b[n+2]−b[n]) to the third buffer 1059. And so, and so forth, such that the $k^{th}$ interpolated term output by the interpolator module 1045 to the third buffer 1059 is p[m]+C(b[n+k−1]−b[n]).

Then, the multiplexer 1058 is switched to output the next non-interpolated term. Here, the interpolator module 1045 receives a sample p[m+1] of the second displacement signal $\Delta X_{OPT}(t)$ 942 from the second buffer 1048 and passes it through to the multiplexer 1058 to be output as the next non-interpolated term p[m+1] of the displacement signal $\Delta X(t)$ 944 to the third buffer 1059. The foregoing operations are then iterated as necessary. Note that a portion of a displacement signal $\Delta X(t)$ 944, that has been obtained as described above, is plotted FIG. 10B.

Moreover, background calibration of the interpolator module 1045 can be performed by using the intensity pattern 910 as absolute displacement $\Delta X$ reference, as described below. For instance, the filter 1054 can conditionally update the scale factor C after a change p[m]−p[m j] of the second displacement signal $\Delta X_{OPT}(t)$ 942 over j of its samples exceeds a certain displacement threshold. Setting a larger threshold (e.g., integrating over multiple tile border crossings) will improve calibration accuracy, especially if the second sampling rate of the second displacement signal $\Delta X_{OPT}(t)$ 942 is low, but it would also reduce the update rate of the background calibration. In practice, the temperature coefficient of the coil 934 used to acquire the first displacement signal $\Delta X_{bEMF}(t)$ 942 is on the order of seconds, while a motion frequency of the mass 1164 inside a haptic engine is usually >50 Hz, so calibration rate is not expected to be a problem.

Figure 11A:
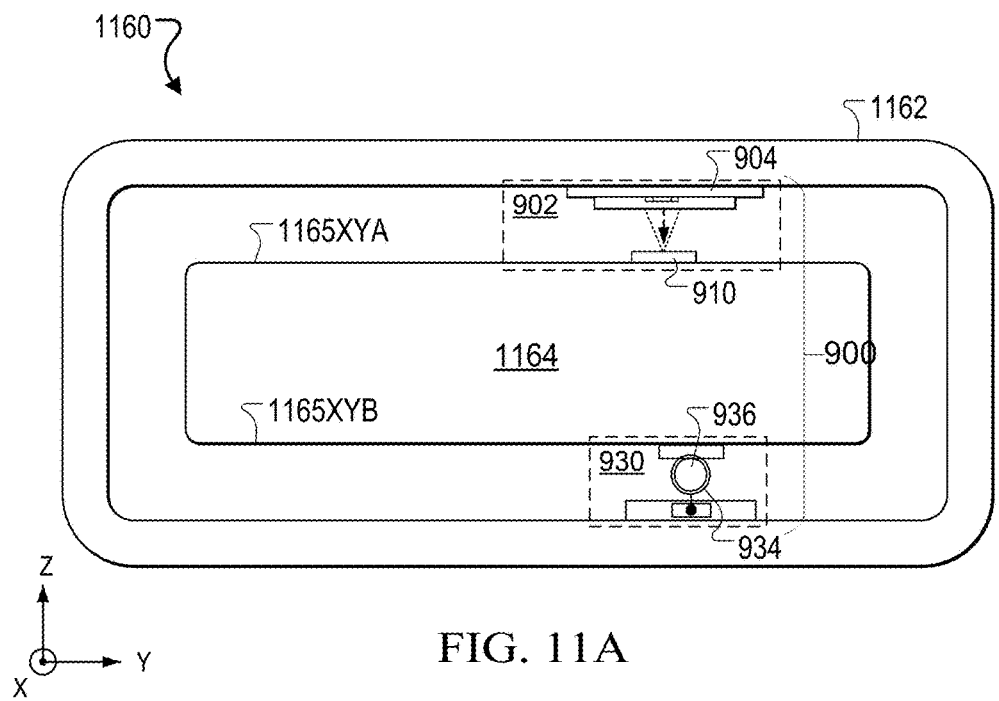
FIGS. 11A-11B show aspects of a haptic system that uses the displacement measuring system of FIGS. 9A-9L.
Figure 11B:
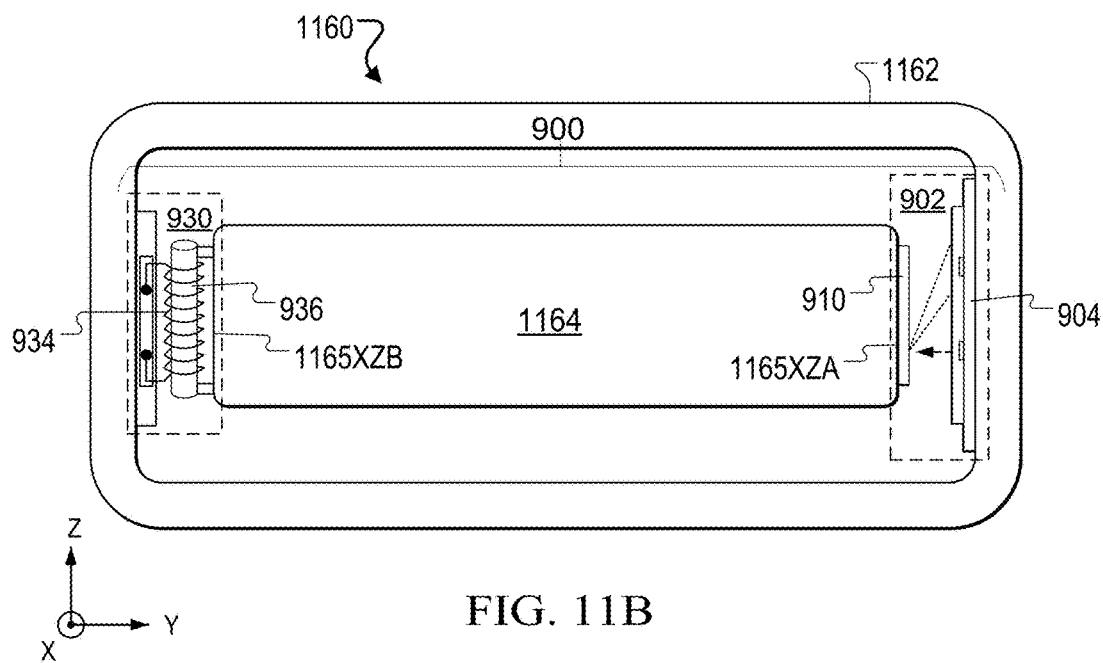

Note that the displacement signal $\Delta X(t)$ 944 determined by the processor 925, when the displacement measuring system 900 is arranged relative the moving mass 1164 as shown in FIG. 9A, is indicative of displacements $\Delta X$ of the mass along the x-axis. Other displacements can be determined by the processor 925 depending on positioning of the displacement measuring system 900 inside a haptic engine that includes the mass 1164, or by using extended capability of the displacement measuring system. FIGS. 11A-11B show example implementations of a haptic engine 1160. In each of these implementations the haptic engine 1160 has a frame 1162 that encompasses the mass 1164 and the displacement measuring system 900.

FIG. 11A is a side view, in the (y,z) plane, of a first implementation of the haptic engine 1160. Here, the optical sensing system 902 of the displacement measuring system 900 is arranged such that the intensity pattern 910 is supported by the mass 1164 on a surface 1165XYA parallel to the (x,y) plane, and the mount 904 is supported by the frame 1162 on a face parallel to the (x,y) plane. Here, the tile borders 913 of the intensity pattern 910 are oriented along the y-axis. Additionally, the bEMF sensing system 930 of the displacement measuring system 900 is arranged such that the magnet 936 is coupled with the mass 1164 at a surface 1165XYB parallel to the (x,y) plane and opposite to the surface 1165XYA, and the coil 934 is coupled with the frame 1162 at another face parallel to the (x,y) plane. Alternatively, the bEMF sensing system 930 can be arranged such that the magnet 936 is coupled with the mass 1164 at the same surface 1165XYA on which the intensity pattern 910 is supported, and the coil 934 is coupled with the frame 1162 at the same face on which the mount 904 is supported. In either of these arrangements, the longitudinal axis of the coil 934 is oriented parallel to the x-axis. In this first implementation of the haptic engine 1160, the processor 925 determines a displacement $\Delta X$ of the mass 1164 based on corresponding changes in the first displacement signal $\Delta X_{bEMF}(t)$ 942 and the second displacement signal $\Delta X_{OPT}(t)$ 942 caused by motion of the mass along the x-axis (e.g., vibration in-and-out of page). In other implementations, two instances of the bEMF sensing system 930 can be used in conjunction with one instance of the optical sensing system 902. For instance, a first instance of the bEMF sensing system 930 can be arranged on surface 1165XYA and a second instance of the bEMF sensing system 930 can be arranged on surface 1165XYB.

FIG. 11B is a side view, in the (y,z) plane, of a second implementation of the haptic engine 1160. Here, the optical sensing system 902 of the displacement measuring system 900 is arranged such that the intensity pattern 910 is supported by the mass 1164 on a surface 1165XZA parallel to the (x,z) plane, and the mount 904 is supported by the frame 1162 on a face parallel to the (x,z) plane. Here, the tile borders 913 of the intensity pattern 910 are oriented along the x-axis. Additionally, the bEMF sensing system 930 of the displacement measuring system 900 is arranged such that the magnet 936 is coupled with the mass 1164 at a surface 1165XZB parallel to the (x,z) plane and opposite to the surface 1165XZA, and the coil 934 is coupled with the frame 1162 at another face parallel to the (x,z) plane. Alternatively, the bEMF sensing system 930 can be arranged such that the magnet 936 is coupled with the mass 1164 at the same surface 1165XZA on which the intensity pattern 910 is supported, and the coil 934 is coupled with the frame 1162 at the same face on which the mount 904 is supported. In either of these arrangements, the longitudinal axis of the coil 934 is oriented parallel to the z-axis. In this second implementation of the haptic engine 1160, the processor 925 determines a displacement $\Delta Z$ of the mass 1164 based on corresponding changes in the first displacement signal $\Delta X_{bEMF}(t)$ 942 and the second displacement signal $\Delta X_{OPT}$ (t) 942 caused by motion of the mass along the z-axis (e.g., vibration up-and-down on page). In other implementations, two instances of the bEMF sensing system 930 can be used in conjunction with one instance of the optical sensing system 902. For instance, a first instance of the bEMF sensing system 930 can be arranged on surface 1165XZA and a second instance of the bEMF sensing system 930 can be arranged on surface 1165XZB.

In order to also measure a displacement ΔY of the mass 1164 along the y-axis, e.g., corresponding to vibration left-and-right on page, concurrently with the displacement ΔX of the mass caused along the x-axis, e.g., corresponding to vibration in-and-out of page, an additional instance of the displacement measuring system 900 can be disposed adjacent to the instance of the displacement measuring system 900 shown in FIG. 11A, for instance. In this case, the additional instance of the displacement measuring system 900 is arranged to have (i) the tile borders 913 of the intensity pattern 910 oriented along the x-axis, and (ii) the longitudinal axis of the coil 934 oriented parallel to the y-axis.

Alternatively, the optical sensing system 902 of the displacement measuring system 900 can be modified to allow for concurrently measuring the displacement ΔX of the mass along the x-axis, e.g., corresponding to vibration in-and-out of page, and the displacement ΔY of the mass along the y-axis, e.g., corresponding to vibration left-and-right on page. A first modification of the optical sensing system 902 includes replacement of the intensity pattern 910 with an intensity pattern that encodes 2D spatial information, e.g., in the (x,y) plane, as described below in connection with FIGS. 12A-12C. Another modification of the optical sensing system 902 includes a modified configuration of the optical source 906 that provides, as described below in connection with FIGS. 12A and 12D-12E, a pair of reference beams in addition to the probe beam 908.

Figure 12A:
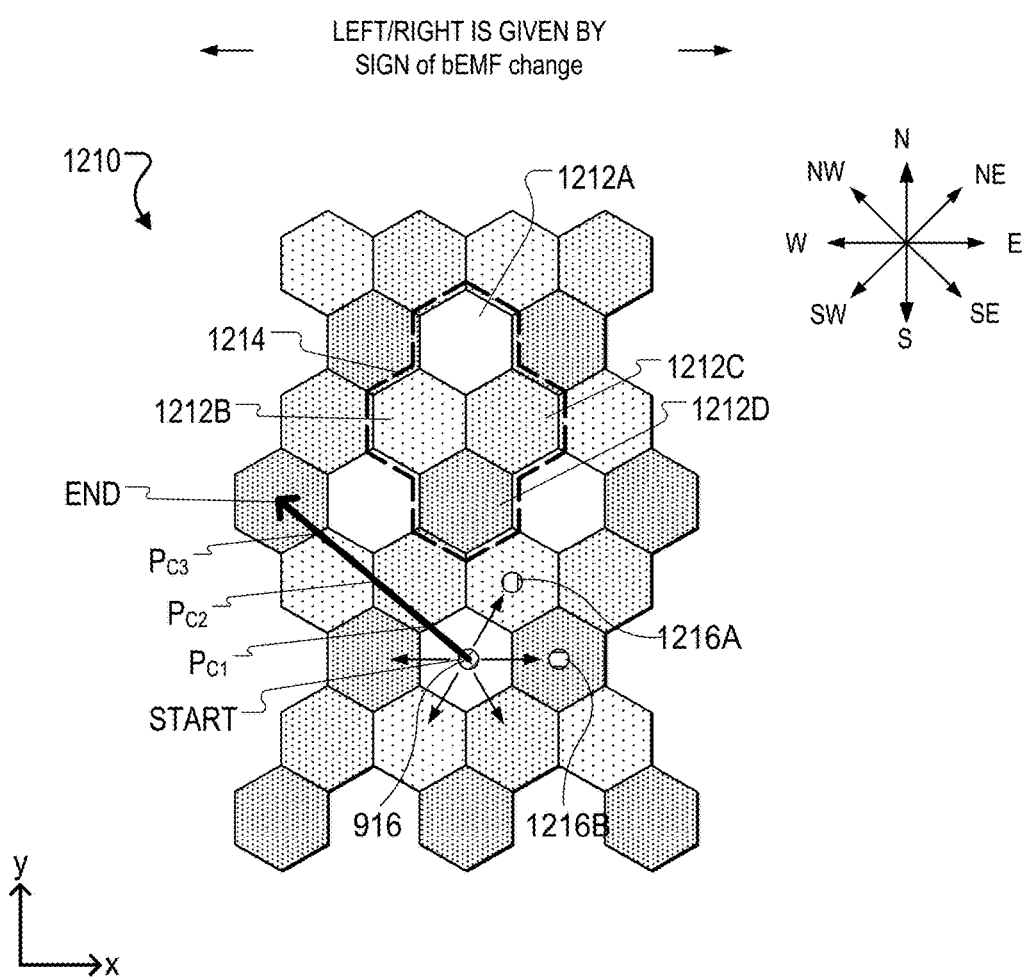
FIGS. 12A-12I show aspects of another optical sensing system to be used in conjunction with the displacement measuring system of FIG. 9A.

FIG. 12A is a plan view, e.g., in the (x,y) plane, of an intensity pattern 1210 that includes a plurality of hexagonal-shaped tiles 1212, each of which configured to redirect to the photodetector 920 light having an intensity different from an intensity of light redirected to the photodetector by any of its six adjacent tiles. In this example, the intensity pattern 1210 is a four-level intensity pattern that has tiles of first type 1212A, tiles of second type 1212B, tiles of third type 1212A and tiles of fourth type 1212D arranged to form a unit cell 1214. Note that the honeycomb arrangement of the intensity pattern 1210 can be generated by translating the unit cell 1214 in any of the eight directions E, NE, N, NW, W, SW, S, SE.

Figure 12B:
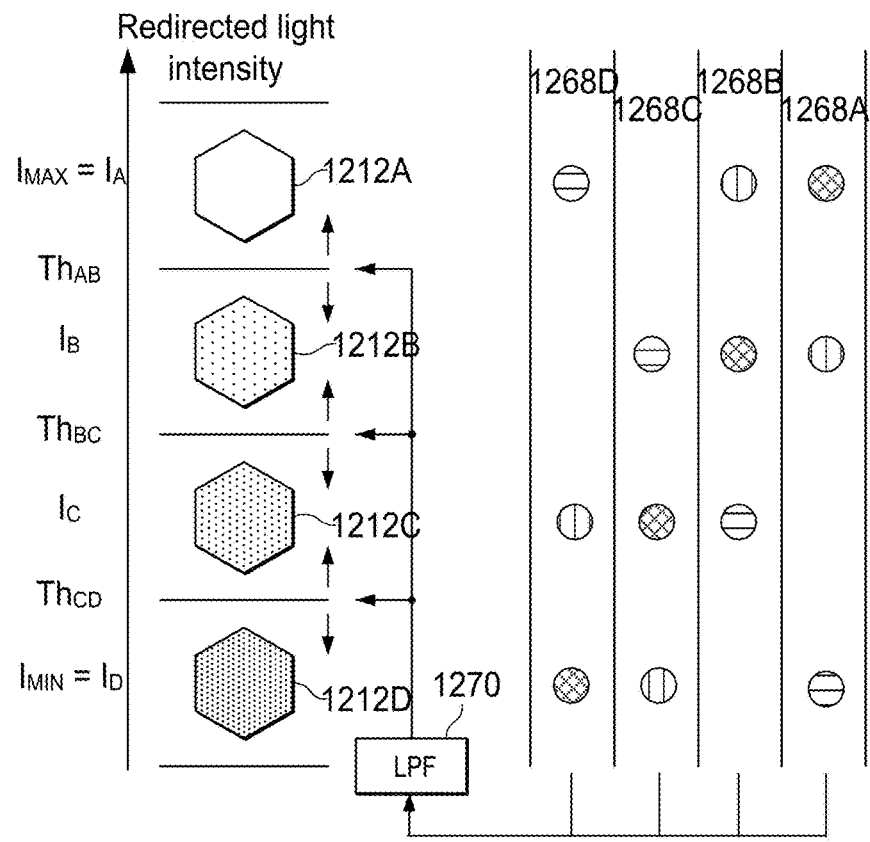

FIG. 12B shows that a tile of first type 1212A is configured such that, when the probe beam 908 illuminates it, the redirected light 918 has an intensity $I_A$ equal to maximum intensity $I_{MAX}$, $I_A = I_{MAX}$. A tile of fourth type 1212D is configured such that, when the probe beam 908 illuminates it, the redirected light 918 has an intensity $I_D$ equal to minimum intensity $I_{MIN}$, $I_D = I_{MIN}$. A tile of second type 1212B is configured such that, when the probe beam 908 illuminates it, the redirected light 918 has a first intermediary intensity $I_B$ that satisfies $I_{MIN} < I_B < I_{MAX}$. And, a tile of third type 1212C is configured such that, when the probe beam 908 illuminates it, the redirected light 918 has a second intermediary intensity $I_C$ that satisfies $I_{MIN} < I_C < I_B$. The four types of tiles can redirect light having any four arbitrary intensity levels. The above case is only an exemplary embodiment. As described above in connection with FIG. 9C, a photodiode of the photodetector 920 integrates, at a sampling time t, the redirected light 918 to provide a raw intensity value I(t) a threshold module. In the example shown in FIG. 12B, the threshold module of the photodetector 920 classifies the raw intensity value I(t) against threshold values $Th_{AB}$, $Th_{BC}$ and $Th_{CD}$ in the following manner. If $I(t) > Th_{AB}$, then the threshold module of the photodetector 920 can set $I(t)=I_A$. If $I(t) \leq Th_{CD}$, then the threshold module of the photodetector 920 can set $I(t)=I_D$. If $Th_{BC} < I(t) < Th_{AB}$, then the threshold module of the photodetector 920 can set $I(t)=I_B$. If $Th_{CD} < I(t) < Th_{BC}$, then the threshold module of the photodetector 920 can set $I(t)=I_C$. In some implementations, the threshold values $Th_{AB}$, $Th_{BC}$ and $Th_{CD}$ can be predetermined. In other implementations, the threshold values $Th_{AB}$, $Th_{BC}$ and $Th_{CD}$ can be updated in an adaptive manner, as described below. In this manner, the photodetector 920 issues an intensity signal 1222 (shown in FIG. 12F) that can have only four values $\{I_D=I_{MIN}, I_C, I_B, I_A=I_{MAX}\}$ and is related to the intensity of the light redirected by the intensity pattern 1210 to the photodetector, as the intensity pattern carried by the mass 1164 is displaced along the x-axis and the y-axis relative to the probe beam 908.

Figure 12C:

Referring again to FIG. 12A, the light source 906 provides, in addition to the probe beam 908 that forms the probe beam spot 916 as it illuminates a tile of the intensity pattern 1210, a first reference beam that forms a first reference beam spot 1216A and a second reference beam that forms a second reference beam spot 1216B. Note that a separation between each of the probe beam spot 916, the first reference beam spot 1216A, and the second reference beam spot 1216B matches the separation between adjacent tiles of the intensity pattern 1210, such that the three beams provided by the light source 906 always illuminate tiles of different types. In some implementations, the light source 906 includes an array of three VCSELs that emit the probe beam 908 and the pair of the reference beams. In other implementations, the light source 906 includes an array of three LEDs that emit non-collimated light that are coupled with one or more beam forming optics to provide the probe beam 908 and the pair of the reference beams. FIG. 12C shows that redirected light associated with each of the first reference beam 1216A and the second reference beam 1216B can be sampled at slower rates relative to the sampling rate of redirected light 918 associated with the probe beam 908 to save power and bandwidth. Referring again to FIG. 12B, the light source 906's drive level and the photodetector 920's ADC level can be adjusted to correspond to an appropriate one of the levels $I_A$, $I_B$, $I_C$, $I_D$ of the intensity of the redirected light, based on differences between the detected intensity levels corresponding to the probe beam 908 relative to the reference beams.

Moreover, in the example shown in FIG. 12A, the first reference beam spot 1216A and the second reference beam spot 1216B are cast on adjacent tiles located NE and E, respectively, relative to the tile on which the probe beam spot 916 is cast. In this manner, once the processor 925 determines a type of a tile on which the probe beam spot 916 is currently located, a combination of a level of intensity of light redirected by the tile illuminated by the probe beam, a first level of intensity of light redirected by a first adjacent tile illuminated by the first reference beam, and a second level of intensity of light redirected by a second adjacent tile illuminated by the second reference beam can be only one from among combinations 1268 shown in FIG. 12B.

In accordance with combination 1268A, when the probe beam spot 916 is cast on a tile of first type 1212A, the first and second reference beam spots 1216A, 1216B are cast on adjacent tiles of second type 1212B and fourth type 1212D located NE and E, respectively, relative to the tile of first type 1212A. In accordance with combination 1268B, when the probe beam spot 916 is cast on a tile of second type 1212B, the first and second reference beam spots 1216A, 1216B are cast on adjacent tiles of first type 1212A and third type 1212C located NE and E, respectively, relative to the tile of second type 1212B. In accordance with combination 1268C, when the probe beam spot 916 is cast on a tile of third type 1212C, the first and second reference beam spots 1216A, 1216B are cast on adjacent tiles of fourth type 1212D and second type 1212B located NE and E, respectively, relative to the tile of third type 1212C. In accordance with combination 1268D, when the probe beam spot 916 is cast on a tile of fourth type 1212D, the first and second reference beam spots 1216A, 1216B are cast on adjacent tiles of third type 1212C and first type 1212A located NE and E, respectively, relative to the tile of fourth type 1212D.

The combinations 1268A, 1268B, 1268C and 1268D of three signal levels issued by the photodetector 920 can be used to adaptively update the threshold values $Th_{AB}$, $Th_{BC}$, $Th_{CD}$ in the following manner. For instance, the photodetector 920 can issue, for a sampling time t and the first combination 1268A, a first set of raw intensity values $\{I_{116}(t), I_{416A}(t), I_{416B}(t)\}$ corresponding to the redirected probe beam 908, the first reference beam, and the second reference beam, respectively, that will be classified as a first set of intensity values $\{I_A, I_B, I_D\}$; for a sampling time t' and the second combination 1268B, a second set of raw intensity values $\{I_{116}(t'), I_{416A}(t'), I_{416B}(t')\}$ corresponding to the redirected probe beam 908, the first reference beam, and the second reference beam, respectively, that will be classified as a second set of intensity values $\{I_B, I_A, I_C\}$; for a sampling time t'' and the third combination 1268C, a third set of raw intensity values $\{I_{116}(t''), I_{416A}(t''), I_{416B}(t'')\}$ corresponding to the redirected probe beam 908, the first reference beam, and the second reference beam, respectively, that will be classified as a third set of intensity values $\{I_C, I_D, I_B\}$; for a sampling time t''' and the fourth combination 1268D, a fourth set of raw intensity values $\{I_{116}(t'''), I_{416A}(t'''), I_{416B}(t''')\}$ corresponding to the redirected probe beam 908, the first reference beam, and the second reference beam, respectively, that will be classified as a fourth set of intensity values $\{I_D, I_C, I_A\}$; and so on and so forth.

Moreover, the photodetector can include a digital low pass filter (LPF) 1270 configured to obtain a first statistic $<I>_A$ of the raw intensity values that have been associated with the intensity value $I_A$, where $<I>_A=<\{I_{116}(t), I_{416A}(t'), I_{416B}(t'''), \ldots\}>$; a second statistic $<I>_B$ of the raw intensity values that have been associated with the intensity value $I_B$, where $<I>_B=<\{I_{416A}(t), I_{116}(t'), I_{416B}(t''), \ldots\}>$; a third statistic $<I>_C$ of the raw intensity values that have been associated with the intensity value $I_C$, where $<I>_C=<\{I_{416B}(t'), I_{116}(t''), I_{416A}(t'''), \ldots\}>$; and a fourth statistic $<I>_D$ of the raw intensity values that have been associated with the intensity value $I_D$, where $<I>_D=<\{I_{416B}(t), I_{416A}(t''), I_{116}(t'''), \ldots\}>$. Here, the statistic denoted $<I>_X$ can be a median, mean, truncated mean, maximum or minimum of a set of raw intensity values classified as the intensity level $I_X$, where the subscript X is $\{A, B, C$ or $D\}$. In this manner, the digital LPF can adaptively update the threshold $Th_{AB}$ used by the threshold module to set the intensity values $I_A$ or $I_B$ as $Th_{AB}=(1/2)(<I>_A-<I>_B)$; the threshold $Th_{BC}$ used by the threshold module to set the intensity values $I_B$ or $I_C$ as $Th_{BC}=(1/2)(<I>_B-<I>_C)$; and the threshold $Th_{CD}$ used by the threshold module to set the intensity values $I_C$ or $I_D$ as $Th_{CD}=(1/2)(<I>_C-<I>_D)$. The foregoing operations performed by the digital LPF of the photodetector 920 amount to a procedure for self-calibrating (also referred to as a procedure for background calibrating) the optical sensing system 902 that uses the intensity pattern 1210.

Figure 12D:
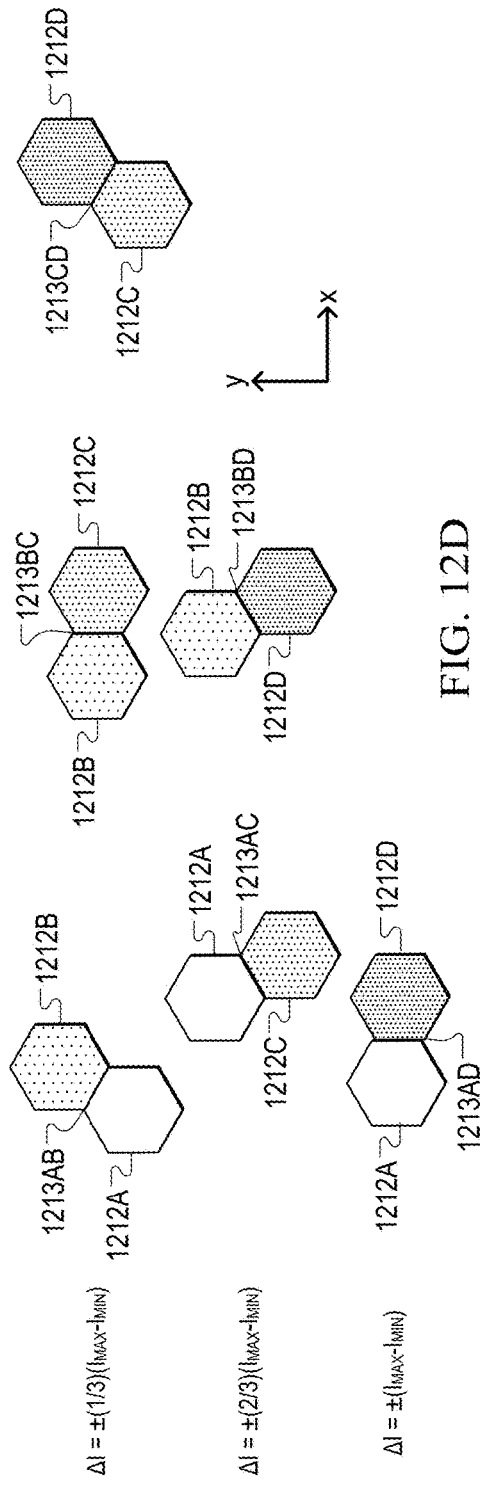

FIG. 12D shows that the four types of tiles of the intensity pattern 1210 form six possible tile borders 1213 across which the intensity of the redirected light 918 changes by a fraction of the intensity range $I_{MAX}-I_{MIN}$. In the first row of FIG. 12D, the intensity of redirected light 918 changes by $(1/3)(I_{MAX}-I_{MIN})$ for each of a tile border 1213AB formed between a tile of first type 1212A and a tile of second type 1212B, a tile border 1213BC formed between a tile of second type 1212B and a tile of third type 1212C, and a tile border 1213CD formed between a tile of third type 1212C and a tile of fourth type 1212D. In the second row of FIG. 12D, the intensity of redirected light 918 changes by $(2/3)(I_{MAX}-I_{MIN})$ for each of a tile border 1213AC formed between a tile of first type 1212A and a tile of third type 1212C, and a tile border 1213BD formed between a tile of second type 1212B and a tile of fourth type 1212D. And, in the third row of FIG. 12D, the intensity of redirected light 918 changes by $(I_{MAX}-I_{MIN})$ for a tile border 1213AD formed between a tile of first type 1212A and a tile of fourth type 1212D.

Referring again to FIG. 12A, note that the tile borders of the intensity pattern 1210 are distributed at known locations relative to each other in the (x,y) plane, so this intensity pattern can be used, as part of the optical sensing system 902 of the displacement measuring system 900, by the processor 925 to concurrently measure the mass 1164's displacement $\Delta X$ along the x-axis and displacement $\Delta Y$ along the y-axis. Note that during the motion of the mass 1164, the intensity pattern 1210 moves (along with the mass) relative to a probe beam spot 916 corresponding to the probe beam 908 that illuminates the intensity pattern, one tile at a time. In this manner, multiple tile border crossings will occur as the intensity pattern 1210 is displaced in the (x,y) plane, where for each tile border crossing, a tile border formed between adjacent tiles of different type crosses through the beam spot 916 associated with the static probe beam 908.

Figure 12E:
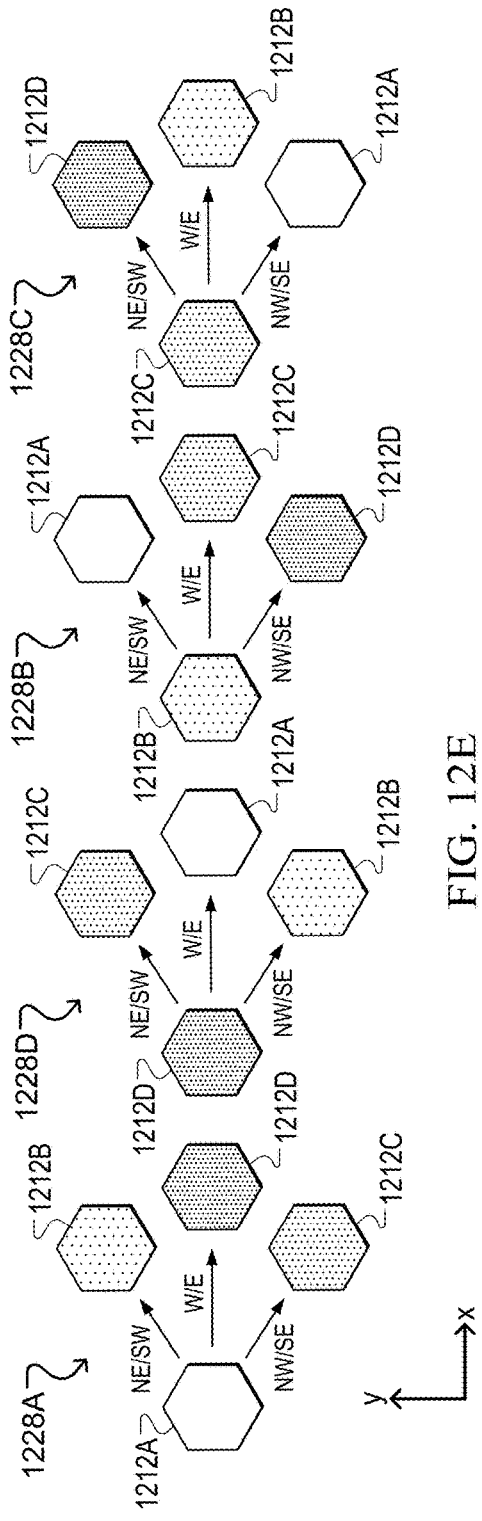

FIG. 12E shows that for each type of tile, there are 6 possible tile border crossings, three out of which are ambiguously paired. When the probe beam 908 illuminates a tile of first type 1212A, first tile border crossings 1228A will occur when (i) the tile border 1213AB crosses the probe beam, so the probe beam then illuminates either the tile of second type 1212B that is disposed on the NE side of the tile of first type 1212A or the tile of second type 1212B that is disposed on the SW of the tile of first type 1212A; (ii) the tile border 1213AD crosses the probe beam, so the probe beam then illuminates either the tile of fourth type 1212D that is disposed on the E side of the tile of first type 1212A or the tile of fourth type 1212D that is disposed on the W of the tile of first type 1212A; and (iii) the tile border 1213AC crosses the probe beam, so the probe beam then illuminates either the tile of third type 1212C that is disposed on the SE side of the tile of first type 1212A or the tile of third type 1212C that is disposed on the NW of the tile of first type 1212A.

Further, when the probe beam 908 illuminates a tile of fourth type 1212D, fourth tile border crossings 1228D will occur when (i) the tile border 1213CD crosses the probe beam, so the probe beam then illuminates either the tile of third type 1212C that is disposed on the NE side of the tile of fourth type 1212D or the tile of third type 1212C that is disposed on the SW of the tile of fourth type 1212D; (ii) the tile border 1213AD crosses the probe beam, so the probe beam then illuminates either the tile of first type 1212A that is disposed on the E side of the tile of fourth type 1212D or the tile of first type 1212A that is disposed on the W of the tile of fourth type 1212D; and (iii) the tile border 1213BD crosses the probe beam, so the probe beam then illuminates either the tile of second type 1212B that is disposed on the SE side of the tile of fourth type 1212D or the tile of second type 1212B that is disposed on the NW of the tile of fourth type 1212D.

Furthermore, when the probe beam 908 illuminates a tile of second type 1212B, second tile border crossings 1228B will occur when (i) the tile border 1213AB crosses the probe beam, so the probe beam then illuminates either the tile of first type 1212A that is disposed on the NE side of the tile of second type 1212B or the tile of first type 1212A that is disposed on the SW of the tile of second type 1212B; (ii) the tile border 1213BC crosses the probe beam, so the probe beam then illuminates either the tile of third type 1212C that is disposed on the E side of the tile of second type 1212B or the tile of third type 1212C that is disposed on the W of the tile of second type 1212B; and (iii) the tile border 1213BD crosses the probe beam, so the probe beam then illuminates either the tile of fourth type 1212D that is disposed on the SE side of the tile of second type 1212B or the tile of fourth type 1212D that is disposed on the NW of the tile of second type 1212B.

Also, when the probe beam 908 illuminates a tile of third type 1212C, third tile border crossings 1228C will occur when (i) the tile border 1213CD crosses the probe beam, so the probe beam then illuminates either the tile of fourth type 1212D that is disposed on the NE side of the tile of third type 1212C or the tile of fourth type 1212D that is disposed on the SW of the tile of third type 1212C; (ii) the tile border 1213BC crosses the probe beam, so the probe beam then illuminates either the tile of second type 1212D that is disposed on the E side of the tile of third type 1212C or the tile of second type 1212B that is disposed on the W of the tile of third type 1212C; and (iii) the tile border 1213AC crosses the probe beam, so the probe beam then illuminates either the tile of first type 1212A that is disposed on the SE side of the tile of third type 1212C or the tile of first type 1212A that is disposed on the NW of the tile of third type 1212C.

Referring again to FIG. 12A, a probe beam spot 916 corresponding to the probe beam 908 illuminates (i) a tile of first type 1212A at a departure point (labeled "START") when the motion of the mass 1164 begins, and (ii) a tile of fourth type 1212D at an arrival point (labeled "END") when the motion of the mass ends. During this motion of the mass, there have been successive tile border crossings at unknown points $P_{C1}$, $P_{C2}$, $P_{C3}$. The times when these tile border crossings occur and their exact location in the (x,y) plane is determined by the processor 925 in the following manner.

Figure 12F:
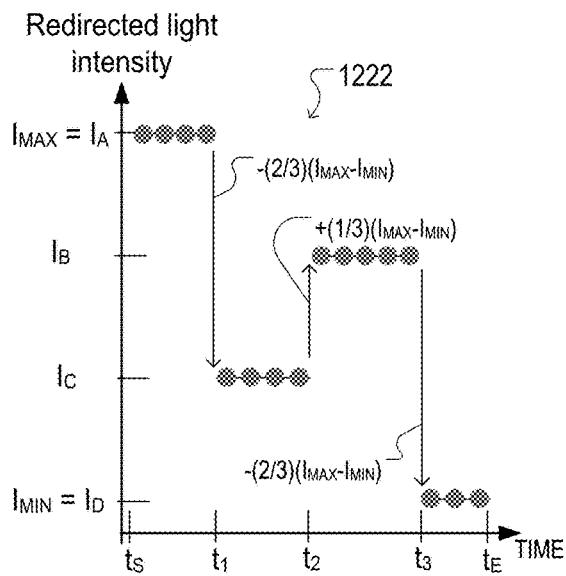

An intensity signal 1222 issued by the photodetector 920 relates to the intensity of the light redirected by the intensity pattern 1210 to the photodetector. FIG. 12F shows changes in the intensity signal 1222 caused by the multiple tile border crossings that occur as the intensity pattern 1210 carried by the mass 1164 is displaced relative to the probe beam spot 916 from the departure point to the arrival point. As described above in connection with FIG. 9C, the tile border crossings occur at times $t_1$, $t_2$, $t_3$ corresponding to predefined changes of the intensity signal 1222, e.g., corresponding ones the predefined changes shown in FIG. 12D: $\pm(1/3)\Delta I$, $\pm(2/3)\Delta I$, or $\pm\Delta I$, where $\Delta I=(I_{MAX}-I_{MIN})$.

Figure 12G:
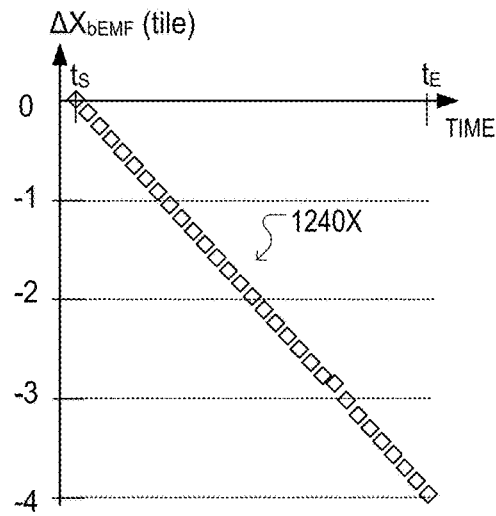

Additionally, a first displacement signal $\Delta X_{bEMF}(t)$ 1240X associated with the displacement $\Delta X$ of the mass 1164 along the x-axis is acquired by the bEMF sensing system 930 concurrently with the intensity signal 1222. FIG. 12G shows the first displacement signal $\Delta X_{bEMF}(t)$ 1240X acquired, from a start time $t_S$ to an end time $t_E$, while the mass 1164 is displaced relative to the probe beam spot 916 from the departure point to the arrival point. As a slope of the first displacement signal $\Delta X_{bEMF}(t)$ 1240X is negative (due to a non-zero westward component of the mass 1164's velocity) over the entire time interval $(t_E-t_S)$, the processor 925 determines that the direction of motion of the mass 1164 has a non-zero westward component over the entire time interval $(t_E-t_S)$.

Referring again to FIG. 12F, the processor 925 determines that the first tile border crossing that occurs at $t_1$ causes a decrease of $2/3(I_{MAX}-I_{MIN})$ of the intensity signal 1222. As such, the processor 925 determines, based on the second row of FIG. 12D, that the first tile border crossing that occurs at $t_1$ is across either (i) a tile border 1213AC, in which case the probe beam spot 916 transitions onto a tile of third type 1212C; or (ii) a tile border 1213BD, in which case the probe beam spot 916 transitions onto a tile of fourth type 1212D. In the first case (i), the first reference spot 1216A transitions onto a tile of fourth type 1212D and the second reference spot 1216B transitions onto a tile of second type 1212B. In the second case (ii), the first reference spot 1216A transitions onto a tile of third type 1212C and the second reference spot 1216B transitions onto a tile of first type 1212A. In the example illustrated in FIG. 12A, the difference between intensity of redirected light associated with the probe beam spot 916 and intensity of redirected light associated with the first reference spot 1216A is $-(1/3)(I_{MAX}-I_{MIN})$; and the difference between intensity of redirected light associated with the probe beam spot 916 and intensity of redirected light associated with the second reference spot 1216B is $+(1/3)(I_{MAX}-I_{MIN})$. This corresponds to case (i), and contradicts case (ii). In this manner, the processor 925 determines that, from the start time $t_S$ to the time $t_1$ when the first tile border crossing occurs across a tile border 1213AC, the probe beam spot 916 is cast on a tile of first type 1212A; and, from the time $t_1$ to the time $t_2$ when a second tile border crossing occurs, the probe beam spot 916 is cast on a tile of third type 1212C. Then, the processor 925 determines, based on FIG. 12E, that the probe beam spot 916 is cast on either the tile of third type 1212C that is disposed on the SE side of the tile of first type 1212A or the tile of third type 1212C that is disposed on the NW side of the tile of first type 1212A. Here, the processor 925 uses the previous determination, made based on the first displacement signal $\Delta X_{bEMF}(t)$ 1240X, that the direction of motion of the mass 1164 has a non-zero westward component over the entire time interval $(t_E-t_S)$.

In this manner, the processor 925 determines that, from the start time $t_S$ to the time $t_1$ (when the first tile border crossing occurs across a tile border 1213AC), the probe beam spot 916 is cast on a tile of first type 1212A; and, from the time $t_1$ to the time $t_2$ (when a second tile border crossing occurs), the probe beam spot 916 is cast on a tile of third type 1212C that is disposed on the NW side of the tile of first type 1212A. As such, by time $t_1$ when the first tile border crossing occurs, the mass 1164 has moved about one size of a tile westward and about one half of the size of the tile northward from the starting point.

Further, the processor 925 determines that the second tile border crossing that occurs at $t_2$ causes an increase of $1/3(I_{MAX}-I_{MIN})$ of the intensity signal 1222. As such, the processor 925 determines, based on the first row of FIG. 12D, that the second tile border crossing that occurs at $t_2$ is across a tile border 1213BC, in which case the probe beam spot 916 transitions from the current tile of third type 1212C onto a tile of second type 1212B. Then, the processor 925 determines, based on FIG. 12E, that the probe beam spot 916 is cast on either the tile of second type 1212B that is disposed on the E side of the tile of third type 1212C or the tile of second type 1212B that is disposed on the W side of the tile of third type 1212C. Here, the processor 925 uses the previous determination, made based on the first displacement signal $\Delta X_{bEMF}(t)$ 1240X, that the direction of motion of the mass 1164 has a non-zero westward component over the entire time interval $(t_E-t_S)$.

In this manner, the processor 925 determines that, from the time $t_1$ (when the first tile border crossing occurs across a tile border 1213AC) to the time $t_2$ (when the second tile border crossing occurs across a tile border 1213BC), the probe beam spot 916 is cast on a tile of third type 1212C; and, from the time $t_2$ to the time $t_3$ (when a third tile border crossing occurs), the probe beam spot 916 is cast on a tile of second type 1212B that is disposed on the W side of the tile of third type 1212C. As such, by time $t_2$ when the second tile border crossing occurs, the mass 1164 has moved about two sizes of the tile westward and about one size of the tile northward from the starting point.

Furthermore, the processor 925 determines that the third tile border crossing that occurs at $t_3$ causes a decrease of $2/3(I_{MAX}-I_{MIN})$ of the intensity signal 1222. As such, the processor 925 determines, based on the second row of FIG. 12D, that the third tile border crossing that occurs at $t_3$ is across a tile border 1213BD, in which case the probe beam spot 916 transitions from the current tile of second type 1212B onto a tile of fourth type 1212D. Then, the processor 925 determines, based on FIG. 12E, that the probe beam spot 916 is cast on either the tile of fourth type 1212D that is disposed on the SE side of the tile of second type 1212B or the tile of fourth type 1212D that is disposed on the NW side of the tile of second type 1212B. Here, the processor 925 uses the previous determination, made based on the first displacement signal $\Delta X_{bEMF}(t)$ 1240X, that the direction of motion of the mass 1164 has a non-zero westward component over the entire time interval $(t_E-t_S)$.

In this manner, the processor 925 determines that, from the time $t_2$ (when the second tile border crossing occurs across a tile border 1213BC) to the time $t_3$ (when the third tile border crossing occurs across a tile border 1213BD), the probe beam spot 916 is cast on a tile of second type 1212B; and, from the time $t_3$ to the end time $t_E$, the probe beam spot 916 is cast on a tile of fourth type 1212D that is disposed on the NW side of the tile of second type 1212B. As such, by time $t_3$ when the third tile border crossing occurs, the mass 1164 has moved about three sizes of the tile westward and more than one and a half size of the tile northward from the starting point.

Figure 12H:
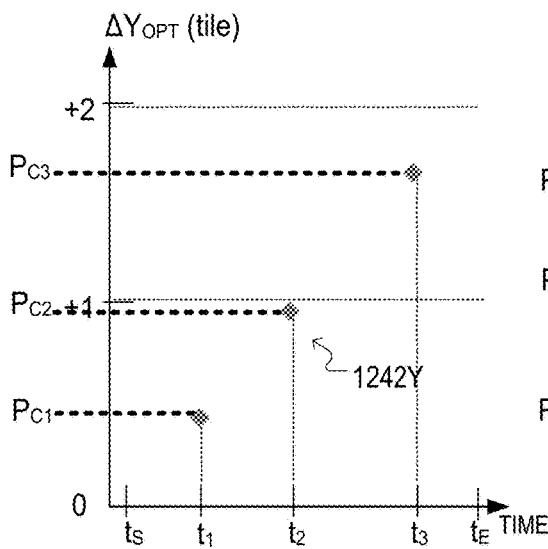

The processor 925 uses the foregoing information determined based on (i) the changes of the intensity signal 1222 and (ii) the slope of the first displacement signal $\Delta X_{bEMF}(t)$ 1240X to determine a second displacement signal $\Delta X_{OPT}(t)$ 1242X associated with the displacement $\Delta X$ of the mass 1164 along the x-axis, and a second displacement signal $\Delta Y_{OPT}(t)$ 1242Y associated with the displacement $\Delta Y$ of the mass 1164 along the y-axis. FIG. 12H shows the second displacement signal $\Delta Y_{OPT}(t)$ 1242Y associated with the displacement $\Delta Y$ of the mass 1164 along the y-axis corresponding to the trip in the (x,y) plane from the starting point to the ending point, as shown in FIG. 12A. Note that, as the second displacement signal $\Delta Y_{OPT}(t)$ 1242Y includes only the y-coordinates of the crossing points $P_{C1}$, $P_{C2}$, $P_{C3}$, a resolution of the second displacement signal $\Delta Y_{OPT}(t)$ 1242Y is about 10 μm to 50 μm corresponding to a feature size of the intensity pattern 1210.

Figure 12I:
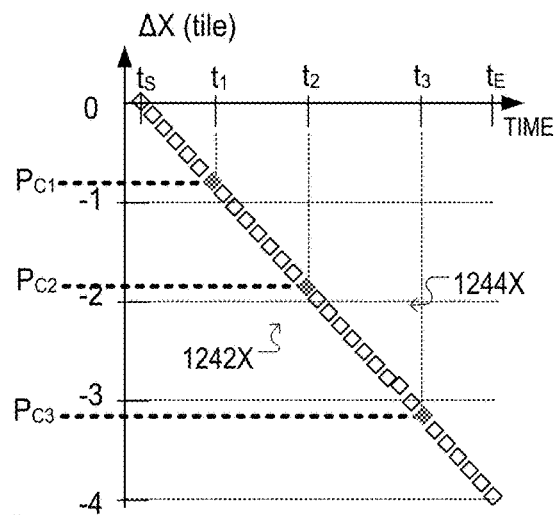

FIG. 12I shows (represented by filled diamonds) the second displacement signal $\Delta X_{OPT}(t)$ 1242X associated with the displacement $\Delta X$ of the mass 1164 along the x-axis corresponding to the trip in the (x,y) plane from the starting point to the ending point, as shown in FIG. 12A. Note that, as the second displacement signal $\Delta X_{OPT}(t)$ 1242X includes only the x-coordinates of the crossing points $P_{C1}$, $P_{C2}$, $P_{C3}$, a resolution of the second displacement signal $\Delta X_{OPT}(t)$ 1242X is about 10 μm to 50 μm, corresponding to a feature size of the intensity pattern 1210.

FIG. 12I also shows a displacement signal $\Delta X(t)$ 1244X associated with the displacement $\Delta X$ of the mass 1164 along the x-axis corresponding to the trip in the (x,y) plane from the starting point to the ending point, as shown in FIG. 12A. Here, the processor 925 determines the displacement signal $\Delta X(t)$ 1244X by interpolating the previously determined second displacement signal $\Delta X_{OPT}(t)$ 1242X with the first displacement signal $\Delta X_{bEMF}(t)$ 1240X, by using the interpolation technique described above in connection with FIG. 10A. Note that, because the displacement signal $\Delta X(t)$ 1244X includes, in addition to the x-coordinates of the crossing points $P_{C1}$, $P_{C2}$, $P_{C3}$, the x-components of the points between the starting point and the ending point of the trip as determined by the bEMF sensing system 930, a resolution of the displacement signal $\Delta X(t)$ 1244X is about 1 μm, corresponding to the resolution of the bEMF sensing system.

Referring again to FIG. 9A, several optical structures can be used to redirect the probe beam 908 that illuminates the intensity pattern 910 to the photodetector 920. In some implementations, these optical structures are configured to use a reflective intensity pattern 910. In other implementations, these optical structures are configured to use a transmissive intensity pattern 910 in conjunction with one or more reflective elements.

Figure 13A:
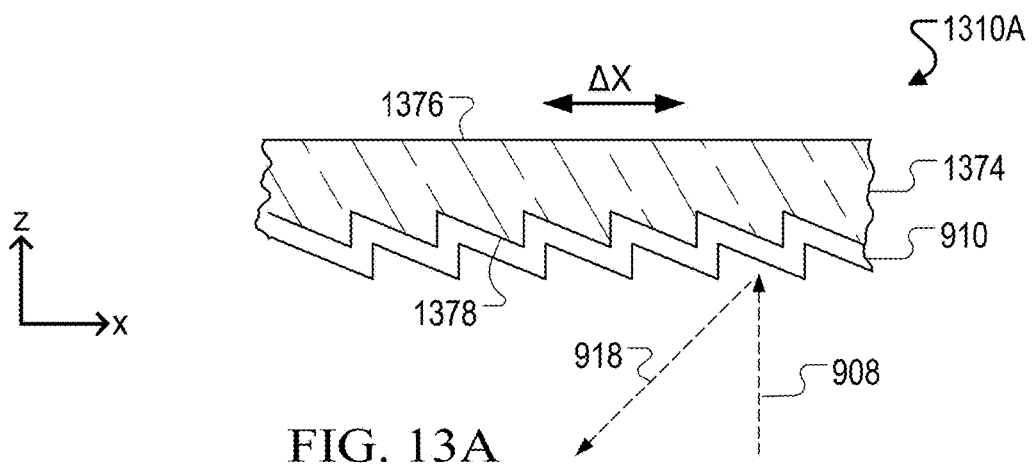
FIGS. 13A-13C show examples of optical structures of the displacement measuring system of FIG. 9A that are used for redirecting probe light that illuminates an intensity pattern to a photodetector.

FIG. 13A shows an example of an optical structure 1310A that includes a substrate 1374 having a first surface 1376 and a second surface 1378 opposing the first surface. The first surface 1376 is to be coupled with a surface 1165 of the mass 1164 that is spaced apart from and facing the light source 906 and the photodetector 920. The second surface 1378 is configured with a structure that includes facets that are tilted relative to the probe beam 908. Here, a reflective intensity pattern 910 is attached to the second surface 1378, such that the probe beam 908 illuminates the reflective intensity pattern, one-tile-at-a-time. A tilt of the facets of the second surface 1378 is configured such that the reflective intensity pattern 910 redirects the probe beam 908 as a redirected beam 918 to the photodetector 920, regardless of a displacement $\Delta X$ along the x-axis of the reflective intensity pattern relative to the probe beam. In this example, different tiles of the reflective intensity pattern 910 have different reflectivities, such that light redirected to the photodetector 920 from adjacent tiles has different intensities.

Figure 13B:
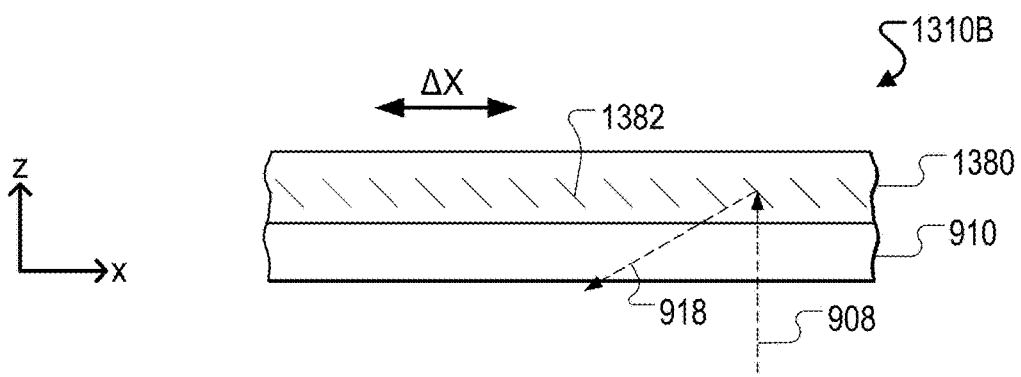

FIG. 13B shows another example of an optical structure 1310B that includes a micro-mirror array 1380 to be mounted on a surface 1165 of the mass 1164 that is spaced apart from and facing the light source 906 and the photodetector 920. A transmissive intensity pattern 910 is coupled with the micro-mirror array 1380, such that the latter is sandwiched between the surface 1165 of the mass 1164 and the transmissive intensity pattern 910. As such, the probe beam 908 illuminates the transmissive intensity pattern 910, one-tile-at-a-time. In this manner, the probe beam 908 is selectively transmitted through the transmissive intensity pattern 910 to reflectors 1382 of the micro-mirror array 1380. The reflectors 1382 of the micro-mirror array 1380 are tilted relative to the transmitted probe beam 908 to reflect it as a redirected beam 918 to the photodetector 920, regardless of a displacement ΔX along the x-axis of the transmissive intensity pattern 910 relative to the probe beam. In this example, different tiles of the transmissive intensity pattern 910 have different transmissivities, such that light redirected to the photodetector 920 from adjacent tiles has different intensities.

Figure 13C:
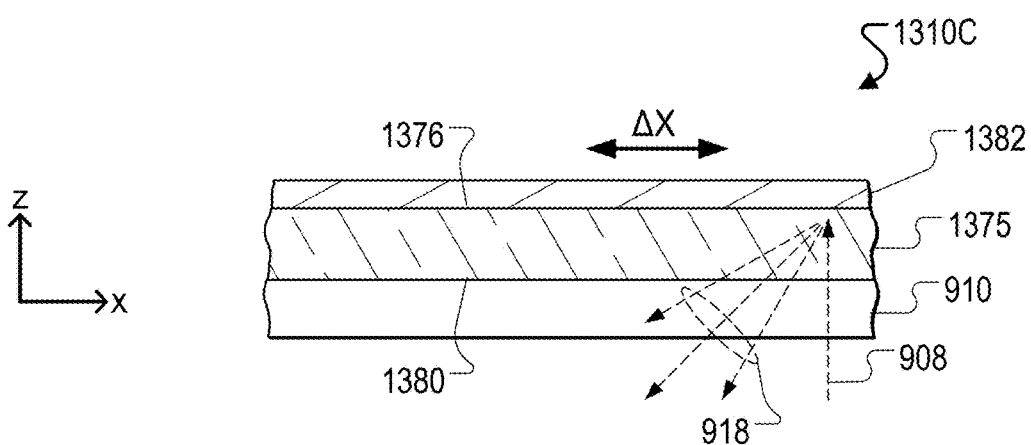

FIG. 13C shows another example of an optical structure 1310C that includes a substrate 1375 having a first surface 1376 and a second surface 1380 opposing the first surface. The substrate 1375 includes glass, plastic, or other material that is transparent to light provided by the light source 906. The first surface 1376 is to be coupled with a surface 1165 of the mass 1164 that is spaced apart from and facing the light source 906 and the photodetector 920. The optical structure 1310C further includes a scattering layer 1382 sandwiched between the first surface 1376 and the surface 1165 of the mass 1164. A transmissive intensity pattern 910 is disposed on the second surface 1380, such that the probe beam 908 illuminates the transmissive intensity pattern, one-tile-at-a-time. In this manner, the probe beam 908 is selectively transmitted through the transmissive intensity pattern 910 and through the substrate 1375 to the scattering layer 1382. A scattering structure of the scattering layer 1382 is configured such that the scattering layer scatters the transmitted probe beam 908 as a redirected beam 918 to the photodetector 920, regardless of a displacement ΔX along the x-axis of the transmissive intensity pattern 910 relative to the probe beam.

Figure 14A:
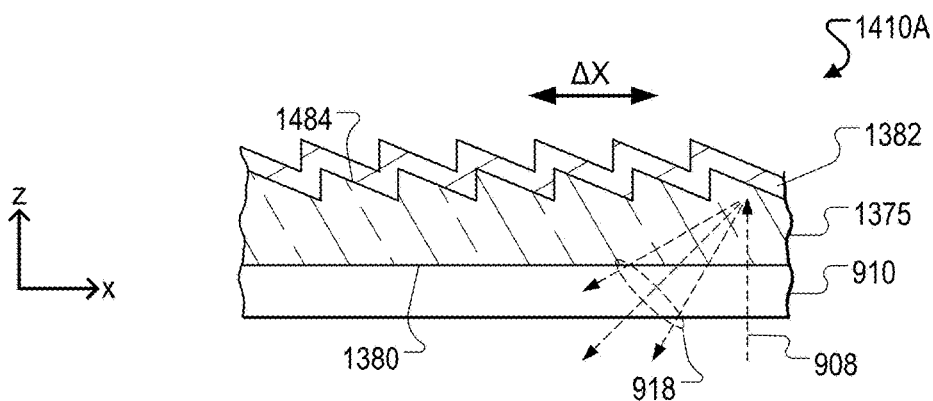
FIGS. 14A-14C show other examples of optical structures of the displacement measuring system of FIG. 9A that are used for redirecting probe light that illuminates an intensity pattern to a photodetector.

FIG. 14A shows another example of an optical structure 1410A that includes a substrate 1375 having a first surface 1484 and a second surface 1380 opposing the first surface. The substrate 1375 includes glass, plastic, or other material that is transparent to light provided by the light source 906. The optical structure 1410A further includes a diffusive layer 1382 disposed on the first surface 1484 to render the first surface diffusely reflective. A transmissive intensity pattern 910 is disposed on the second surface 1380, such that the probe beam 908 illuminates the transmissive intensity pattern, one-tile-at-a-time. In this manner, the probe beam 908 is selectively transmitted through the transmissive intensity pattern 910 and through the substrate 1375 to the diffusely reflective first surface 1484. The first surface 1484 is further configured with a structure that includes facets that are tilted relative to the transmitted probe beam 908. A tilt of the facets of the first surface 1484 is configured such that the first surface diffusely reflects the probe beam 908 as a redirected beam 918 to the photodetector 920, regardless of a displacement ΔX along the x-axis of the reflective intensity pattern relative to the probe beam.

Figure 14B:
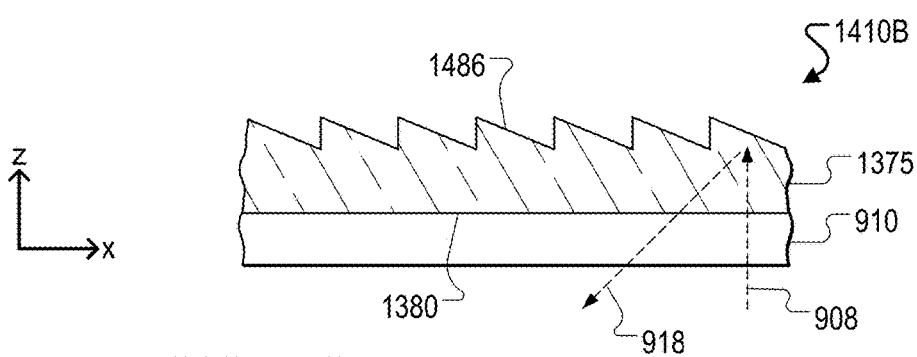

FIG. 14B shows another example of an optical structure 1410B that includes a substrate 1375 having a first surface 1486 and a second surface 1380 opposing the first surface. The substrate 1375 includes glass, plastic, or other material that is transparent to light provided by the light source 906. A transmissive intensity pattern 910 is disposed on the second surface 1380, such that the probe beam 908 illuminates the transmissive intensity pattern, one-tile-at-a-time. In this manner, the probe beam 908 is selectively transmitted through the transmissive intensity pattern 910 and through the substrate 1375 to the first surface 1486. The first surface 1486 is further configured with a structure that includes facets that are tilted relative to the transmitted probe beam 908. A tilt of the facets of the first surface 1486 is configured such that the first surface reflects via total internal reflection (TIR) the probe beam 908 as a redirected beam 918 to the photodetector 920, regardless of a displacement ΔX along the x-axis of the reflective intensity pattern relative to the probe beam.

Figure 14C:
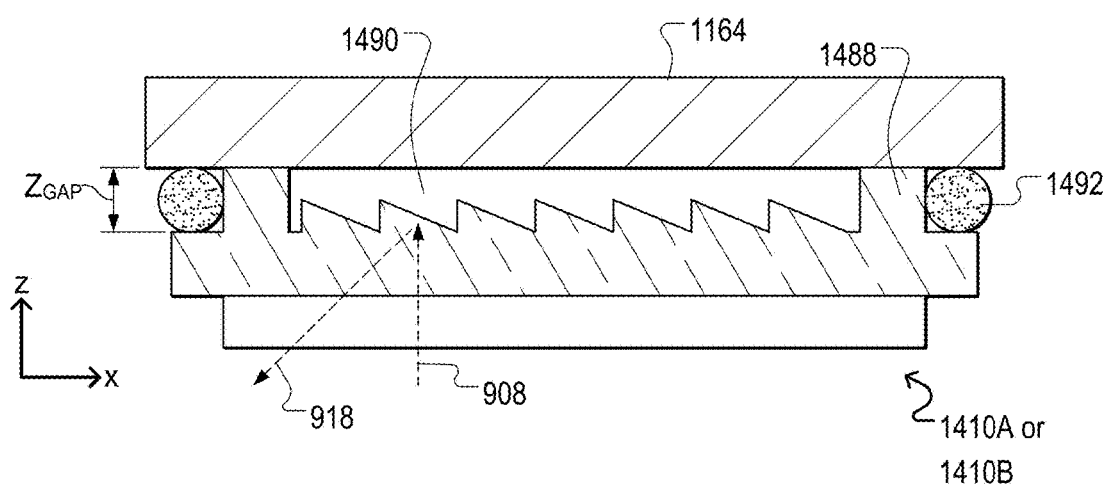

FIG. 14C shows a technique for mounting the optical structure 1410A or 1410B to the moving mass 1164. Mounting tabs 1488 can be set proud of the light redirecting structure to provide a gap 1490 from the moving mass 1164 of effective height $Z_{GAP}$. The mounting tabs 1488 also set a datum to allow precision tolerance fitting, e.g., to determine a thickness of adhesive 1492 used to attach the optical structure 1410A or 1410B to the moving mass 1164. When mounting the optical structure 1410A, the gap 1490 can be an air gap or can be filed with a filler material. When mounting the optical structure 1410B, the gap 1490 is an air gap. In this case, this air gap is important for maximizing the contrast of refractive index at the first surface 1486 to optimize optical performance.

In some implementations, a VCSEL, whether singular or in array form, can have an efficiency of 300 lm/W. In some implementations, the VCSEL(s) of the light source 906 can be operated using peak currents in the range of 1-10 mA, and peak voltages in the range of 1-2 V, for a maximum power consumption of 1-10 mW. As this power would be consumed if the VCSEL(s) were run continuously, the actual power used the VCSEL(s) can 100-1000 times smaller, as typical VCSEL(s) operation is duty cycled.

As noted above in connection with FIG. 9C and FIG. 12B, the photodetector 920 senses the change in light intensity and uses it to detect tile border crossings between tiles of the intensity pattern, e.g., 910 and 1210, as a result of their relative lateral motion ΔX and axial motion ΔY. In some implementations, threshold hysteresis can be used to reliably detect level transition. In such cases, in order to avoid false tile border crossings, a tile border crossing is determined while moving in a forward direction, then the same tile border crossing is determined again while moving in a backward direction.

In some implementations, processing electronics 925 can be configured as mixed signal circuitry that processes analog signals and digital signals. In some implementations, processing electronics 925 can be configured as one or more digital signal processors, e.g., ASIC, FPGA, CPU, etc.

Figure 15A:
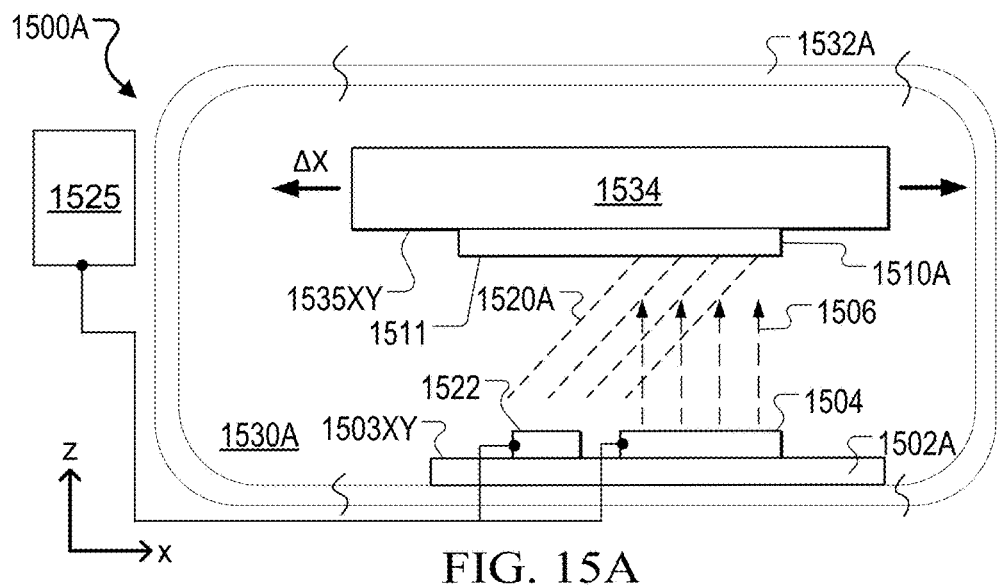
FIG. 15A shows an example of displacement measuring system.

FIG. 15A is a side view, e.g. in the (x,z) plane, of an example of a displacement measuring system 1500A configured to measure displacement of a mass 1534. Here, a haptic engine 1530A having a frame 1532A encapsulates the mass 1534 and at least a portion of the displacement measuring system 1500A. In this example, the displacement measuring system 1500A includes a mount 1502A that has a surface 1503XY and is attached on an opposing surface to a surface of the frame 1532A that is parallel to the (x,y) plane. The displacement measuring system 1500A further includes a light emitting element (LEE) array 1504 disposed on the surface 1503XY of the mount 1502A, an intensity pattern 1510A coupled with a surface 1535XY of the mass 1534, and a photodetector 1522 disposed on the same surface 1503XY of the mount as the LEE array 1504. A surface 1511 of the intensity pattern 1510A is spaced apart from and faces both the LEE array 1504 and the photodetector 1522. In this manner, during operation of the displacement measuring system 1500A, the LEE array 1504 illuminates the surface 1511 of the intensity pattern 1510A with $N_{TOT}$ beams 1506, and the intensity pattern redirects, to the photodetector 1522, at least some of the light impinging on the illuminated surface, such that $N_{TOT}$ redirected beams 1520A form an acute angle relative the illuminating beams.

Figure 15B:
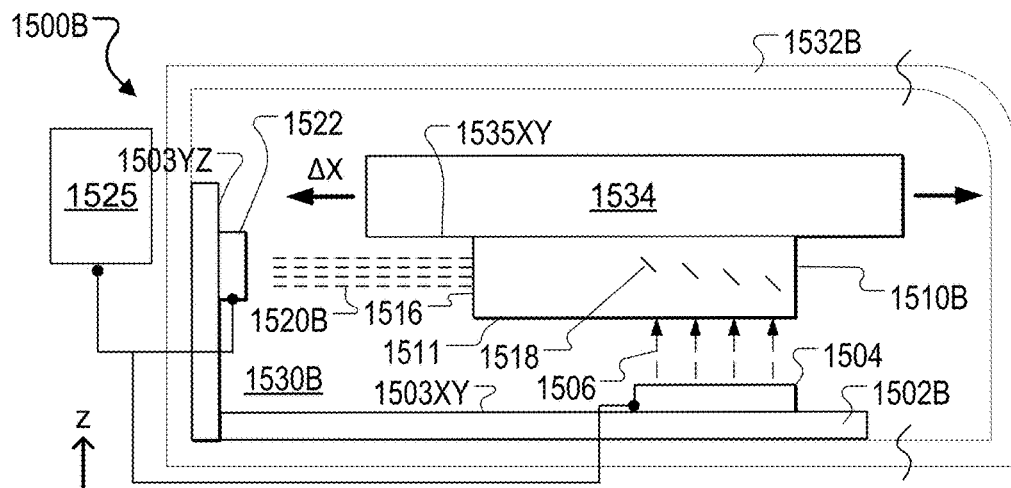
FIG. 15B shows another example of displacement measuring system.

FIG. 15B is a side view, e.g. in the (x,z) plane, of another example of a displacement measuring system 1500B configured to measure displacement of the mass 1534. Here, another haptic engine 1530B having a frame 1532B encapsulates the mass 1534 and at least a portion of the displacement measuring system 1500B. In this example, the displacement measuring system 1500B includes a mount 1502B that has a surface 1503XY and an angled surface 1503YZ. In some cases, the angled surface 1530XZ can be oriented to form a substantially right angle relative to the surface 1503XY. A surface of the mount 1502B opposing the surface 1503XY is attached to a surface of the frame 1532B that is parallel to the (x,y) plane, and another surface of the mount opposing the surface 1503YZ is attached to another surface of the frame 1532B that can be parallel to the (y,z) plane. The displacement measuring system 1500B further includes the LEE array 1504 disposed on the surface 1503XY of the mount 1502B, an intensity pattern 1510B coupled with a surface 1535XY of the mass 1534, and the photodetector 1522 disposed on the surface 1503YZ of the mount. The intensity pattern 1510B has the surface 1511 that is spaced apart from and faces the LEE array 1504, and a surface 1516 that is spaced apart from and faces the photodetector 1522. In this manner, during operation of the displacement measuring system 1500B, the LEE array 1504 illuminates the surface 1511 of the intensity pattern 1510B with the $N_{TOT}$ beams 1506, and the intensity pattern redirects, through the surface 1516 to the photodetector 1522, at least some of the light impinging on the illuminated surface, such that $N_{TOT}$ redirected beams 1520B form a folding angle relative to the beams 1506. In some cases, the folding angle is a substantially right angle.

Figure 15C:
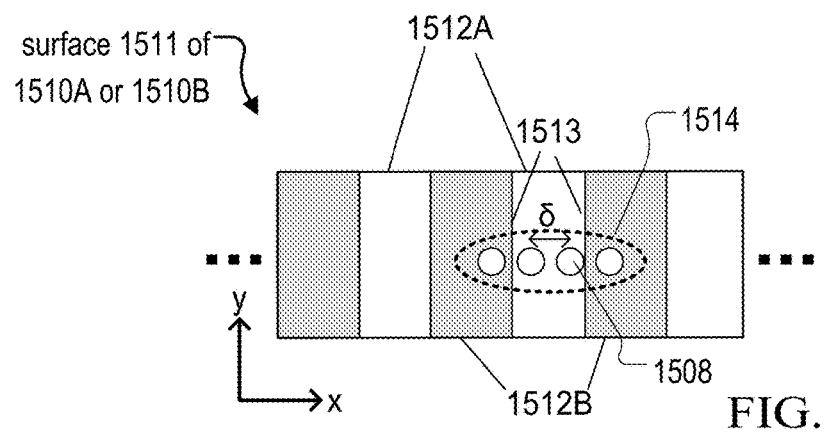
FIG. 15C shows an example of a binary intensity pattern used to measure 1D displacements.

FIG. 15C is a plan view, e.g., in the (x,y) plane, of the surface 1511 of the intensity pattern 1510A/1510B. The intensity pattern 1510A/1510B includes a plurality of tiles 1512 separated from each other by corresponding tile borders 1513. Each tile 1512 of the intensity pattern 1510A/1510B is configured to redirect to the photodetector 1522 light having an intensity different from an intensity of light redirected to the photodetector by any of its adjacent tiles. In the example shown in FIG. 15C, the intensity pattern 1510A/1510B is a binary intensity pattern because each tile 1512A (or 1512B) has only two adjacent tiles 1512B (or 1512A) configured to redirect to the photodetector 1522 light having the same intensity. As such, the binary intensity pattern 1510A/1510B has M=2 tile types: tiles of first type 1512A and tiles of second type 1512B, where each tile of first type 1512A forms respective tile borders 1513 with two adjacent tiles of second type 1512B, and each tile of second type 1512B forms respective tile borders 1513 with two adjacent tiles of first type 1512A. A tile of first type 1512A is configured such that, when one of the beams 1506 illuminates it, the corresponding one of the redirected beams 1520A/1520B has a maximum intensity $I_{MAX}$. Further, a tile of second type 1512B is configured such that, when one of the beams 1506 illuminates it, the corresponding one of the redirected beams 1520A/1520B has a minimum intensity $I_{MIN}$, where $I_{MIN} < I_{MAX}$. Here, the tile borders 1513 are distributed at known locations relative to each other along the x-axis, so the binary intensity pattern 1510A/1510B can be used as part of the displacement measuring system 1500A/1500B to measure displacement ΔX of the mass 1534 along the x-axis. An example of a four-level intensity pattern 1810 of a displacement measuring system 1800, that has M=4 tile types, can be used to measure, as described below in connection with FIGS. 18A-18E, displacement ΔX of the mass 1534 along the x-axis and displacement ΔY of the mass along the y-axis.

Referring again to FIG. 15C, in some implementations, the intensity pattern 1510A can be configured to have a reflective surface 1511 that selectively reflects, scatters or both the illuminating beams 1506 to the photodetector 1522 as redirected beams 1520A. In such cases, a tile of first type 1512A (shown in white) has a first reflectivity $R_1$, and a tile of second type 1512B (shown in grey) has a second reflectivity $R_2$, smaller than the first reflectivity. For example, the second reflectivity $R_2$ can be at most half the first reflectivity $R_1$, e.g., $R_2=0.3R_1$, $0.1R_1$, $0.05R_1$ or other fractions of $R_1$. For example, the tile of first type 1512A can be coated with a reflective film and the tile of second type 1512B can be coated with an absorptive film. As another example, the tile of first type 1512A can be coated with a multilayer reflection coating and the tile of second type 1512B can be coated with a multilayer anti-reflection coating.

In some implementations, the intensity pattern 1510B can be configured as a combination of a transmissive surface 1511, an array of micro-mirrors 1518 (or micro-prisms, or other redirecting micro-structures), and a transmissive surface 1516. In this manner, the transmissive surface 1511 selectively transmits the illuminating beams 1506, the array of micro-mirrors 1518 reflects, scatters or both the selectively transmitted beams, and the transmissive surface 1516 transmits the redirected beams 1520B to the photodetector 1522. In such cases, a tile of first type 1512A (shown in white) has a first transmissivity $T_1$, and a tile of second type 1512B (shown in grey) has a second transmissivity $T_2$, smaller than the first transmissivity. For example, the second transmissivity $T_2$ can be at most half the first transmissivity $T_1$, e.g., $T_2=0.3\,T_1$, $0.1\,T_1$, $0.05\,T_1$ or other fractions of $T_1$.

FIG. 15C also shows that the $N_{TOT}$ beams 1506 illuminate an area 1514 of the surface 1511 of the intensity pattern 1510A/1510B with discrete beam spots 1508 separated by a known separation δ. The separation δ between adjacent beam spots determines the spatial resolution of the displacement measurements performed by the displacement measuring system 1500A/1500B. For the examples of displacement measurement systems described in this specification, the separation δ between adjacent beam spots can be as small as about 1 μm, and as large as a size along the x-axis of each tile 1512. In addition, a combination of the separation δ between adjacent beam spots and a size along the x-axis of each tile 1512 determines a number N of beams from among the $N_{TOT}$ beams 1506 provided by the LEE array 1504 that can concurrently illuminate the tile. In order for the displacement measuring system 1500A/1500B to resolve both direction and magnitude of the displacement ΔX of the mass 1534 along the x-axis, the number N of the $N_{TOT}$ beams 1506 can be predetermined, based on the number M of tile types, in the following manner. In some implementations, if an intensity pattern has M≥2 tile types, then a number N from among the $N_{TOT}$ beams 1506 that can concurrently illuminate each tile satisfies the conditions $2 \le N \le N_{TOT}$. In the examples shown in FIGS. 15A-15C, the LEE array 1504 provides $N_{TOT}=4$ beams 1506, and the size of each tile 1512 of the intensity pattern 1510A/1510B allows for N=2 from among the 4 beams 1506 to illuminate each tile. In other implementations, if an intensity pattern has M≥3 tile types, then a number N from among the $N_{TOT}$ beams 1506 that can concurrently illuminate each tile satisfies the conditions $1 \le N \le N_{TOT}$, e.g., as described below in connection with FIG. 17A.

Figure 15D:
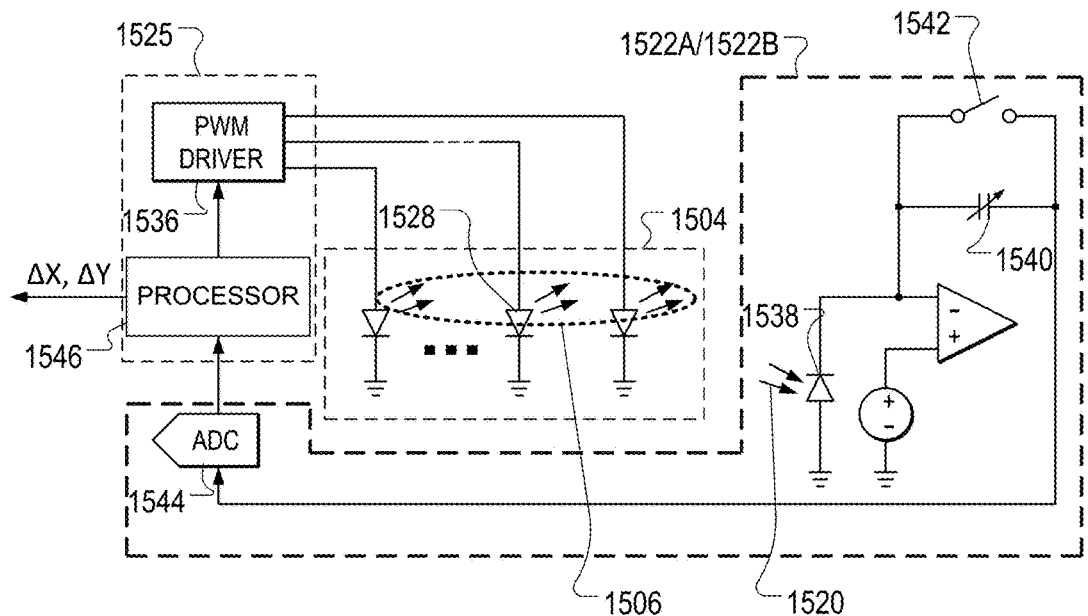
FIGS. 15D-15F show aspects of operating displacement measuring systems.

Referring again to FIGS. 15A-15B, the displacement measuring system 1500A/1500B includes a controller system 1525 that is linked to the LEE array 1504 and the photodetector 1522, and is configured to control the way the photodetector captures individual ones the $N_{TOT}$ redirected beams 1520A/1520B associated with corresponding ones of the $N_{TOT}$ illuminating beams 1506. FIG. 15D shows that the controller system 1525 includes a pulse-width modulation (PWM) driver 1536 and a processor 1546, and that, in this example, the LEE array 1504 includes $N_{TOT} \geq 2$ light emitting elements (LEEs) 1528 that are independently switchable. In this manner, the LEEs 1528 of the LEE array 1504 can be PWM-switched at maximum current, so no adjustable current level is needed for the LEE array 1504. Further, the photodetector 1522 includes a single photo-diode 1538, an integration capacitance 1540, a switch 1542, and an analog-to-digital converter (ADC) 1544.

In some implementations, each LEE 1528 of the LEE array 1504 includes a respective VCSEL that emits, when switched ON by the PWM driver 1536, one of the $N_{TOT}$ beams 1506 that illuminate the intensity pattern 1510A/1510B. In some implementations, each LEE 1528 of the LEE array 1504 includes a respective LED and a beam-shaping optic (not shown in FIGS. 15A-15B, 15D) that is optically coupled with the LED. In this case, the respective LED emits, when switched ON by the PWM driver 1536, un-collimated light, and the beam-shaping optic receives the un-collimated light and issues one of the $N_{TOT}$ beams 1506 that illuminate the intensity pattern 1510A/1510B. In this manner, in either of these implementations, the beam spot 1508 over which the intensity pattern 1510A/1510B is illuminated by each of the beams 1506 has a size of 20 µm, 10 µm, or smaller.

Moreover, the processor 1546 can instruct the PWM driver 1536 to individually switch ON/OFF the LEEs 1528 of the LEE array 1504, such that the beams 1506 successively illuminate the intensity pattern 1510A/1510B, on a one-beam-at-a-time basis. To do so, the PWM driver 1536 can use a switching gate 1524 like the one shown in FIG. 15E. Here, the switching gate 1524 is a sequence of trains of pulses, each train including $N_{TOT}$ pulses corresponding to the $N_{TOT}$ LEEs 1528 of the LEE array 1504. Each pulse has a pulse duration TA during which a single corresponding LEE 1528 is ON while the other ($N_{TOT}-1$) LEEs of the LEE array 1504 are OFF and the switch 1542 is open. The pulses are separated from each other by a reset duration $T_R$, during which the switch 1542 is closed. Note that operation of the photodetector 1522 in charge integration mode, using the switching gate 1524 as described below, can beneficially provide exposure time control. Additionally, the trains are repeated in time with a period $T_S$ that represents a sampling period, related to the sampling rate $f_S=1/T_S$. As such, a train of pulses can correspond to a sampling time $t_0$, the next train of pulses corresponds to the next sampling time $t_1$, the next train of pulses corresponds to the next sampling time $t_2$, and so on. Moreover, the pulse duration $T_A$ and the reset time $T_R$ can be 10, 100, or 1000 time smaller than the sampling period $T_S$. Note that the processor 1546 can adjust either the duty cycle of the LEE array 1504 or the integration capacitance 1540 of the photodetector 1522 or both to (i) control the dynamic range of the displacement measuring system 1500A/1500B; and (ii) ensure that the $N_{TOT}$ amounts of charge sequentially accumulated on the integration capacitance are the same for the $N_{TOT}$ beams 1520A/1520B sequentially redirected from a tile of the same type.

In this manner, consider a sampling time t. Here, for a time $T_A$ corresponding to the first pulse, a first LEE 1528 is placed in an ON state, the other LEEs of the LEE array 1504 are maintained in an OFF state, and the switch 1542 is in an open state. As such, the first LEE 1528 illuminates with a first beam 1506 (e.g., the left-most one of the beams 1506 in FIG. 15A or FIG. 15B) a first location of the intensity pattern 1510A/1510B, while the photo-diode 1538 captures a first beam 1520A (e.g., the left-most one of the beams 1520A in FIG. 15A) or a first beam 1520B (e.g., the top one of the beams 1520B in FIG. 15B) redirected from the first illuminated location, so the integration capacitance 1540 accumulates a first charge corresponding to a first intensity of the first redirected beam, and the ADC 1544 issues a first value $i_1(t)$ for the accumulated first charge. Then, the first LEE 1528 is placed in an OFF state, and the switch 1542 is placed in a close state for a time $T_R$ to reset the integration capacitance 1540. Then, for another time TA corresponding to the second pulse, a second LEE 1528 is placed in an ON state, the other LEEs of the LEE array 1504 are maintained in an OFF state, and the switch 1542 is in an open state. As such, the second LEE 1528 illuminates with a second beam 1506 (e.g., the second left-most one of the beams 1506 in FIG. 15A or FIG. 15B) a second location of the intensity pattern 1510A/1510B, while the photo-diode 1538 captures a second beam 1520A (e.g., the second left-most one of the beams 1520A in FIG. 15A) or a second beam 1520B (e.g., the second top one of the beams 1520B in FIG. 15B) redirected from the second illuminated location, so the integration capacitance 1540 accumulates a second charge corresponding to a second intensity of the second redirected beam, and the ADC 1544 issues a second value $i_2(t)$ for the accumulated second charge. Then, the second LEE 1528 is placed in an OFF state, and the switch 1542 is placed in a close state for a time $T_R$ to reset the integration capacitance 1540. And so on for the remaining ($N_{TOT}-2$) pulses of the train associated with sampling time t. In this manner, by the end of the $(N_{TOT})^{th}$ pulse of the train associated with sampling time t, the photodetector 1522 has issued a set of "raw" intensity values $\{i_1(t), \ldots, i_{NTOT}(t)\}$ corresponding to intensities of the $N_{TOT}$ redirected beams 1520A/1520B captured by the photodetector for sampling time t.

Note that the raw intensity values $\{i_1(t), \ldots, i_{NTOT}(t)\}$ of the set issued by the photodetector 1522 are processed by the processor 1546, so they can take only M values corresponding to the M tile types of the intensity pattern. For the example shown in FIG. 15C, the intensity pattern 1510A/1510B has M=2 tile types, so the processor 1546 obtains a set of intensity values $\{I_1(t), I_{NTOT}(t)\}$ that can take only the values $I_{MAX}$ or $I_{MIN}$. In some implementations, the processor 1546 can perform a threshold based classification on the set of raw intensity values $\{i_1(t), \ldots, i_{NTOT}(t)\}$. In this case, the processor 1546 determines a threshold Th=$(\max\{i_1(t), \ldots, i_{NTOT}(t)\} + \min\{i_1(t), i_{NTOT}(t)\})/2$, and, for each of $\{I_1(t), \ldots, I_{NTOT}(t)\}$, can set $I_j(t)=I_{MAX}$ if $I_j(t) \geq Th$, or $I_j(t)=I_{MIN}$ if $I_j(t)<Th$, where j=1 ... $N_{TOT}$. As such, the processor 1546 can then determine positions of the illuminated locations 1508 of the intensity pattern 1510A/1510B based only on relative differences between the intensity values $\{I_1(t), \ldots, I_{NTOT}(t)\}$ of the obtained set. Hence, displacement measurements performed by the displacement measuring system 1500A/1500B are insensitive to common mode drift of the LEE array 1504, for instance.

Figure 15E:
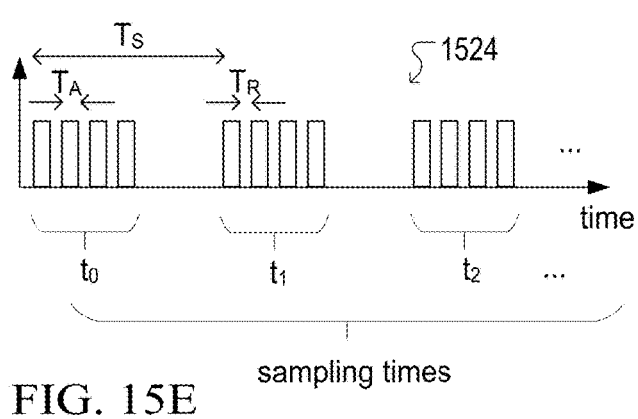
Figure 15F:
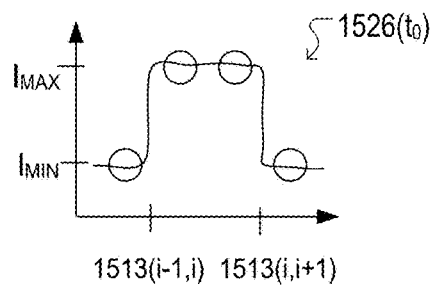

FIG. 15F shows such a set $1526(t_0)$ of intensity values $\{I_{MIN}, I_{MAX}, I_{MAX}, I_{MIN}\}$ obtained by the processor 1546 based on the set of raw intensity values $\{i_1, i_2, i_3, i_4\}$ issued by the photodetector 1522, for sampling time $t_0$, corresponding to the example shown in FIG. 15C. This set $1526(t_0)$ of intensity values has been obtained by the processor 1546 because, in the example shown in FIG. 15C, the surface 1511 of the binary intensity pattern 1510A/1510B is illuminated over an area 1514 by $N_{TOT}$=4 beams 1506 provided by the LEE array 1504, of which the two inner beams illuminate locations 1508 that are positioned on a tile of first type 1512A, and the two outer beams illuminate locations 1508 that are positioned on respective adjacent tiles of second type 1512B. In FIG. 15F, the intensity values $\{I_{MIN}, I_{MAX}, I_{MAX}, I_{MIN}\}$ of the set 1526($t_0$) are represented, by open circles, as a function of position along the x-axis of the illuminated locations of the binary intensity pattern 1510A/1510B with which the intensity values are respectfully associated. Note that separation along the x-axis between adjacent illuminated locations is the known separation δ. Further note that, in FIG. 15F, the intensity values $\{I_{MIN}, I_{MAX}, I_{MAX}, I_{MIN}\}$ are fit with a solid line.

Once the processor 1546 obtains, for sampling time $t_0$, the set 1526($t_0$) of intensity values $\{I_{MIN}, I_{MAX}, I_{MAX}, I_{MIN}\}$ shown in FIG. 15F, then the processor can determine, based on additional information, that the area 1514, illuminated by the LEE array 1504 with the beams 1506, spans, at $t_0$, over the tile borders 1513($i-1,i$), 1513($i,i+1$) formed between the $i^{th}$ tile 1512A and respective adjacent $(i-1)^{th}$, $(i+1)^{th}$ tiles 1512B. The determined tile borders 1513($i-1,i$), 1513($i,i+1$) can be represented, by the controller system 1525 as shown in FIG. 15F, between the appropriate positions of the illuminated locations with which the intensity values $\{I_{MIN}, I_{MAX}, I_{MAX}, I_{MIN}\}$ are respectfully associated.

If the intensity pattern 1510A/1510B were at rest relative to the beams 1506, then instances of the set 1526($t_1$), 1526($t_2$), . . . of intensity values obtained by the processor 1546 at respective subsequent sampling times $t_1$, $t_2$, . . . would be constant in time, e.g., would be the same as the set 1526($t_0$) obtained at sampling time $t_0$. However, if the intensity pattern 1510A/1510B is displaced by displacement ΔX (or displacement ΔY or both) relative to the beams 1506, then the instances of the set 1526($t_1$), 1526($t_2$), . . . of intensity values obtained by the processor 1546 at respective subsequent sampling times $t_1$, $t_2$, . . . will change in a particular manner, based on (i) a number of tile border crossings, and (ii) types of adjacent tiles associated with, and direction of, each of the tile border crossings. Here, a tile border crossing is said to occur when the intensity pattern 1510A/1510B is displaced, along the x-axis, such that a tile border 1513, formed between a tile of first type 1512A and a tile of second type 1512B, crosses through the beam spot 1508 associated with a corresponding one of the beams 1506. In this manner, the corresponding one of the beams 1506 illuminates the tile of first type 1512A (or the tile of second type 1512B) before the tile border crossing and illuminates the tile of second type 1512B (or the tile of first type 1512A) after the tile border crossing, such that the tile border crossing causes a change in the intensity of a corresponding one of the redirected beams 1520A/1520B between $I_{MAX}$ and $I_{MIN}$.

As such, the processor 1546 can determine magnitude and direction of a displacement ΔX of the mass 1534 along the x-axis, based on one or more changes of the intensity values $\{I_1(t_k), \ldots, I_{NTOT}(t_k)\}$ of the set 1526($t_k$) obtained at sampling time $t_k$ relative to the intensity values $\{I_1(t_{k+1}), \ldots, I_{NTOT}(t_{k+1})\}$ of the set 1526($t_{k+1}$) obtained at a subsequent sampling time $t_{k+1}$, where the changes are caused by motion of the mass along the x-axis, across at least one of the tile borders 1513. In this manner, all motion related spatial information for the mass 1534 is encoded in the intensity pattern 1510A/1510B. Determinations of the magnitude and direction of displacements ΔX of the mass 1534 along the x-axis are described below when the displacement measuring system 1500A/1500B uses the intensity pattern 1510A/1510B of FIG. 15C, or another intensity pattern 1710 described in connection with FIG. 17A.

Figure 16A:
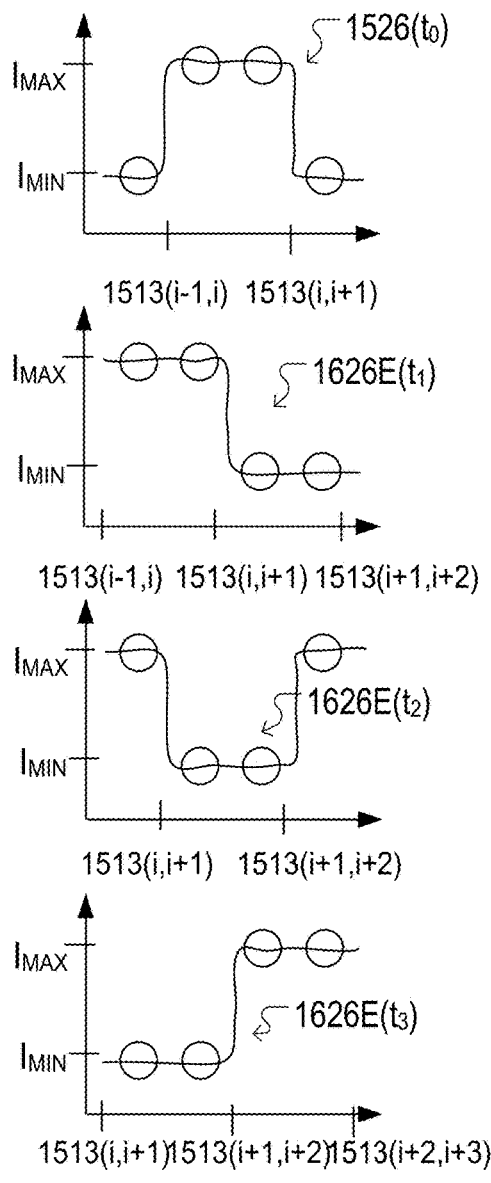
FIGS. 16A-16B show aspects of determining location on the binary intensity pattern of FIG. 15C.
Figure 16B:
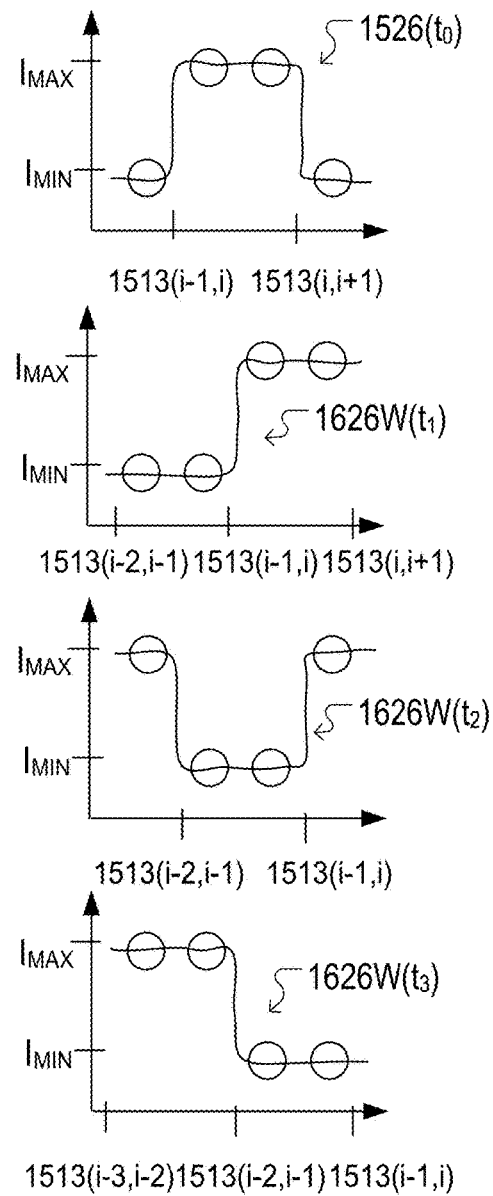

FIG. 16A shows an intensity signal that includes a sequence of sets 1526($t_0$), 1626E($t_1$), 1626E($t_2$), 1626E($t_3$) of intensity values obtained by the processor 1546 at respective sampling times $t_0$, $t_1$, $t_2$, $t_3$ as the intensity pattern 1510A/1510B moves relative to the beams 1506, as the intensity pattern is carried in an eastward direction by the mass 1534. FIG. 16B shows another intensity signal that includes a sequence of sets 1526($t_0$), 1626W($t_1$), 1626W($t_2$), 1626W($t_3$) of intensity values obtained by the processor 1546 at respective sampling times $t_0$, $t_1$, $t_2$, $t_3$ as the intensity pattern 1510A/1510B moves relative to the beams 1506, as the intensity pattern is carried in a westward direction by the mass 1534. Note that the starting point of each of the eastward and westward motions corresponds to a position of the area 1514 that includes the illuminated locations 1508, shown in FIG. 15C, when the processor 1546 obtains, at sampling time $t_0$, the set 1526($t_0$) of intensity values shown in FIG. 15F and reproduced in the top panel of each of FIG. 16A and FIG. 16B. The intensity values of the sets 1626E($t_k$) in FIG. 16A, and the intensity values of the sets 1626W($t_k$) in FIG. 16B, are represented, by open circles, as a function of position along the x-axis of the illuminated locations of the binary intensity pattern 1510A/1510B with which the intensity values are respectfully associated. Here, separation along the x-axis between adjacent illuminated locations is the known separation δ.

Because the intensity pattern 1510A/1510B has a pattern period of two tiles, as it is formed from M=2 types of tiles 1512A, 1512B, and because a width of each tile allows for N=2 concurrently illuminated locations 1508, there are only M×N=4 unique sets 1626E or 1626W of intensity values that can be obtained by the processor 1546. In this manner, in FIG. 16A, the next set 1626E($t_4$) will be equivalent to the set 1526($t_0$), the next set 1626E($t_5$) will be equivalent to the set 1626E($t_1$), and so on a cyclical mod(M×N=4) basis. Similarly, in FIG. 16B, the next set 1626W($t_4$) will be equivalent to the set 1526($t_0$), the next set 1626W($t_5$) will be equivalent to the set 1626W($t_1$), and so on a cyclical mod(M×N=4) basis.

Also, a sampling frequency $f_S$ is chosen such that, in FIG. 16A, a tile border crossing in the eastward direction occurs between each consecutive pair of sampling points $t_k$, $t_{k+1}$; similarly, in FIG. 16B, a tile border crossing in the westward direction occurs between each consecutive pair of sampling points $t_k$, $t_{k+1}$. Note, however, that the set 1626E($t_2$) and the set 1626W($t_2$) obtained by the processor 1546 at sampling time $t_2$ are the same, 1626E($t_2$)=1626W($t_2$), so the processor cannot unambiguously determine whether a displacement ΔX of the mass 1534 along the x-axis is in the eastward direction or westward direction based only on the set issued at this sampling time. For this reason, the sampling rate $f_S$ must be larger than $1/(t_2-t_0)$. In general, to unambiguously determine both the magnitude and direction of the displacement ΔX, the sampling rate $f_S$ is chosen to satisfy the condition $f_S > 2v_{MAX}/[\delta^*(N_{TOT}-1)]$, if a period P of the intensity pattern 1510A/1510B satisfies the condition $P > \delta^*(N_{TOT}-1)$; or the sampling rate $f_S$ is chosen to satisfy the condition $f_S > 2v_{MAX}/P$, if the period P of the intensity pattern satisfies the condition $P \leq 6^*(N_{TOT}-1)$. Here, $v_{MAX}$ is the maximum velocity of the mass 1534, and δ is the separation between the illuminated locations 1508. Note that the above conditions hold only when δ>0, which is always true for $N_{TOT} \geq 2$. For the example illustrated in FIG. 15C, $N_{TOT}$=4, and the period P of the intensity pattern 1510A/1510B, which is equal to a sum of the width of the first type tile 1512A and the width of the second type tile 1512B, is larger than δ*3. As such, in this example, the sampling frequency $f_S$ satisfies $f_S > 2v_{MAX}/(3*\delta)$.

In some implementations, sets $1626E(t_k)$ of intensity values shown in FIG. 16A and sets $1626W(t_k)$ of intensity values shown in FIG. 16B, for k=0, 1, 2, . . . , can be deemed as sets of expected intensity values corresponding to particular positions along the x-axis of illuminated locations of the intensity pattern 1510A/1510B. In such cases, a first mapping of the sets $1626E(t_k)$ of expected intensity values shown in FIG. 16A to the particular positions along the x-axis of illuminated locations of the intensity pattern 1510A/1510B can be recorded in a data store, e.g., in a register, a lookup table, etc. Similarly, a second mapping of the sets $1626W(t_k)$ of expected intensity values shown in FIG. 16B to the particular positions along the x-axis of illuminated locations of the intensity pattern 1510A/1510B can be recorded in the data store. In these implementations, the processor 1546 uses an obtained set of intensity values (e.g., $1626W(t_3)$) against the second mapping of the sets $1626W(t_k)$ of expected intensity values to positions of illuminated locations of the intensity pattern 1510A/1510B (e.g., as shown in FIG. 16B), to determine a position on the intensity pattern of the area 1514 that includes the illuminated locations 1508 (e.g., two left beams illuminate a tile of first type 1512A between tile borders 1513(i–3,i–2), 1513(i–2,i–1), and two right beams illuminate a tile of second type 1512B between tile borders 1513(i–2,i–1), 1513(i–1,i), as shown in the fourth panel of FIG. 16B).

Figure 17A:
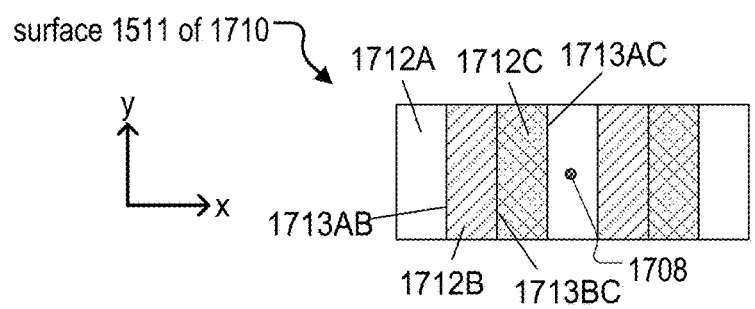
FIG. 17A shows an example of a three-level intensity pattern used to measure 15D displacements.

As noted above, even if the LEE array 1504 were replaced with a single LEE 1528, the displacement measuring system 1500A/1500B would still be capable of resolving both direction and magnitude of the displacement ΔX of the mass 1534 along the x-axis, as long as the intensity patterns 1510A/1510B were replaced with an intensity pattern with M≥3 tile types. FIG. 17A is a plan view in the (x,y) plane of surface 1511 of such an intensity pattern 1710 that has M=3 tile types: tiles of first type 1712A, tiles of second type 1712B and tiles of third type 1712C, where a tile of first type 1712A forms a tile border 1713AB with a tile of second type 1712B and a tile border 1713AC with a tile of third type 1712C, and a tile of second type 1712B forms a tile border 1713BC with a tile of third type 1712C. A tile of first type 1712A is configured such that, when a single beam (e.g., only the left-most one from among the beams 1506 depicted in FIG. 15A or FIG. 15B) illuminates it, the single beam 1520A (e.g., only the left-most one of the beams 1520A depicted in FIG. 15A) or the single beam 1520B (e.g., only the top one of the beams 1520B depicted in FIG. 15B) has a maximum intensity $I_A$. Further, a tile of third type 1712C is configured such that, when the single beam 1506 illuminates it, the single redirected beam 1520A/1520B has a minimum intensity $I_C$, where $I_C < I_A$. Furthermore, a tile of second type 1712B is configured such that, when the single beam 1506 illuminates it, the single redirected beam 1520A/1520B has an intermediate intensity $I_B$, where $I_C < I_B < I_A$. Here, the tile borders 1713AB, 1713AC, 1713BC are distributed at known locations relative to each other along the x-axis, so the intensity pattern 1710 can be used as part of the displacement measuring system 1500A/1500B to measure displacement ΔX of the mass 1534 along the x-axis.

In the implementations of the displacement measuring system 1500A/1500B that uses a single LEE 1528 in conjunction with the intensity pattern 1710, the switching gate 1524, that is used by the PWM driver 1536 for timing acquisition of raw intensity values issued by the photodetector 1522, is modified such that each train includes a single pulse, such that the modified timing gate is a sequence of pulses repeated in time with a period $T_S$. Here, the pulses of the modified timing gate correspond to sampling times $t_0$, $t_1$, $t_2$, and so on. In this manner, at a sampling time t, the LEE 1528 is placed in an ON state for a time $T_A$ corresponding to the pulse length, and the switch 1542 is in an open state. As such, the LEE 1528 illuminates with a single beam a single location 1708 of the intensity pattern 1710, while the photo-diode 1538 captures a beam redirected from the illuminated location 1708, so the integration capacitance 1540 accumulates a charge corresponding to an intensity of the redirected beam 1520A/1520B, and the ADC 1544 issues a single value i(t) for the accumulated charge. Then, the single LEE 1528 is placed in an OFF state, and the switch 1542 is placed in a close state for a time $T_S$ corresponding to the sampling period. In this manner, the photodetector 1522 has issued a single "raw" intensity value i(t) corresponding to the intensity of the single redirected beam 1520A/1520B captured by the photodetector for sampling time t.

The raw intensity value i(t) issued by the photodetector 1522 is processed by the processor 1546, so it can take only M values corresponding to the M tile types of the intensity pattern. For the example shown in FIG. 17A, the intensity pattern 1710 has M=3 tile types, so the processor 1546 obtains a single intensity value I(t) that can take only the values $I_A$, $I_B$ or $I_C$. In this example, the processor 1546 can perform a threshold based classification on the raw intensity value i(t) using two thresholds $Th_{AB}$ and $Th_{BC}$. Here, the processor 1546 can set $I(t)=I_A$ if $I(t) \geq Th_{AB}$, or $I(t)=I_C$ if $I(t) \leq Th_{BC}$, or $I(t)=I_B$ if $Th_{BC} < I(t) < Th_{AB}$. If the intensity pattern 1710 is displaced by displacement ΔX relative to the single beams 1506, then intensity values $I(t_0)$, $I(t_1)$, $I(t_2)$, . . . obtained by the processor 1546 at respective subsequent sampling times $t_0$, $t_1$, $t_2$, . . . will change in a particular manner, based on (i) a number of tile border crossings, and (ii) types of adjacent tiles associated with, and direction of, each of the tile border crossings. As such, the processor 1546 can determine magnitude and direction of a displacement ΔX of the mass 1534 along the x-axis, based on a change of the intensity value $I(t_k)$ obtained at sampling time $t_k$ relative to the intensity value $I(t_{k+1})$ obtained at a subsequent sampling time $t_{k+1}$, where the change is caused by motion of the mass along the x-axis, across at least one of the tile borders 1713AB, 1713AC or 1713BC. In this manner, all motion related spatial information for the mass 1534 is encoded in the intensity pattern 1710. Determinations of the magnitude and direction of displacements ΔX of the mass 1534 along the x-axis are described below in connection with FIGS. 17B and 17C.

Figure 17B:
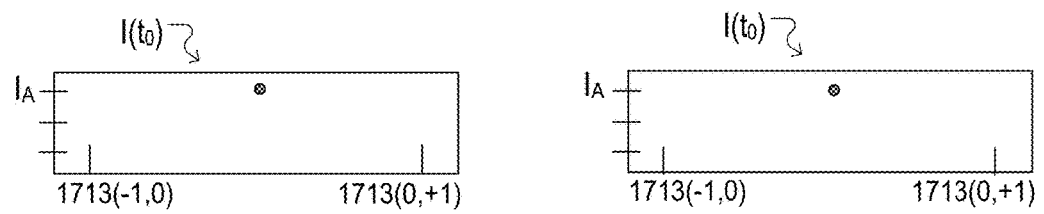
FIGS. 17B-17C show aspects of determining location on the three-level intensity pattern of FIG. 17A.
Figure 17B:
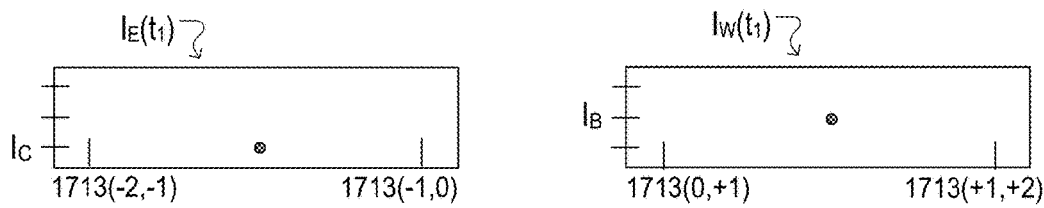
Figure 17C:
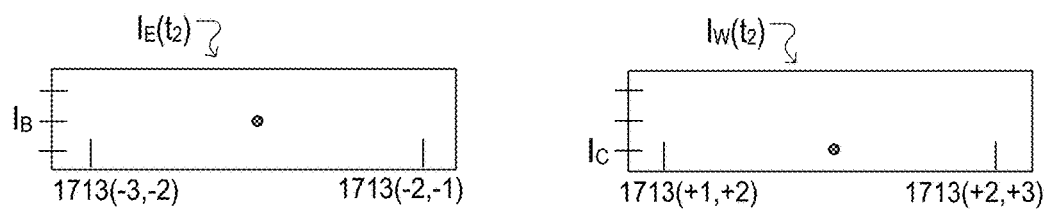

FIG. 17B shows an intensity signal that includes a sequence of intensity values $I(t_0)$, $I_E(t_1)$, $I_E(t_2)$ obtained by the processor 1546 at respective sampling times $t_0$, $t_1$, $t_2$ as the intensity pattern 1710 moves relative to the single beam 1506, as the intensity pattern is carried in an eastward direction by the mass 1534. FIG. 17C shows another intensity signal that includes a sequence of intensity values $I(t_0)$, $I_W(t_1)$, $I_W(t_2)$ obtained by the processor 1546 at respective sampling times $t_0$, $t_1$, $t_2$ as the intensity pattern 1710 moves relative to the single beam 1506, as the intensity pattern is carried in a westward direction by the mass 1534. Note that the starting point of each of the eastward and westward motions corresponds to position of the illuminated location 1708, shown in FIG. 17A, when the processor 1543 issues, at sampling time $t_0$, the intensity value $I(t_0)=I_A$ shown in the top panel of each of FIG. 17B and FIG. 17C. The intensity values $I_E(t_k)$ in FIG. 17B, and the intensity values $I_W(t_k)$ in FIG. 17C are represented, by open circles, as a function of positions along the x-axis of the illuminated location of the intensity pattern 1710 with which the intensity values are respectfully associated. Here, the tiles are counted, starting from 0 at the center tile, as tiles +1, +2, . . . going eastward, and as tiles −1, −2, . . . going westward.

Because the intensity pattern 1710 has a pattern period of three tiles, as it is formed from M=3 types of tiles 1712A, 1712B, 1712C and because there is no more than N=1 illuminated location 1708 per tile, there are only M×N=3 unique intensity values $I_E(t_k)$ or $I_W(t_k)$ that can be obtained by the processor 1546. In this manner, in FIG. 17B, the next intensity value $I_E(t_3)$ will be equivalent to the intensity value $I(t_0)$, the next intensity value $I_E(t_4)$ will be equivalent to the intensity value $I_E(t_1)$, and so on a cyclical mod(M×N=3) basis. Similarly, in FIG. 17C, the next intensity value $I_W(t_3)$ will be equivalent to the intensity value $I(t_0)$, the next intensity value $I_W(t_4)$ will be equivalent to the intensity value $I_W(t_1)$, and so on a cyclical mod(M×N=3) basis.

Also, a sampling frequency $f_S$ is chosen such that, in FIG. 17B, a tile border crossing in the eastward direction occurs between each consecutive pair of sampling points $t_k$, $t_{k+1}$; similarly, in FIG. 17C, a tile border crossing in the westward direction occurs between each consecutive pair of sampling points $t_k$, $t_{k+1}$. As such, in this case, to unambiguously determine both the magnitude and direction of the displacement ΔX, the sampling rate $f_S$ is chosen to satisfy the condition $f_S > 2Mv_{MAX}/P$, where $v_{MAX}$ is the maximum velocity of the mass 1534, and P is the period of an intensity pattern with M types of tiles. For the example illustrated in FIG. 17A in which $N_{TOT}=1$, the number of tile types is M=3, and the period P of the intensity pattern 1710 is equal to a sum of the width of the first type tile 1712A, the width of the second type tile 1712B, and the width of the third type tile 1712C. As such, in this example, the sampling frequency $f_S$ satisfies $f_S > 6v_{MAX}/P$.

In some implementations, intensity values $I_E(t_k)$ shown in FIG. 17B and intensity values $I_W(t_k)$ shown in FIG. 17C, for k=0, 1, 2 can be deemed as expected intensity values corresponding to particular positions along the x-axis of the illuminated location of the intensity pattern 1710. In such cases, a first mapping of expected intensity values $I_E(t_k)$ shown in FIG. 17B to the particular positions along the x-axis of an illuminated location of the intensity pattern 1710 can be recorded in a data store, e.g., in a register, a lookup table, etc. Similarly, a second mapping of expected intensity values $I_W(t_k)$ shown in FIG. 17C to the particular positions along the x-axis of an illuminated location of the intensity pattern 1710 can be recorded in the data store. In these implementations, the processor 1546 uses an obtained intensity value (e.g., $I_W(t_2)$) against the second mapping of the expected intensity values $I_W(t_k)$ to positions of an illuminated location of the intensity pattern 1710 (e.g., as shown in FIG. 17C), to determine a position on the intensity pattern of the illuminated location 1708 (e.g., the single beam 1506 illuminates a tile of third type 1712C between the tile border 1713(+1,+2) and the tile border 1713(+2,+3), as shown in the third panel of FIG. 17C).

The intensity patterns 1510A/1510B, 1710 described above, having a 1D profile, can be used by the displacement measuring system 1500A/1500B to perform measurements of displacement ΔX along a single direction. Some of the components of the displacement measuring system 1500A/1500B can be modified, as described below, to allow for concurrently measuring the displacement ΔX of the mass along the x-axis, e.g., corresponding to vibration left-and-right on page, and the displacement ΔY of the mass along the y-axis, e.g., corresponding to vibration in-and-out of page.

Figure 18A:
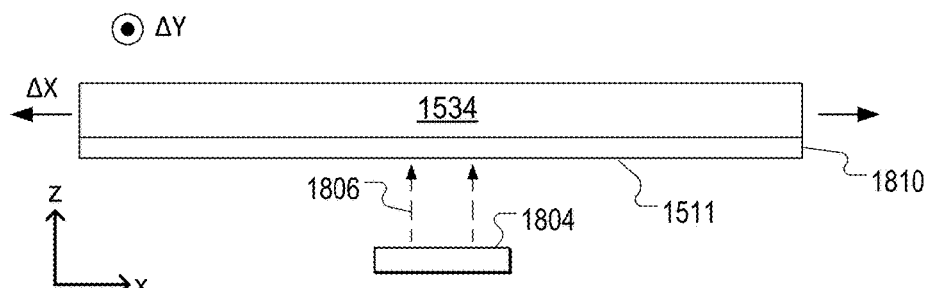
FIGS. 18A-18B show modifications to the displacement measuring system of FIGS. 15A-15B.
Figure 18B:
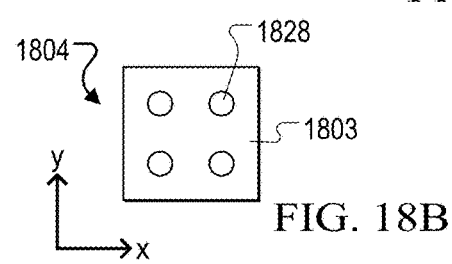

FIG. 18A is a zoomed-in view in the (x,z) plane of a portion of the displacement measuring system 1500A/1500B that shows a modified LEE array 1804 and a portion of a modified intensity pattern 1810 attached to the surface of the mass 1534 facing the LEE array. The LEE array 1804 is spaced apart from the intensity pattern 1810 and outputs $N_{TOT}$ beams 1806 that illuminate the surface 1511 of the intensity pattern. FIG. 18B is a plan view in the (x,y) plane of the LEE array 1804. The LEE array 1804 includes a board 1803 and LEEs 1828 distributed in rows along the x-axis, each row having $N_X$ LEEs, and columns along the y-axis, each column having $N_Y$ LEEs. The LEEs 1828 respectively provide the beams 1806 used to illuminate the intensity pattern 1810. In this example, parameters of the LEE array 1804 are $N_{TOT}=4$, $N_X=2$, $N_Y=2$. In some implementations, the LEEs 1828 can be the same as the LEEs 1528 described above in connection with FIGS. 15A-15D, and can be time multiplexed using a timing gate like the timing 1524 shown in FIG. 15E.

Figure 18C:
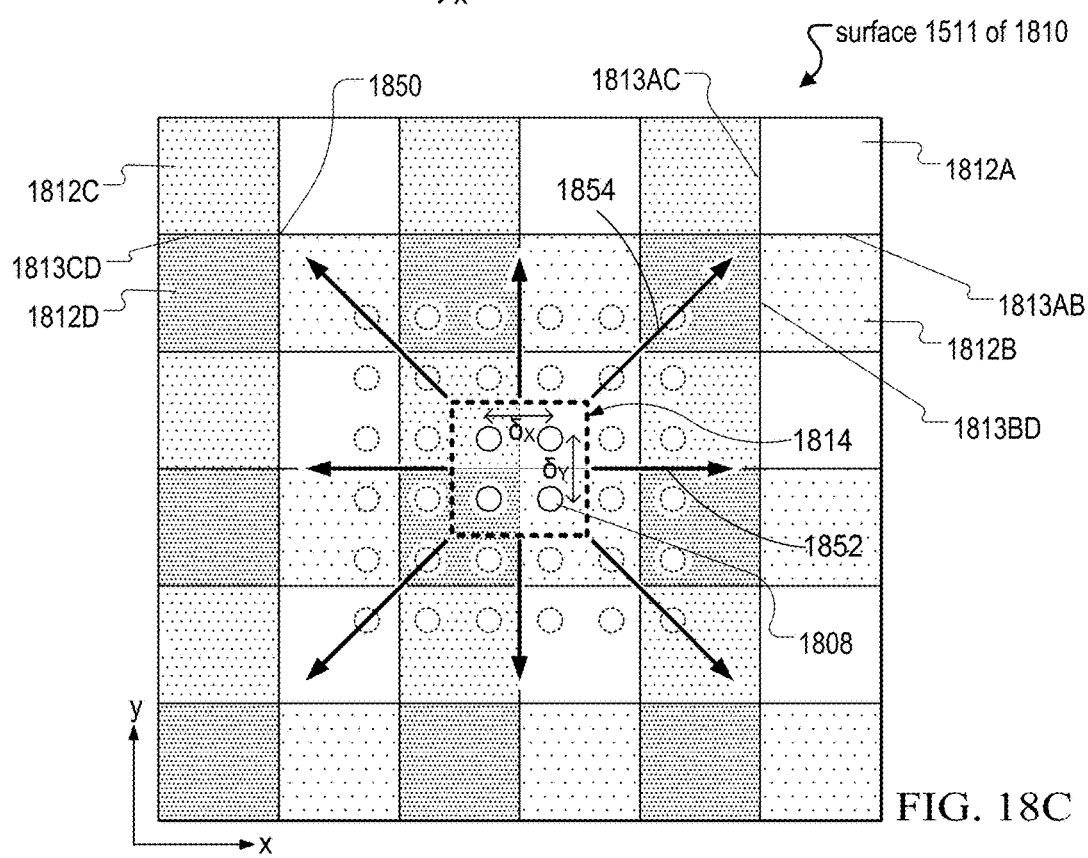
FIG. 18C shows an example of a four-level intensity pattern used to measure 2D displacements.

FIG. 18C is a plan view in the (x,y) plane of surface 1511 of the modified intensity pattern 1810. In this example, the intensity pattern 1810 has M=4 tile types: tiles of first type 1812A, tiles of second type 1812B, tiles of third type 1812C and tiles of fourth type 1812D. A tile of first type 1712A is configured such that, when one of the beams 1806 illuminates it, the corresponding one of the redirected beams 1520A/1520B has a maximum intensity $I_A$. Further, a tile of fourth type 1712D is configured such that, when one of the beams 1806 illuminates it, the corresponding one of the redirected beams 1520A/1520B has a minimum intensity $I_D$, where $I_D < I_A$. Furthermore, a tile of second type 1812B is configured such that, when one of the beams 1806 illuminates it, the corresponding one of the redirected beams 1520A/1520B has a first intermediate intensity $I_B$. Also, a tile of third type 1812C is configured such that, when one of the beams 1806 illuminates it, the corresponding one of the redirected beams 1520A/1520B has a second intermediate intensity $I_C$. In general, the intensities $I_A$, $I_D$, $I_C$, and $I_B$ can have any values as long as they are different from each other. Also, the separation between the values of the intensities $I_A$, $I_D$, $I_C$, and $I_B$ also needs to be sufficiently large to ensure sufficient signal to noise ratio (SNR) for level detection. In the example illustrated in FIG. 18C, the values of the intensities $I_A$, $I_D$, $I_C$, and $I_B$ satisfy the following conditions, $I_D < I_C < I_B < I_A$, as an illustrative example.

Moreover, tiles of first type 1812A and tiles of second type 1812B are separated by tile borders 1813AB, oriented along the x-axis; tiles of first type 1812 and tiles of third type 1812C are separated by tile borders 1813AC, oriented along the y-axis; tiles of second type 1812B and tiles of fourth type 1812D are separated by tile borders 1813BD, oriented along the y-axis; and tiles of third type 1812C and tiles of fourth type 1812D are separated by tile borders 1813CD, oriented along the x-axis. In this manner, the tiles are arranged such that each corner 1850 of each tile is a corner that is shared by the tile with three other tiles of different type. The tile borders 1813AC, 1813BD are distributed at known locations relative to each other along the x-axis, and the tile borders 1813AB, 1813CD are distributed at known locations relative to each other along the y-axis, so the intensity pattern 1810 can be used as part of the displacement measuring system 1500A/1500B to concurrently measure displacement ΔX of the mass 1534 along the x-axis and displacement ΔY of the mass along the y-axis.

Further in the example shown in FIG. 18C, the LEE array 1804 illuminates an area 1814 of the intensity pattern 1810 with $N_{TOT}=4$ beams 1806, such that a separation between the illuminated locations 1808 is a first separation k along the x-axis, and a second separation $\delta_Y$ along the y-axis. In some implementations, the first separation $\delta_X$ and the second separation $\delta_Y$ are equal, $\delta_X=\delta_Y=\delta$. Furthermore, in the example shown in FIG. 18C, a size along each of the x-axis and y-axis of each of tiles 1812A, 1812B, 1812C, 1812D can accommodate an N=2 concurrently illuminated locations 1808. In this manner, the processor 1546 (in conjunction with the photodetector 1522 of the displacement measuring system 1500A/1500B) obtains, for each sampling time $t_k$, a set of $N_{TOT}=4$ intensity values corresponding to intensities of respective beams 1520A/1520B redirected from the area 1814 of the intensity pattern 1810 that includes the illuminated locations 1806.

In some implementations, the surface 1511 of the intensity pattern 1810 can be configured as a reflective surface that selectively reflects, scatters or both the illuminating beams 1806 to the photodetector 1522 as redirected beams 1520A, as described in detail in connection with FIG. 15A and FIG. 15C. In other implementations, the intensity pattern 1810 can be configured as a combination of a transmissive surface 1511, an array of micro-mirrors 1518 (or micro-prisms, or other redirecting micro-structures), and a transmissive surface 1516, as described in detail in connection with FIG. 15B and FIG. 15C. In this manner, the transmissive surface 1511 selectively transmits the illuminating beams 1806, the array of micro-mirrors 1518 reflects, scatters or both the selectively transmitted beams, and the transmissive surface 1516 transmits the redirected beams 1520B to the photodetector 1522, as explained in connection with FIG. 15B.

Figure 18D:
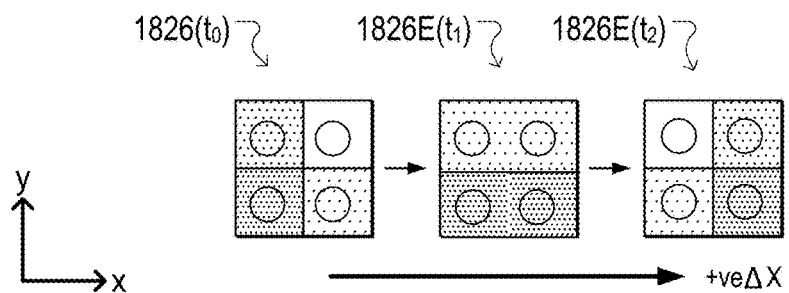
FIGS. 18D-18E show aspects of determining location on the four-level intensity pattern of FIG. 18C.

Referring again to the example shown in FIG. 18C, at sampling time $t_0$, an area 1814 of the intensity pattern 1810 is positioned across four tile borders 1813AB, 1813AC, 1813CD, 1813BD (or equivalently straddle a corner 1850), such that a corresponding one of the four illuminated locations 1808 lies on each one of the four adjacent tiles 1812A, 1812C, 1812D, 1812B that form the concurrently crossed tile borders. As such, a set $1826(t_0)$ obtained by the processor 1546 includes the intensity values $\{I_A, I_C, I_D, I_B\}$ corresponding to quadrants I, II, III, IV, respectively, of area 1814. The intensity pattern 1810 can be moved along with the mass 1534 relative to the four beams 1806, based on an axial motion vector 1852, along the x-axis or the y-axis. When the intensity pattern 1810 is moved eastward along the axial motion vector 1852 illustrated in FIG. 18C, at sampling time $t_1$, the area 1814 is positioned across a single tile border 1813CD, such that a row of the four illuminated locations 1808 lies on each of the adjacent tiles 1812C, 1812D that form the crossed tile border. As such, a set $1826E(t_1)$ obtained by the processor 1546 includes the intensity values $\{I_C, I_C, I_D, I_D\}$ corresponding to quadrants I, II, III, IV, respectively, of area 1814. When the intensity pattern 1810 is moved further eastward along axial motion vector 1852, at sampling time $t_2$, the area 1814 is positioned across four tile borders 1813CD, 1813AC, 1813AB, 1813BD, such that a corresponding one of the four illuminated locations 1808 lies on each one of the four adjacent tiles 1812C, 1812A, 1812B, 1812D that form the concurrently crossed tile borders. As such, a set $1826E(t_2)$ obtained by the processor 1546 includes the intensity values $\{I_C, I_A, I_B, I_D\}$ corresponding to quadrants I, II, III, IV, respectively, of area 1814. FIG. 18D shows an intensity signal that includes the sequence of sets $1826(t_0)$, $1826E(t_1)$, $1826E(t_2)$ obtained by the processor 1546 at respective sampling times $t_0$, $t_1$, $t_2$ as the intensity pattern 1810 moves relative to the beams 1806, as the intensity pattern 1810 is carried in the eastward direction by the mass 1534. The intensity values of the sets $1826E(t_k)$ in FIG. 18D are represented, as a grey-level inside circles, as a function of position in the (x,y) plane of the illuminated locations of the intensity pattern 1810 with which the intensity values are respectfully associated. Here, separation along the x-axis and the y-axis between adjacent illuminated locations is the known separation $\delta$.

Referring again to FIG. 18C, note that, at sampling time $t_2$, the same set $1826E(t_2)$ would be obtained by the processor 1546 if the intensity pattern 1810 were moved in a westward, opposing motion vector 1852. As such, to unambiguously determine the direction of motion, the sampling frequency has to be larger than $1/(t_2-t_0)$.

Referring again to FIG. 18C, the intensity pattern 1810 can be moved along with the mass 1534 relative to the four beams 1806 based on a diagonal motion vector 1854. When the intensity pattern 1810 is moved in a NE direction along the diagonal motion vector 1854 illustrated in FIG. 18C, at sampling time $t_1$, the area 1814 is inscribed in a single tile 1812D, so it does not cross any tile border. As such, a set $1826NE(t_1)$ obtained by the processor 1546 includes the intensity values $\{I_D, I_D, I_D, I_D\}$ corresponding to quadrants I, II, III, IV, respectively, of area 1814. When the intensity pattern 1810 is moved further in the NE direction along diagonal motion vector 1854, at sampling time $t_2$, the area 1814 is positioned across four tile borders 1813CD, 1813BD, 1813AB, 1813AC, such that a corresponding one of the four illuminated locations 1808 lies on each one of the four adjacent tiles 1812D, 1812B, 1812A, 1812C that form the concurrently crossed tile borders. As such, a set $1826NE(t_2)$ obtained by the processor 1546 includes the intensity values $\{I_D, I_B, I_A, I_C\}$ corresponding to quadrants I, II, III, IV, respectively, of area 1814.

Note that, at sampling time $t_2$, the same set $1826E(t_2)$ of intensity values would be obtained by the processor 1546 if the intensity pattern 1810 were moved in westward, opposing axial motion vector 1852. Also at sampling time $t_2$, the same set $1826NE(t_2)$ of intensity values would be issued by the photodetector 1522 if the intensity pattern 1810 were moved in a southwest direction, opposing diagonal motion vector 1854. As such, to unambiguously determine the direction of motion, the sampling frequency has to satisfy the following condition: $f_S>1/(t_2-t_0)$.

Figure 18E:
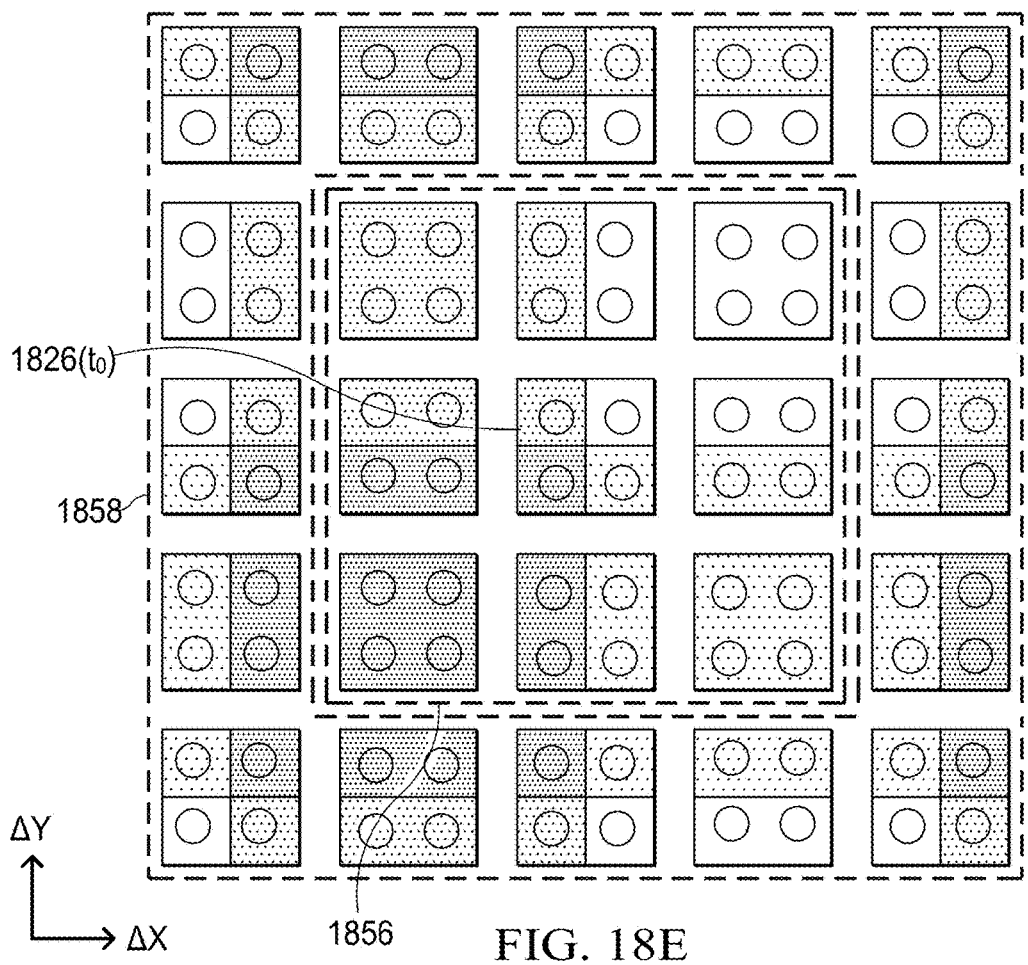

As such, FIG. 18E shows a first group 1856 of unique sets 1826 of expected intensity values corresponding to particular positions in the (x,y) plane of illuminated locations of the intensity pattern 1810, where each of the sets of the first group 1856 can be used by the processor 1546 to unambiguously determine the absolute value and direction of displacements ΔX and ΔY of the intensity pattern relative to the beams 1810. FIG. 18E also shows a second group 1858 of non-unique sets 1826 of expected intensity values corresponding to particular positions in the (x,y) plane of illuminated locations of the intensity pattern 1810. While the sets 1826 of intensity values of the second group 1858 can be used by the processor 1546 to determine the absolute value of displacements ΔX and ΔY of the intensity pattern relative to the beams 1810, respective directions of the displacements ΔX and ΔY can be one of multiple possible directions. However, the sets 1826 of intensity values of the second group 1858 can be used for error correction, e.g., to detect motion aliasing when the mass 1534 supporting the intensity pattern 1810 is moving too fast or the sampling rate $f_S$ is too slow.

In some implementations, at least the first group 1856 of unique sets 1826 of intensity values corresponding to particular positions in the (x,y) plane of illuminated locations of the intensity pattern 1810 can be recorded in a data store, e.g., in a register, a lookup table, etc. In these implementations, the processor 1546 uses an obtained set of intensity values (e.g., 1826E($t_1$)) against the recorded first group 1856 of the sets 1826 of expected intensity values corresponding to particular positions in the (x,y) plane of illuminated locations of the intensity pattern 1810 (e.g., as shown in FIG. 18E), to determine a position on the intensity pattern of the area 1814 that includes the illuminated locations 1808 (e.g., a row of two beams illuminate a tile of third type 1812C and, across the tile border 1813CD, a row of two beams illuminate a tile of fourth type 1812D, as shown in the second panel of FIG. 18D).

Figure 19A:
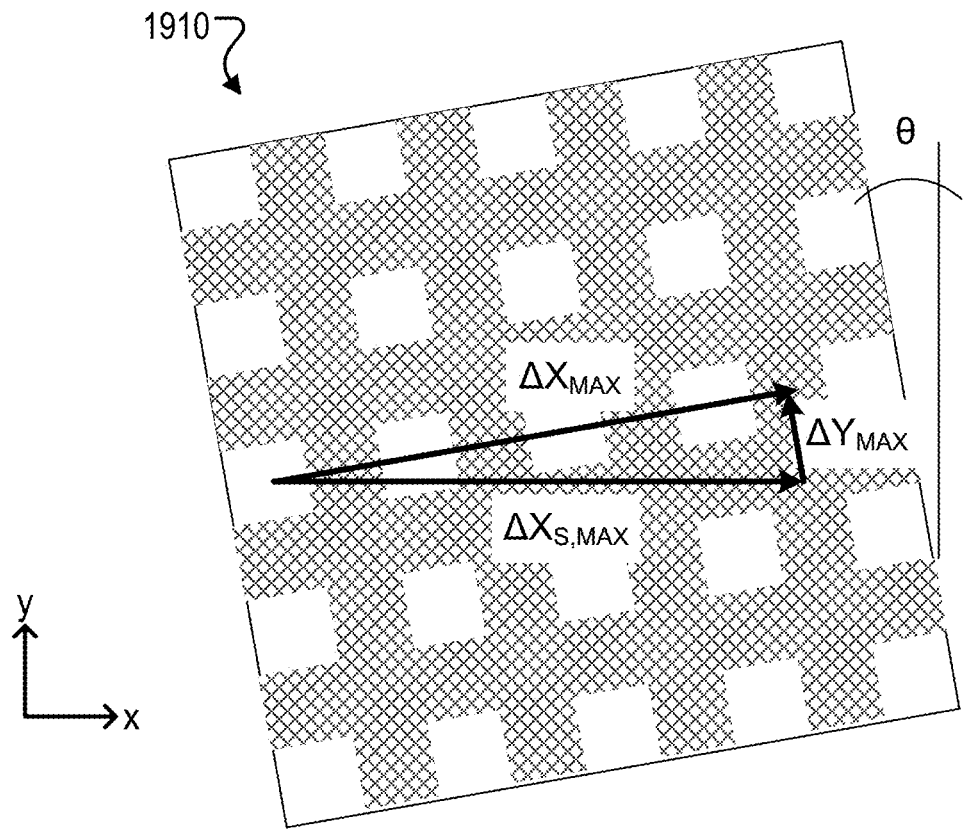
FIGS. 19A-19B show aspects of a technique for addressing misalignment of intensity pattern relative to a light emitting element array.
Figure 19B:
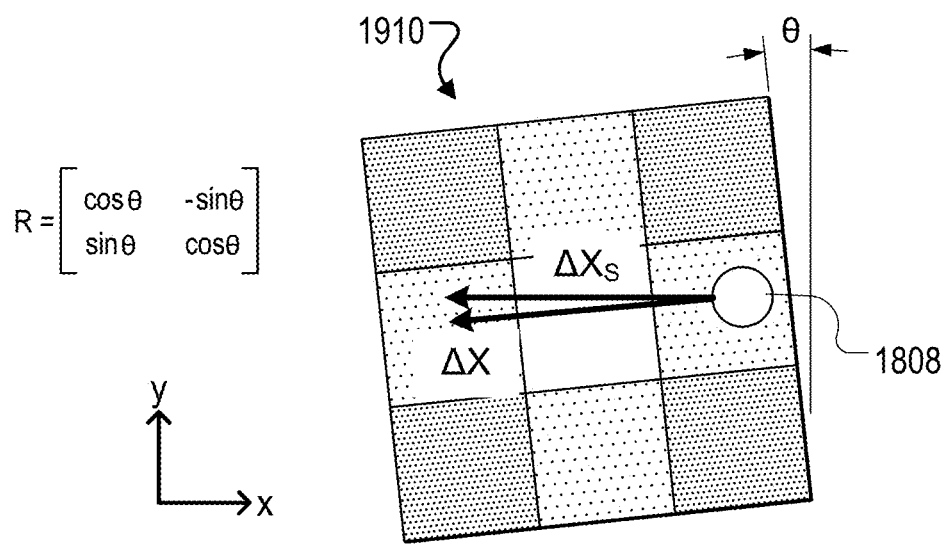

FIG. 19A shows an intensity pattern 1910 that is misaligned relative to the LEE array 1504 of the displacement measuring system 1500A/1500B, e.g., rotated relative to the x-axis and y-axis by a rotation angle θ. This misalignment can be compensated for by sweeping over the full $\Delta X_{MAX}$ motion range and measuring the corresponding displacement $\Delta Y_{MEAS}$ over this range to estimate θ. Such a misalignment compensation can be performed at fabrication time, or in the field. For example, while a device carrying the displacement measuring system 1500A/1500B is charging, it can be verified whether there is a misalignment of the intensity pattern 1910 pattern to the LEE array 1504. The processor 1546 determines the angular misalignment θ based on the known $\Delta X_{MAX}$ motion range and measured displacement $\Delta Y_{MEAS}$. Once the angular misalignment θ is determined, the processor 1546 transforms the intensity pattern 1910 using a rotation matrix to determine a scaling factor [1/cos(θ)]. FIG. 19B shows that a displacement ΔX measured by the displacement measuring system 1500A/1500B using the rotated intensity pattern 1910 will be scaled by the processor 1546, based on the determined scaling factor, to output the "true" displacement as a scaled displacement $\Delta X_S$. A magnitude of scaled displacement $\Delta X_S$ is larger than a magnitude of the measured displacement ΔX based on the determined scaled factor: $\Delta X_S = \Delta X/\cos(\theta)$.

The displacement measuring system 1500A/1500B in conjunction with intensity patterns 1510A/1510B, 1710 and 1810 can be used to measure angular displacement in various rotational configurations, as described below.

Figure 20A:
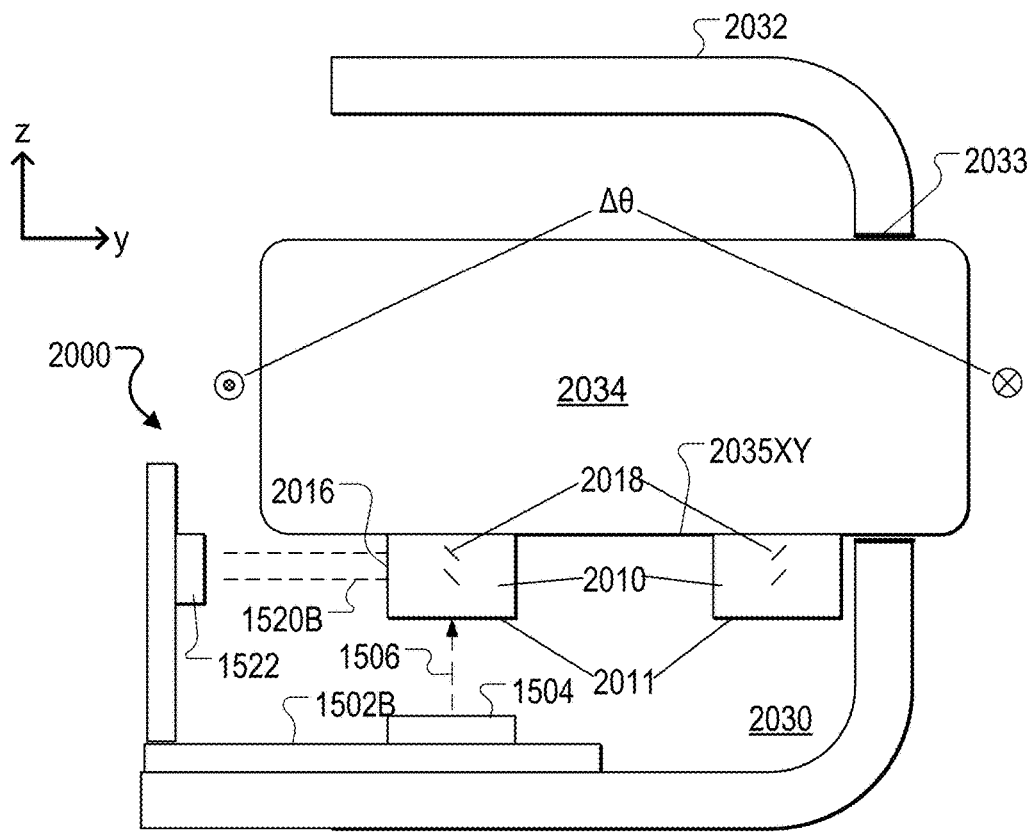
FIGS. 20A-20B show aspects of an angular displacement measuring system.

FIG. 20A is a side view, in the (y,z) plane, of a first example of an angular displacement measuring system 2000 configured to measure angular displacement Δθ of a wheel 2034. Here, a device 2030 has a frame 2032 that encapsulates at least a portion of the angular displacement measuring system 2000 and a portion of the wheel 2034. A remaining portion of the wheel 2034 protrudes outside of the frame 2032 through slot 2033, for instance. In some implementations, the device 2030 is a watch, and the wheel 2034 is a setting/control crown.

In this example, the angular displacement measuring system 2000 is a modification of the displacement measuring system 1500B described above in connection with FIG. 15B. The angular displacement measuring system 2000 includes the mount 1502B, the LEE array 1504, and the photodetector 1522, all of which described in detail above in connection with FIGS. 15B-15E. Note that the $N_{TOT}$ LEEs 1528 of the LEE array 1504 are distributed along the x-axis.

An intensity pattern 2010 of the angular displacement measuring system 2000 is a structure shaped like a wheel that is disposed co-axially with the wheel 2034 and is coupled with a side wall surface 2035XY of the wheel 2034. A side wall surface 2011 of the intensity pattern 2010 is spaced apart from and faces the LEE array 1504, and a rim surface 2016 of the intensity pattern 2010 is spaced apart from and faces the photodetector 1522. In this manner, during operation of the angular displacement measuring system 2000, the LEE array 1504 illuminates a transmissive side wall surface 2011 of the intensity pattern 2010 with $N_{TOT}$ beams 1506, and the intensity pattern redirects, through its transmissive rim surface 2016 to the photodetector 1522, at least some of the light impinging on the illuminated surface, such that $N_{TOT}$ redirected beams 1520B form a folding angle relative the illuminating beams. In some cases, the folding angle formed by the redirected beams 1520B relative the illuminating beams 1506 can be a substantially right angle. In the example illustrated in FIG. 20A, the intensity pattern 2010 includes an array of micro-mirrors 2018 (or micro-prisms, or other redirecting microstructures) between the transmissive side wall surface 2011 and the transmissive rim surface 2016. Here, the flat surface of the micro-mirrors of the array 2018 is oriented parallel to the x-axis. In this manner, the transmissive side wall surface 2011 selectively transmits the illuminating beams 1506, the array of micro-mirrors 2018 reflects, scatters or both the selectively transmitted beams, and the transmissive rim surface 2016 transmits the redirected beams 1520B to the photodetector 1522.

Figure 20B:
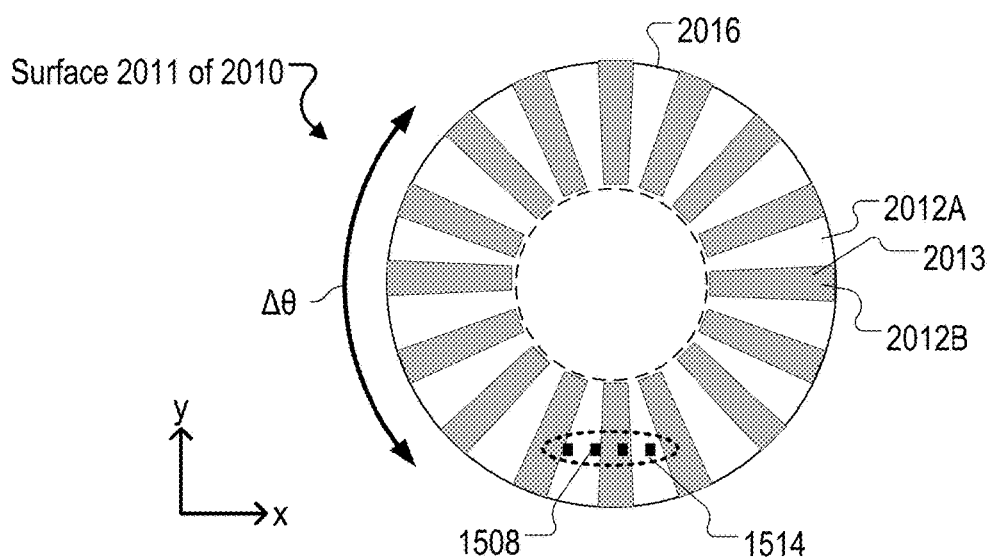

FIG. 20B is a plan view in the (x,y) plane of side wall surface 2011 of the intensity pattern 2010. In this example, the intensity pattern 2010 has M=2 tile types: tiles of first type 2012A and tiles of second type 2012B separated from each other by tile borders 2013. Note that the tiles 2012A, 2012B are shaped as annulus sectors. A tile of first type 2012A is configured such that, when one of the beams 1506 illuminates it, the corresponding one of the redirected beams 1520B has a maximum intensity $I_{MAX}$. Further, a tile of second type 2012B is configured such that, when one of the beams 1506 illuminates it, the corresponding one of the redirected beams 1520B has a minimum intensity $I_{MIN}$, where $I_{MIN} < I_{MAX}$. Here, the tile borders 2013 are distributed at known angular locations relative to each other along the azimuthal θ-axis, so the intensity pattern 2010 can be used as part of the angular displacement measuring system 2000 to measure an angular displacement Δθ of the wheel 2034 along the azimuthal θ-axis. Further in the example shown in FIGS. 20A-20B, the LEE array 1504 illuminates an area 1514 of side wall surface 2011 of the intensity pattern 2010 with $N_{TOT}$ beams 1506, and a separation between the illuminated locations 1508 is a known separation δ. Moreover, the size along the azimuthal θ-axis of each of tiles 2012A, 2012B can accommodate $1 \leq N \leq N_{TOT}$ concurrently illuminated locations 1508.

In this manner, the PWM driver 1536 of the angular displacement measuring system 2000 can use a switching gate, similar to the switching gate 1524 shown in FIG. 15E, to time multiplex the $N_{TOT}$ LEEs 1528 of the LEE array 1504. In this manner, the processor 1546 (in conjunction with the photodetector 1522) obtains, for each sampling time $t_k$, an associated set of $N_{TOT}$ intensity values corresponding to intensities of respective beams 1520B redirected by the intensity pattern 2010 via transmission through the side wall surface 2011 at the illuminated locations 1508. As such, the processor 1546 of the angular displacement measuring system 2000 can determine, for each sampling time $t_k$, positions along the azimuthal θ-axis of the illuminated locations 1508 of the side wall surface 2011 of the intensity pattern 2010 based on relative differences between the intensity values of the associated issued set. Then, in a manner similar to the manners described above in connection with FIG. 16A-16B or 17B-17C (e.g., by substituting ΔX with Δθ), the processor 1546 determines, for each sampling time $t_k$, an angular displacement Δθ of the wheel 2034 based on one or more changes of the intensity values of the obtained set caused by rotation of the wheel that sweeps at least one of the tile borders 2013 through at least one of the illuminating beams 1506.

Figure 21A:
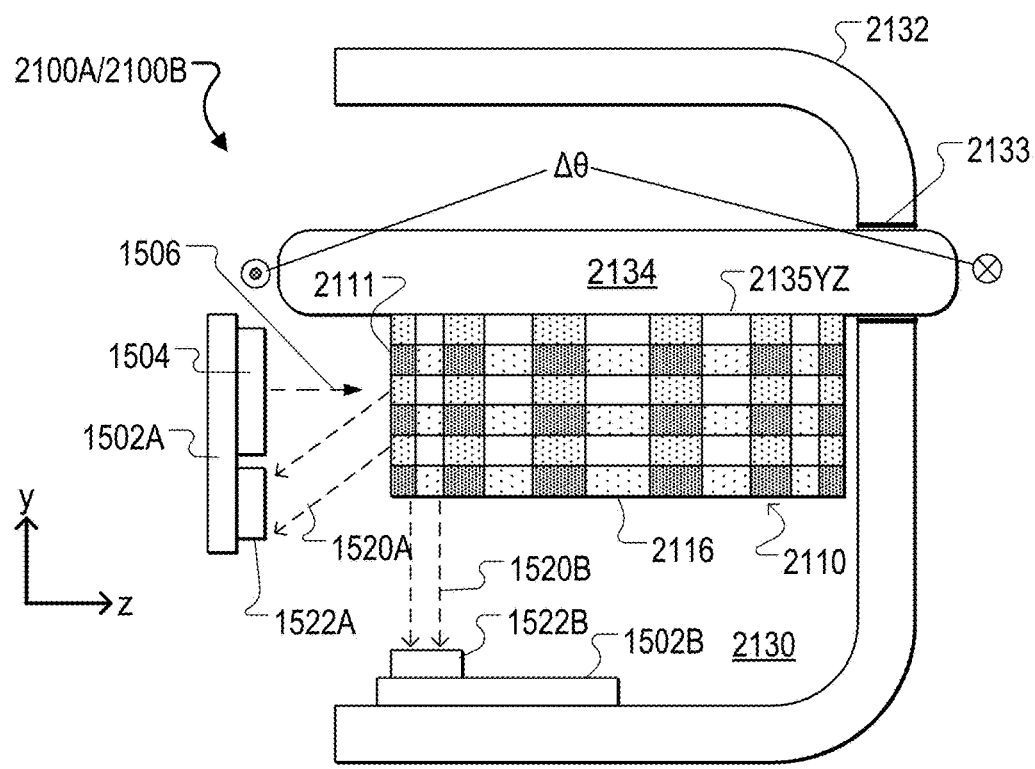
FIGS. 21A-21B show aspects of another angular displacement measuring system.

FIG. 21A is a side view, in the (y,z) plane, of a second example of an angular displacement measuring system 2100A or a third example of an angular displacement measuring system 2100B each configured to measure angular displacement Δθ of a wheel 2134. Here, a device 2130 has a frame 2132 that encapsulates at least a portion of one of the angular displacement measuring systems 2100A, 2100B and a portion of the wheel 2134. A remaining portion of the wheel 2134 protrudes outside of the frame 2132 through slot 2133, for instance. In some implementations, the device 2130 is a watch, and the wheel 2134 is a setting/control crown.

In this example, the angular displacement measuring system 2100A is a modification of the displacement measuring system 1500A described above in connection with FIG. 15A, and the angular displacement measuring system 2100B is a modification of the displacement measuring system 1500B described above in connection with FIG. 15B. The angular displacement measuring system 2100A/2100B includes the mount 1502A/1502B, the LEE array 1504, and the photodetector 1522A/1522B, all of which described in detail above in connection with FIGS. 15A-15E. Note that the $N_{TOT}$ LEEs 1528 of the LEE array 1504 are distributed along the x-axis.

Figure 21B:
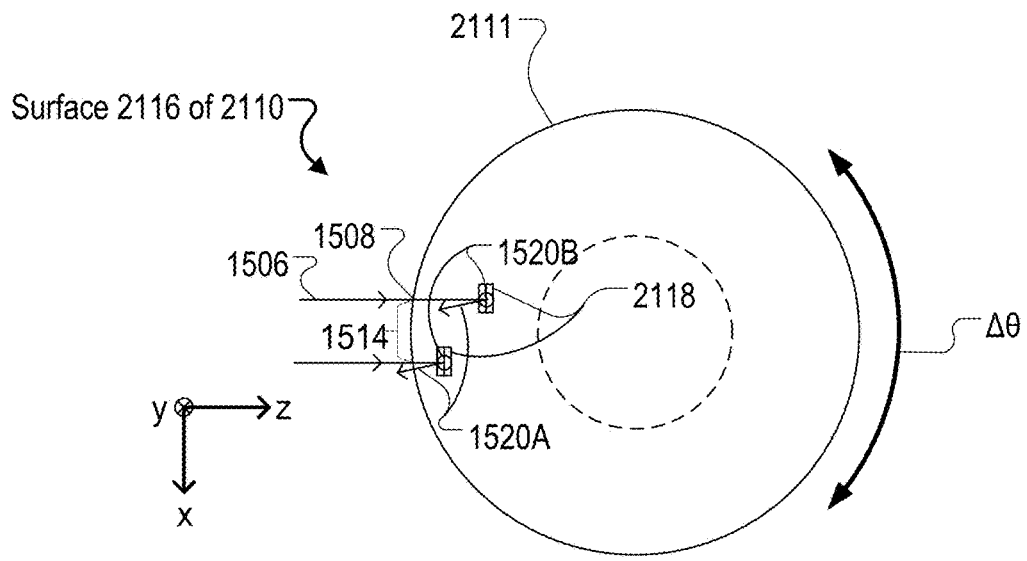

An intensity pattern 2110 of the angular displacement measuring system 2100A/2100B is a structure shaped like a wheel that is disposed co-axially with the wheel 2134 and coupled with a side wall surface 2135YZ of the wheel 2134. FIG. 21B is a plan view in the (x,z) plane of the side wall surface 2116 of the intensity pattern 2110 that is distal from the side wall surface 2135YZ of the wheel 2134. In the example illustrated in FIGS. 21A-21B, the intensity pattern 2110 includes an array of micro-mirrors 2118 (or micro-prisms, or other redirecting micro-structures) between a transmissive rim surface 2111 and a transmissive side wall surface 2116. Here, the flat surface of the micro-mirrors of the array 2118 is oriented parallel to the y-axis. In some implementations, the transmissive rim surface 2111 is configured as the surface 1511 of the intensity pattern 1510A/1510B described above in connection with FIG. 15C. In other implementations, the transmissive rim surface 2111 is configured as the surface 1511 of the intensity pattern 1710 described above in connection with FIG. 17A. In some other implementations, the transmissive rim surface 2111 is configured as the surface 1511 of the intensity pattern 1810 described above in connection with FIG. 18C. In either of these implementations, the tile borders 1513 or 1713 or the tile borders 1813 along the y-axis are distributed at known angular locations relative to each other along the azimuthal θ-axis, so the intensity pattern 2110 can be used as part of the angular displacement measuring system 2100A/2100B to measure an angular displacement Δθ of the wheel 2134 along the azimuthal θ-axis.

For the angular displacement measuring system 2100A, the rim surface 2111 of the intensity pattern 2110 is spaced apart from and faces the LEE array 1504 and the photodetector 1522A. In this manner, during operation of the angular displacement measuring system 2100A, the LEE array 1504 illuminates the transmissive rim surface 2111 of the intensity pattern 2110 with $N_{TOT}$ beams 1506; the transmissive rim surface 2111 selectively transmits the $N_{TOT}$ beams 1506; the array of micro-mirrors 2118 reflects, scatters or both the selectively transmitted beams, such that $N_{TOT}$ redirected beams 1520A form an acute angle relative the selectively transmitted beams; and the rim surface 2111 transmits the redirected beams 1520A to the photodetector 1522A. In another implementation of the angular displacement measuring system 2100A (not illustrated in FIG. 21B), the intensity pattern 2110 is configured to have a selectively reflective rim surface 2111 as described above in connection with FIG. 15C, FIG. 17A or FIG. 18C. During operation of this implementation of the angular displacement measuring system 2100A, the LEE array 1504 illuminates the reflective rim surface 2111 of the intensity pattern 2110 with $N_{TOT}$ beams 1506; and the reflective rim surface 2111 selectively redirects (via reflection, scattering or both) the $N_{TOT}$ beams 1506 to the photodetector 1522A, such that the $N_{TOT}$ redirected beams 1520A form an acute angle relative the beams 1506.

For the angular displacement measuring system 2100B, the rim surface 2111 of the intensity pattern 2110 is spaced apart from and faces the LEE array 1504, and the side wall surface 2116 of the intensity pattern 2110 is spaced apart from and faces the photodetector 1522B. In this manner, during operation of the angular displacement measuring system 2100B, the LEE array 1504 illuminates the transmissive rim surface 2111 of the intensity pattern 2110 with $N_{TOT}$ beams 1506; the transmissive rim surface 2111 selectively transmits the $N_{TOT}$ beams 1506; the array of micro-mirrors 2118 reflects, scatters or both the selectively transmitted beams, such that $N_{TOT}$ redirected beams 1520B form a folding angle relative the selectively transmitted beams (e.g., the folding angle formed by the redirected beams 1520B relative the illuminating beams 1506 can be a substantially right angle); and the transmissive side wall surface 2116 transmits the redirected beams 1520B to the photodetector 1522B.

Further in the example shown in FIGS. 21A-21B, the LEE array 1504 illuminates an area 1514 of the rim surface 2111 of the intensity pattern 2110 with $N_{TOT}$ beams 1506, and a separation between the illuminated locations 1508 is a known separation δ. Moreover, the size along the azimuthal θ-axis of each of tiles 1512 or 1712 or 1812 can accommodate $1 \leq N \leq N_{TOT}$ concurrently illuminated locations 1508.

In this manner, the PWM driver 1536 of the angular displacement measuring system 2100A/2100B can use a switching gate, similar to the switching gate 1524 shown in FIG. 15E, to time multiplex the $N_{TOT}$ LEEs 1528 of the LEE array 1504. In this manner, the processor 1546 (in conjunction with the photodetector 1522A/1522B) obtains, for each sampling time $t_k$, an associated set of $N_{TOT}$ intensity values corresponding to intensities of respective beams 1520A/1520B redirected by the intensity pattern 2110 via either reflection off a selectively reflective rim surface 2111 at the illuminated locations 1508, or transmission through a selectively transmissive rim surface 2111 at the illuminated locations 1508. As such, the processor 1546 of the angular displacement measuring system 2100A/2100B can determine, for each sampling time $t_k$, positions along the azimuthal θ-axis of the illuminated locations 1508 of the rim surface 2111 of the intensity pattern 2110 based on relative differences between the intensity values of the associated issued set. Then, in a manner similar to the manners described above in connection with FIGS. 16A-16B or FIGS. 17B-17C or FIGS. 18C-18E (e.g., by substituting ΔX with Δθ), the processor 1546 determines, for each sampling time $t_k$, an angular displacement Δθ of the wheel 2134 based on one or more changes of the intensity values of the obtained set caused by rotation of the wheel that sweeps at least one of the tile borders 1513 or 1713 or the tile borders 1813 along the y-axis through at least one of the illuminating beams 1506.

Figure 22A:
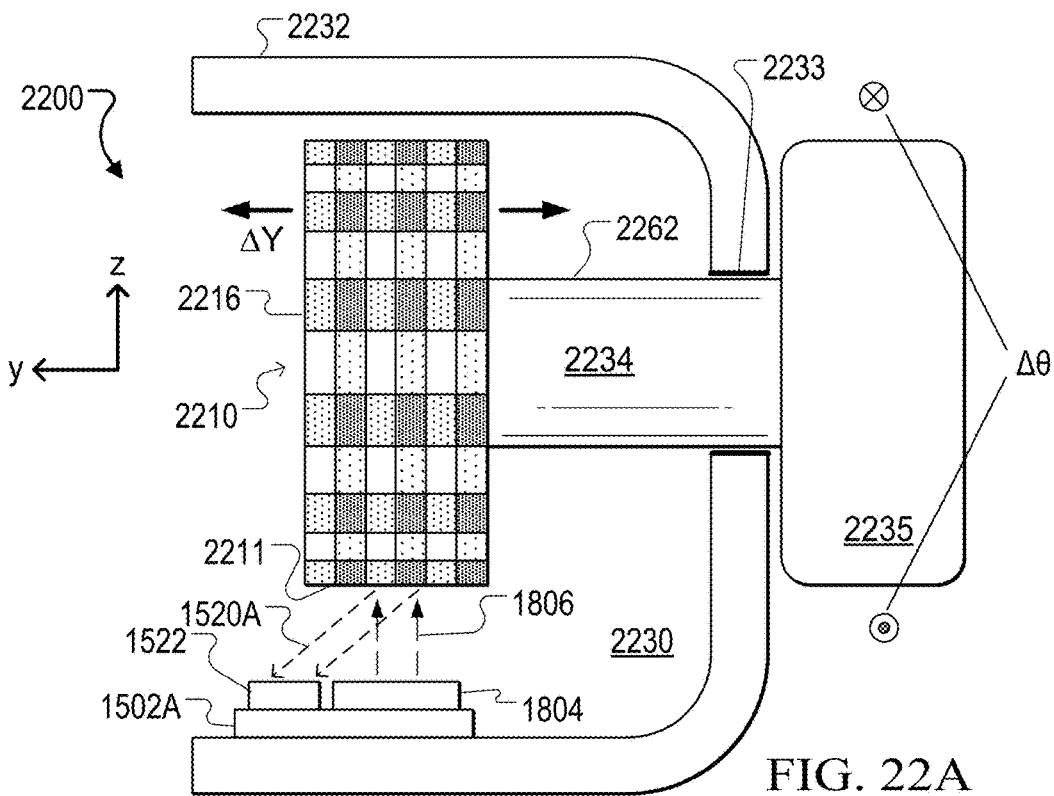
FIGS. 22A-22B show aspects of another displacement measuring system.

FIG. 22A is a side view, in the (y,z) plane, of another example of a displacement measuring system 2200 configured to concurrently measure angular displacement Δθ and axial displacement ΔY of a wheel 2235. Here, a device 2230 has a frame 2232 that encapsulates at least a portion of the displacement measuring system 2200 and a portion of an axle 2234 on which the wheel 2235 is mounted. A remaining portion of the axle 2234 protrudes outside of the frame 2232 through an opening 2233 with bearing mechanism, for instance. In some implementations, the device 2230 is a watch, and the wheel 2235 is a setting/control crown.

In this example, the displacement measuring system 2200 is a modification of the displacement measuring system 1500A described above in connection with FIG. 15A and FIGS. 18A-18B. The displacement measuring system 2200 includes the mount 1502A, the LEE array 1804, and the photodetector 1522, all of which described in detail above in connection with FIGS. 15A-15E and FIGS. 18A-18B. Note that the $N_{TOT}$ LEEs 1828 of the LEE array 1804 are distributed in $N_X$ rows along the x-axis and $N_Y$ rows along the y-axis.

Figure 22B:
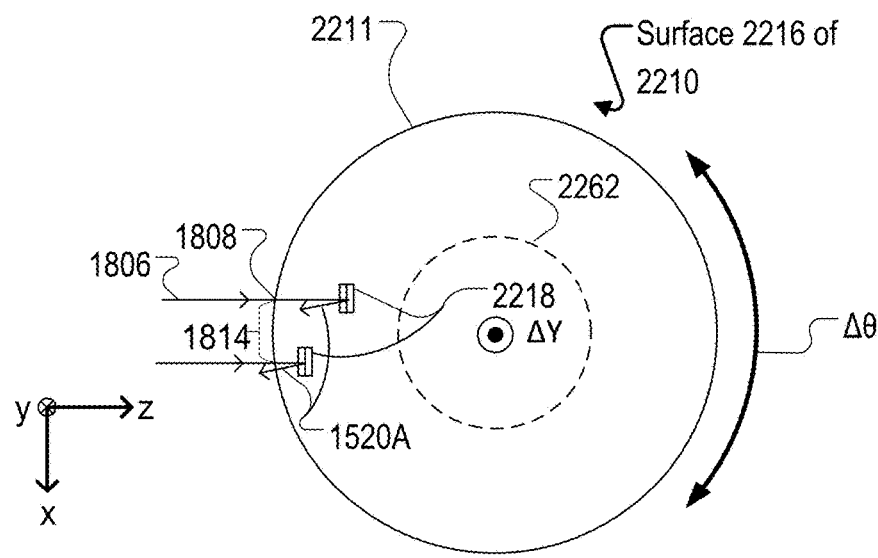

An intensity pattern 2210 of the displacement measuring system 2200 is a structure shaped like a wheel that is disposed on a rim surface 2262 of the axle 2234, i.e., co-axially with the wheel 2235. FIG. 22B is a plan view in the (x,z) plane of one of the two side wall surfaces 2216 of the intensity pattern 2210. In the example illustrated in FIGS. 22A-22B, the intensity pattern 2210 includes an array of micro-mirrors 2218 (or micro-prisms, or other redirecting micro-structures) between a transmissive rim surface 2211 and the side wall surfaces 2216. Here, the flat surface of the micro-mirrors of the array 2218 is oriented parallel to the y-axis. Further here, the transmissive rim surface 2211 is configured as the surface 1511 of the intensity pattern 1810 described above in connection with FIG. 18C. As such, the tile borders 1813 parallel to the y-axis are distributed at known angular locations relative to each other along the azimuthal θ-axis, and the tile borders 1813 parallel to the x-axis are distributed at known axial locations relative to each other along the y-axis, so the intensity pattern 2210 can be used as part of the displacement measuring system 2200 to measure both an angular displacement Δθ of the wheel 2235 along the azimuthal θ-axis and an axial displacement ΔY of the wheel 2235 along the y-axis.

Moreover, the rim surface 2211 of the intensity pattern 2210 is spaced apart from and faces the LEE array 1804 and the photodetector 1522. In this manner, during operation of the displacement measuring system 2200, the LEE array 1804 illuminates the transmissive rim surface 2211 of the intensity pattern 2210 with $N_{TOT}$ beams 1806; the transmissive rim surface 2211 selectively transmits the $N_{TOT}$ beams 1806; the array of micro-mirrors 2218 reflects, scatters or both the selectively transmitted beams, such that $N_{TOT}$ redirected beams 1520A form an acute angle relative the selectively transmitted beams; and the rim surface 2211 transmits the redirected beams 1520A to the photodetector 1522A. In another implementation of the angular displacement measuring system 2200 (not illustrated in FIG. 22B), the intensity pattern 2210 is configured to have a selectively reflective rim surface 2211 as described above in connection with FIG. 18C. During operation of this implementation of the angular displacement measuring system 2200, the LEE array 1804 illuminates the reflective rim surface 2211 of the intensity pattern 2210 with $N_{TOT}$ beams 1806; and the reflective rim surface 2211 selectively redirects (via reflection, scattering or both) the $N_{TOT}$ beams 1806 to the photodetector 1522, such that the $N_{TOT}$ redirected beams 1520A form an acute angle relative the beams 1806.

Further in the example shown in FIGS. 22A-22B, the LEE array 1804 illuminates an area 1814 of the rim surface 2211 of the intensity pattern 2210 with $N_{TOT}$ beams 1806, and separation along the azimuthal θ-axis and the y-axis between the illuminated locations 1808 are separations $\delta_\theta$ and $\delta_Y$. Moreover, the size along the azimuthal θ-axis and the size along the y-axis of each of tiles 1812 can accommodate $2 \leq N \leq N_{X,Y}$ concurrently illuminated locations 1808.

In this manner, the PWM driver 1536 of the displacement measuring system 2200 can use a switching gate, similar to the switching gate 1524 shown in FIG. 15E, to time multiplex the $N_{TOT}$ LEEs 1828 of the LEE array 1804. In this manner, the processor 1546 (in conjunction with the photodetector 1522) obtains, for each sampling time $t_k$, an associated set of $N_{TOT}$ intensity values corresponding to intensities of respective beams 1520A redirected by the intensity pattern 2210 via either reflection off a selectively reflective rim surface 2211 at the illuminated locations 1808, or transmission through a selectively transmissive rim surface 2211 at the illuminated locations 1808. As such, the processor 1546 of the displacement measuring system 2200 can determine, for each sampling time $t_k$, positions along both the azimuthal θ-axis and axial y-axis of the illuminated locations 1808 of the rim surface 2211 of the intensity pattern 2210 based on relative differences between the intensity values of the associated obtained set. Then, in a manner similar to the manner described above in connection with FIGS. 18C-18E (e.g., by substituting ΔX with Δθ), the processor 1546 determines, for each sampling time $t_k$, both an angular displacement Δθ and an axial displacement ΔY of the wheel 2235 based on one or more changes of the intensity values of the issued set caused by rotation of the wheel that sweeps at least one of the tile borders 1813 through at least one of the illuminating beams 1806.

Each of the intensity pattern 1510A/1510B illustrated in FIG. 15C, the intensity pattern 1710 illustrated in FIG. 17A, and the intensity pattern 1810 illustrated in FIG. 18C can be fabricated using infra-red (IR) ink with varying thickness based on various photo-mask processes, for instance. In some implementations, multiple masks can be applied to produce the 1D 3-level intensity pattern 1710 as shown in FIG. 17A, or the 2D 4-level intensity pattern 1810 shown in FIG. 18C. Commercially available IR inks used in visible light pass-through filters have stop bands in the range of 800 nm. IR VCSELs that emit light in the range of 800-1100 nm are readily available. Processes for spin coating (for thickness and uniformity control) and photo mask (UV development) patterning, used to make CMOS image sensor color filter arrays (CFA), can be applied to the above-noted IR inks to fabricate the intensity patterns 1510A/1510B, 1710, and 1810 with a spatial resolution of order ~1 µm. Alternatively, in the case of cost-sensitive applications, inkjet printing can be used to fabricate the intensity patterns 1510A/1510B, 1710, and 1810 with a spatial resolution of order ~10 µm.

In some implementations, the controller system 1525 can be configured as mixed signal circuitry that processes analog signals and digital signals. In some implementations, the controller system 1525 can be configured as one or more digital signal processors, e.g., ASIC, FPGA, CPU, etc. In some implementations, at least portions of circuitry that powers and conditions the LEE array 1504/1804 can be combined with at least portions of circuitry illustrated in FIG. 15D that is associated with the photodetector 1522 in a single system on a chip (SOC), ASIC, FPGA, CPU, etc.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including system on chip (SoC) implementations, which can include one or more controllers and embedded code.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A displacement measuring system comprising:
  a vertical cavity surface emitting laser (VCSEL) array comprising two or more vertical cavity surface emitting lasers (VCSELs) distributed along a first direction;
  an optical pattern supported by a mass, the optical pattern having two portions that form an edge oriented along a second direction that crosses the first direction, the two portions of the optical pattern having different reflectivities, wherein the VCSEL array is spaced apart from the optical pattern and arranged such that, during operation of the displacement measuring system, the VCSEL array illuminates the optical pattern, across the edge, with VCSEL light emitted by the VCSEL array;
  a photodetector spaced apart from the optical pattern and arranged such that, during operation of the displacement measuring system, the photodetector integrates the VCSEL light that is redirected by the optical pattern to the photodetector and issues a photodetector signal from the integrated VCSEL light; and
  processing electronics to receive the photodetector signal and determine a displacement of the mass along the first direction based on a change in the photodetector signal caused by motion of the mass along a direction of motion that crosses the edge.

2. The system of claim 1, wherein the two or more VCSELs of the VCSEL array are arranged in a row parallel to the first direction and separated by a pitch.

3. The system of claim 1, further comprising:
  a second VCSEL array comprising two or more VCSELs distributed along the first direction, wherein
  the two portions of the optical pattern form a second edge parallel to the first edge,
  the second VCSEL array is spaced apart from the mass and arranged such that, during operation of the displacement measuring system, the second VCSEL array illuminates the optical pattern, across the second edge but not across the first edge, with VCSEL light emitted by the second VCSEL array,
  the photodetector further issues, during operation of the displacement measuring system, a second photodetector signal based on the VCSEL light emitted by the second VCSEL array that is redirected by the optical pattern to the photodetector, and
  the processing electronics to receive the second photodetector signal and determine the displacement of the mass along the first direction further based on a change in, the second photodetector signal caused by the motion of the mass along the direction of motion.

4. The system of claim 3, wherein the processing electronics to
  determine a first ratio signal as a division of the first photodetector signal to the second photodetector signal, and a second ratio signal as a division of the second photodetector signal to the first photodetector signal, and
  determine the displacement of the mass along the first direction based on respective changes, caused by the motion of the mass along the direction of motion, in the first ratio signal and the second ratio signal.

5. The system of claim 3, wherein
  the first VCSEL array and the second VCSEL array are spaced apart from the mass by the same separation, and
  the processing electronics to determine a change of the separation between the VCSEL arrays and the mass, based on a change in a common value of the first photodetector signal and second photodetector signal.

6. A haptic engine comprising the mass and the displacement measuring system recited in of claim 1.

7. A computing device comprising the haptic engine of claim 6.

8. The system of claim 1, wherein
  the two or more VCSELs of the VCSEL array are arranged in two rows parallel to the first direction,
  each of the rows comprises two or more VCSELs that are separated by a pitch, and
  the two rows are staggered relative to each other along the first direction by half the pitch and separated from each other by a separation.

9. The system of claim 2, wherein the pitch is about a size of a beam spot of the VCSEL light impinging on the optical pattern.

10. The system of claim 8, wherein the separation is about a size of a beam spot of the VCSEL light impinging on the optical pattern.

11. The system of claim 8, wherein
  the two portions of the optical pattern form a second edge orthogonal to the first edge, the VCSEL array is further arranged such that, during operation of the displacement measuring system, the VCSEL array illuminates the optical pattern across the second edge with the VCSEL light, and the processing electronics to determine a second displacement of the mass along a direction orthogonal to the first direction based on a second change in the photodetector signal caused by motion of the mass along a second direction of motion that crosses the second edge.

12. The system of claim 11, wherein a first of the two portions of the optical pattern is shaped as a rectangle and is surrounded by the second portion, such that the first edge is a first side of the rectangle, and the second edge is a second side of the rectangle, and a length of the second edge is longer than a length of the VCSEL array, and a length of the first edge is longer than the separation between the two rows of the VCSEL array.

13. The system of claim 4, wherein the processing electronics determines the displacement of the mass along the first direction based on the smaller of the first ratio signal and the second ratio signal.

14. The system of claim 3, wherein the first VCSEL array and the second VCSEL array illuminate the optical pattern, during operation of the displacement measuring system, in a multiplexed manner, and the photodetector issues the respective first photodetector signal and second photodetector signal in the same multiplexed manner.

15. The system of claim 14, wherein the VCSELs of the first VCSEL array and the second VCSEL array emit light of the same wavelength, and the VCSELs of the first VCSEL array illuminate the optical pattern when the VCSELs of the second VCSEL array do not, and the VCSELs of the second VCSEL array illuminate the optical pattern when the VCSELs of the first VCSEL array do not, in a time multiplexed manner.

16. The system of claim 14, wherein the VCSELs of the first VCSEL array emit light of a first wavelength and the VCSELs of the second VCSEL array emit light of a second wavelength different from the first wavelength, and the VCSELs of the first VCSEL array and the second VCSEL array illuminate the optical pattern concurrently, in a wavelength multiplexed manner.

17. The system of claim 16, wherein the photodetector comprises a first sensor to output a first sensor signal, and a second sensor to output a second sensor signal, and the processing electronics to concurrently issue (i) the first photodetector signal based on a first combination of the first sensor signal and the second sensor signal, the first combination being selective of the first wavelength, and (ii) the second photodetector signal based on a second combination of the first sensor signal and the second sensor signal, the second combination being selective of the second wavelength.

18. The system of claim 3, wherein the first VCSEL array and the second VCSEL array have the same length, a first of the two portions of the optical pattern is shaped as a strip bounded by the first edge and the second edge inside a second of the two portions, and a width of the strip is wider than the common length of the VCSEL arrays.

19. The system of claim 1, wherein one of the two portions of the optical pattern is reflective and the other one of the two portions of the optical pattern is absorptive.

20. The system of claim 1, wherein at least one of the two portions of the optical pattern is printed using ink that absorbs IR light.

21. The system of claim 1, wherein one of the two portions of the optical pattern is coated with a multilayer reflection coating, and the other one of the two portions of the optical pattern is coated with a multilayer anti-reflection coating.

22. The system of claim 1, wherein one of the two portions of the optical pattern has a reflectivity that is at least twice as large as a reflectivity of the other one of the two portions of the optical pattern.

23. The system of claim 1, wherein the VCSEL light emitted by the VCSELs has wavelengths in a range from 700 nm to 1100 nm.

24. The system of claim 1, wherein the second direction is orthogonal to the first direction.

25. The system of claim 1, wherein the direction of motion is parallel to the first direction.

* * * * *